3,835,160

3'-KETO-2',3'-SECO-1'-(2')-YNE STEROIDAL DERIVATIVES, METHODS FOR THEIR MANUFACTURE, AND COMPOUNDS PRODUCED THEREBY

CROSS REFERENCE TO RELATED APPLICATION

This application is a continuation-in-part of the co-pending application Ser. No. 644,761 filed June 6, 1967 of Masato Tanabe, now abandoned.

FIELD OF INVENTION

This invention relates to compositions of matter which may be classified in the field of chemistry as 3'-keto-2',3'-seco-1'(2')-yne steroidal derivatives possessing physiological activity, and which are also particularly valuable as intermediates in preparing other useful steroidal derivatives.

This invention also relates to processes for producing the novel 3'-keto-2',3'-seco-1'(2')-yne steroids, the basic process of which includes the steps whereby a 1'-keto-2'(3')-dehydro steroid wherein the 3'-carbon is disubstituted is converted to the corresponding 1'-hydrocarbonsulfonylhydrazono-2',3'-epoxy steroidal derivative, which derivative undergoes fission and rearrangement in situ in the reaction mixture to form a novel 3'-keto-2',3'-seco-1'(2'-)-yne steroidal compound of my invention.

SUMMARY OF INVENTION

The invention sought to be patented in its composition of matter aspect resides in the concept of a steroid (including steroids of the pregnane, androstane, estrane, cholestane, and sapogenin series) which possesses a 3'-keto-2',3'-seco-1'(2')-yne system or the corresponding 3'-hydroxy-2',3'-seco-1'(2')-yne system.

The preferred species of the composition of matter aspect of my invention are the 5-keto-4,5-seco-3(4)-yne steroidal derivatives (particularly of the androstane, estrane, and pregnane series) which possess physiological activity, and which are particularly valuable as intermediates in preparing pharmacologically active 3-keto-4-dehydro-steroids (many of which are known in the art) substituted at C-4 by a lower alkyl, or substituted at C-6 by a mono-, di-, or cyclic-hydrocarbon radical (including substituted hydrocarbon radicals) and/or at C-10 by a hydrocarbon radical.

There are several process aspects of this invention. Of these, the invention sought to be patented in its first process aspect resides in the concept of introducing in any sequence into a 1'-keto-2',3'-dehydro-steroid (i.e., a steroid possessing an $\alpha,\beta$-unsaturated ketone system) the 3'-carbon of which is disubstituted, an epoxy function across the 2',3'-dehydro double bond, and a hydroazone derivative, preferably a hydrocarbonsulfonylhydrazone derivative, of the 1'-keto function, whereby the resultant 1'-hydrazono-2',3'-oxido-steroid, preferably a 1'-hydrocarbonsulfonylhydrazono-2',3'-oxido-steroid having a tertiary carbon at C-3', while in situ in the reaction mixture, undergoes fission between C-2' and C-3' with concomitant fragmentation and rearrangement to form the 3'-keto-2',3'seco-1'-yne steroidal derivatives of the composition-of-matter aspect of this invention.

The invention sought to be patented in the second process aspect of this invention is the concept of further reacting the 3'-keto-2',3'-seco-1'(2')-yne steroidal derivatives which have a replaceable hydrogen on a carbon vicinal to said 3'-keto moiety, with an alkylating reagent to form (depending on the relative amounts of reagents used and the reaction conditions employed) mono-, di-, and tri- vicinally substituted derivatives, including hydrocarbon and substituted hydrocarbon derivatives.

The invention sought to be patented in the third process aspect of this invention is the concept of further treating said 3'-keto-2',3'-seco-1'(2')-yne steroid with a reducing agent (e.g., sodium borohydride) so as to reduce the 3'-keto function to form a 3'-hydroxy-2',3'-seco-1'(2')-yne-steroidal derivative.

The preferred mode of the first process aspect of my invention is that utilizing a 3-keto-4-dehydro-steroid as the requisite starting 1'-keto-2',3'-dehydro-steroid whereby, upon introduction of a 4,5-epoxy and a 3-hydrocarbonsulfonylhydrazone derivative according to my invention, there is prepared a 3-hydrocarbonsulfonylhydrazono-4,5-oxido-steroid which converts in situ to a 5-keto-4,5-seco-3-yne-steroid, the preferred species of the composition of matter aspect of this invention.

The preferred mode of the second process aspect of this invention includes the step of further reacting any 6- and/or 10-unsubstituted-5-keto-4,5-seco-3-yne steroids (prepared by the first process aspect) in an alkylating medium such as an alkali metal hydride in an inert solvent (preferably sodium hydride in tetrahydrofuran) and a hydrocarbon halide (e.g. methyl iodide, ethylene dibromide, pentamethylene dibromide, 2-propenyl bromide) to form, depending on the amounts of reagent and the reaction condition employed, 6-mono-, 10-mono-, 6,10-di-, 6,6-di-, 6,6,10-tri-, and 6,6-cyclic-hydrocarbon derivatives thereof.

In another species of the preferred mode of the second process aspect, there are included the steps of treating a 5-keto-4,5-seco-3-yne with ethyl formate in the presence of sodium methylate to obtain the corresponding 6-formyl-5-keto-4,5-seco-3-yne which, in turn, upon further treatment with an n-butylthiol in benzene is converted to a 6-n-butylthiomethylene-5-keto-4,5-seco-3-yne of my invention.

The preferred mode of the third process aspect includes the step of treating a 5-keto-4,5-seco-3-yne with an alkali metal borohydride, e.g., sodium borohydride, to obtain a 5-hydroxy-4,5-seco-3-yne of my invention.

GENERAL DESCRIPTION OF THE PRODUCT ASPECT OF THE INVENTION

The invention sought to be patented in its broadest composition of matter aspect is the concept of a steroid (including members of the pregnane, androstane, estrane, cholestane and sapogenin series) which possess a 3'-keto-2',3'-seco-1'(2')-yne system or the corresponding 3'-hydroxy-2',3'-seco-1'(2')-yne system, and which may also possess hydrocarbon substituents having up to 12 carbon atoms on one or more carbon atoms adjacent said 5'-keto moiety.

In view of their method of manufacture, as discussed in detail hereinbelow, by my inventive concept, seco-steroids of this invention are contemplated as possessing the requisite 3'-keto-2',3'-seco-1'(2')-yne system

United States Patent [19]
Tanabe

[11] 3,835,160
[45] Sept. 10, 1974

[54] 3'-KETO-2',3'-SECO-1'-(2')-YNE STEROIDAL DERIVATIVES, METHODS FOR THEIR MANUFACTURE, AND COMPOUNDS PRODUCED THEREBY

[75] Inventor: Masato Tanabe, Palo Alto, Calif.
[73] Assignee: Schering Corporation, Bloomfield, N.J.
[22] Filed: June 20, 1967
[21] Appl. No.: 647,315

Related U.S. Application Data
[63] Continuation-in-part of Ser. No. 644,761, June 6, 1967, abandoned.

[52] U.S. Cl............. 260/340.9, 260/239.55 R, 260/239.5 C, 260/340.5, 260/345.8, 260/345.9, 260/397.1, 260/397.4, 260/488 B, 260/586 H
[51] Int. Cl............................. C07d 13/04
[58] Field of Search.......... 260/340.9, 340.5, 345.8, 260/345.9, 488, 586 H

[56] References Cited
UNITED STATES PATENTS
3,150,140  9/1964  Cross et al.............. 260/340.9
3,403,167  9/1968  Nagata.................... 260/340.9
3,413,311  11/1968 Cross et al.............. 260/340.9

Primary Examiner—Donald G. Daus
Assistant Examiner—James H. Turnipseed
Attorney, Agent, or Firm—Mary S. King

[57] ABSTRACT
Described herein are novel 3'-keto-2',3'-seco-1'(2')-yne steroidal structures and processes for their preparation and, in particular, the preferred embodiment thereof, i.e., 5-keto-4,5-seco-3-ynes of the estrane, androstane, and pregnane series having physiological activity and being particularly useful as intermediates in preparing pharmacologically active 6- and/or 10-substituted steroids.

There are described three process aspects, the preferred modes of which are as follows:
1. The first preferred process comprises the preparation of 5-keto-4,5-seco-3-yne steroids from 3-keto-4-dehydro steroids having a tertiary carbon at C-3, via the 3-hydrocarbonsulfonylhydrazono-4,5-oxido derivative thereof which undergoes fission and rearrangement in situ to form the 5-keto-4,5-seco-3-yne structure;
2. The second preferred process comprises reacting any 6- and/or 10-unsubstituted-5-keto-4,5-seco-3-yne in an alkylating medium with a hydrocarbon sulfonate or, preferably, a hydrocarbon halide to form a 6- and/or 10- hydrocarbon substituted-5-keto-4,5-seco-3-yne; and
3. The third preferred process comprises treating a 5-keto-4,5-seco-3-yne with an alkali metal borohydride to form a 5-hydroxy-4,5-seco-3-yne.

Also described in detail (including examples) are two methods whereby the preferred 5-keto-4,5-seco-3-ynes of this invention are converted to pharmacologically valuable 6- and/or 10-hydrocarbon substituted-3-keto-4-dehydro steroids, e.g.,
1. by reaction with mercuric acetate and sulfuric acid in acetic acid; or
2. by reaction with mercuric oxide and trifluoroacetic acid followed by treatment of the thereby formed 3,5-diketo-4,5-seco steroid with potassium t-butoxide in t-butanol.

10 Claims, No Drawings

CHART A—Continued

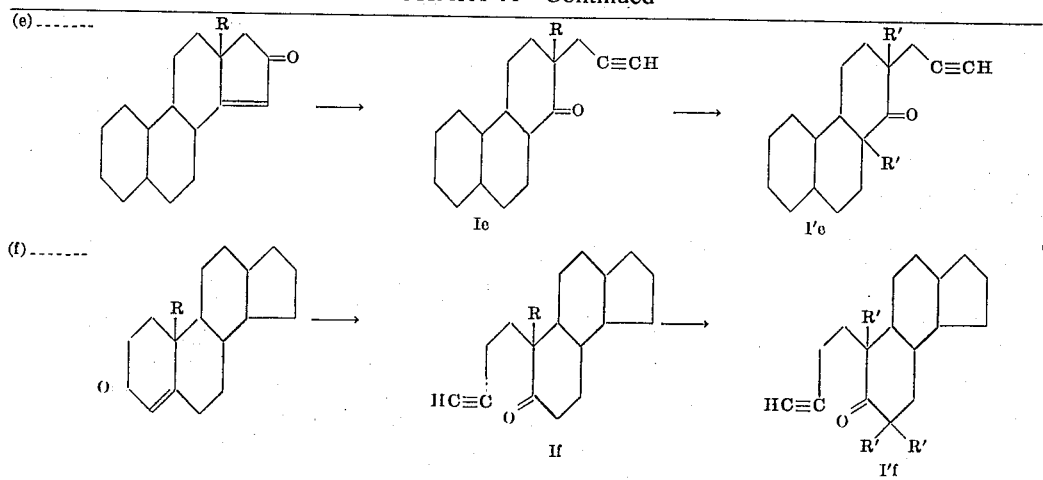

In above Chart A, the partial formulae in the first column represent α,β-unsaturated ketone (i.e. 1'-keto-2'(3')-dehydro-) systems in normal steroids from which, via my first process aspect, are derived novel seco structures, i.e. the 3'-keto-2',3'-seco-1'(2')-ynes represented diagramatically by formulae Ia–If which, in turn, via the second process aspect of my invention, are alkylated to form novel R'-substituted-3'-keto-2',3'-seco-1'(2')-ynes, represented diagramatically by formulae I'a–I'f.

Thus, by means of the second process aspect of our invention, there may be introduced hydrocarbon radicals at C-8 and C-10 in 9,11-seco-9-keto-11(12) ynes of formula I(d) to form 10-R' and/or 14-R' derivatives defined minimally by formula I'(d).

The preferred species of the composition-of-matter aspect of my invention are the 5-keto-4,5-seco-3(4)-yne steroidal derivatives and their 6 and/or 10-hydrocarbon derivatives. Included within this species are compounds having minimally, the following structural formula:

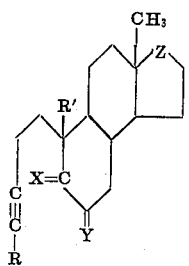

wherein

X is a member selected from the group consisting of ketonic oxygen, (H,βOH), (H,β-lower alkanoyloxy), and (H,β-p-toluenesulfonyloxy);

R is a member selected from the group consisting of hydrogen and lower alkyl;

R' is a member selected from the group consisting of hydrogen and a hydrocarbon radical having up to 12 carbon atoms;

Y is a member selected from the group consisting of hydrogen,

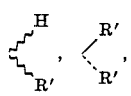

a polymethylene cyclic radical having from 2 to 8 carbon atoms, (H,β-formyl), and n-lower alkylthiomethylene; and Z is a member selected from the group consisting of keto,

(W being a member selected from the group consisting of hydrogen, lower alkyl, tetrahydropyranyl, lower alkanoyl, and A being a member selected from the group consisting of hydrogen, and lower alkyl,

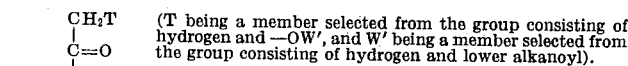

(T being a member selected from the group consisting of hydrogen and —OW', and W' being a member selected from the group consisting of hydrogen and lower alkanoyl).

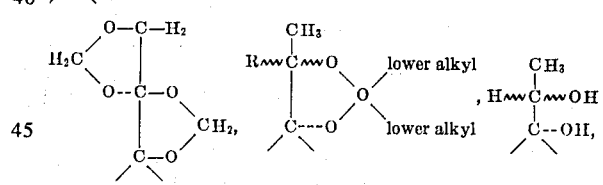

and

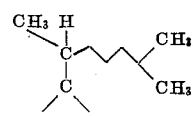

Included within the term "lower alkyl" as used in the specification and claims are saturated hydrocarbon radicals having up to four carbon atoms including straight chain and branched radicals such as methyl, ethyl, n-propyl, isopropyl, n-, iso-, and tert.-butyl.

The term hydrocarbon radical having up to 12 carbon atoms as used in the specification and claims encompasses saturated alkyl radicals, both straight chain and branched, having up to 12 carbon atoms such as methyl, octyl, n-dodecyl and like, unsaturated open chain radicals such as 2'-propenyl-, and 3'-butenyl; and cyclic hydrocarbon radicals such as cyclo-propylethyl, cyclobutylmethyl, cyclopentyl; as well as, at C-6, spirocyclic hydrocarbon radicals which includes within the spiro ring structure the seco-steroid carbon at C-6, e.g. 6,6-dimethylene (i.e., 6-spiropropane or 6,6-ethylene)

6,6-trimethylene (i.e., 6-spirobutane), and 6,6-pentamethylene (i.e. spirohexane), and the like.

Typical compounds of the preferred species of the composition of matter aspect of my invention which are defined by above formula I include:

1. 6 and 10 unsubstituted seco-steroidal derivatives of the estrane series (i.e. wherein R' and Y are hydrogen) such as:

4,5-Seco-3-estryn-17β-ol-5-one and the 17-acetate ester and the 17-tetrahydropyranyl ether thereof (i.e., compounds wherein Z is

A being hydrogen, and X being oxygen);

2. 6-unsubstituted-10β-alkyl- and 6-unsubstituted 10β-alkylene seco steroidal derivatives (i.e. wherein Y is hydrogen and R' is a hydrocarbon radical) of the androstane, pregnane, and cholestane series, such as 4,5-Seco-3-androstyn-17β-ol-5-one (Z is

R' is methyl, and X is oxygen) and the 17-acetate ester and 17-tetra-hydropyranyl ether thereof; as well as the 3β-enol acetate 17-acetate thereof (compound of Example 13A);

4,5-Seco-3-androstyne-5,17-dione (Z is keto, R' is methyl, and X is oxygen),

10β-n-propyl-4,5-seco-3-estryn-17β-ol-5-one (i.e., R' is n-propyl, X is oxygen, and Z is

17,20;20,21-bis-methylenedioxy-4,5-seco-3-pregnyn-5-one and the 11-keto analog thereof, (i.e., wherein X is oxygen, R' is methyl, and Z is

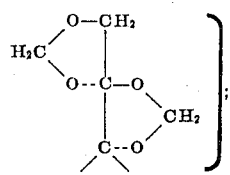

17α,20-isopropylidenedioxy-4,5-seco-3-pregnyn-5-one (i.e., wherein X is oxygen, R is H, R' is methyl and Z is

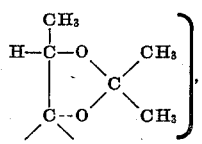

4,5-seco-3-cholestyn-5-one (R is H, X is oxygen, Z is

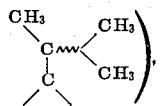

4,5-seco-3-pregnyne-5,20-dione, (i.e. wherein X is oxygen, and Z is

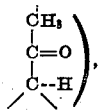

4,5-seco-3-androstyn-5,17β-diol

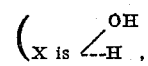

R' is methyl, R is hydrogen, and Z is

and the 3-p-toluenesulfonate ester thereof;

3. 6-substituted-10-unsubstituted seco steroids (i.e., R' is hydrogen, Y is formyl or 6-n-butylthiomethylene) exemplified by 6-formyl-4,5-seco-3-estryn-17β-ol-5-one 17-tetrahydropyranyl ether (a compound wherein R and R' are hydrogen, X is oxygen, Y is formyl, and Z is

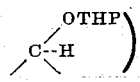

and 6-n-butylthiomethylene-4,5-seco-3-estryn-17β-ol-5-one 17-tetrahydropyranyl ether (a compound wherein Y is n-butyl-thiomethylene);

4. and 6 and 10-di- and tri-substituted compounds (i.e., both R' and Y are other than hydrogen) as exemplified by 6,6-dimethyl-4,5-seco-3-androstyn-17β-ol-5-one (i.e. R is H, R' is methyl, Y is

and Z is

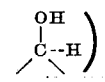

and the 17-acetate ester, 17-methyl ether and the 17-tetrahydropyranyl ether thereof;

6,6-di-(2'-propenyl)-4,5-seco-3-androstyn-17β-ol-5-one and the 17-tetrahydropyranyl ether thereof (i.e., R is H, R' is methyl, X is oxygen, Y is

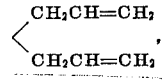

and Z is

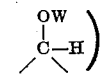

6,6-Pentamethylene-4,5-seco-3-androstyn-17β-ol and the 17-tetrahydropyranyl ether thereof, (i.e. R is H, R' is methyl, X is oxygen,

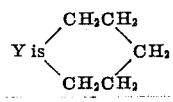

and Z is

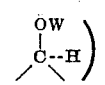

6,10β-di-(2'-propenyl)-4,5-seco-3-estryn-17β-ol-5-one 17-tetrahydropyranyl ether (R is H, X is oxygen, R' is 2'-propenyl, Y is

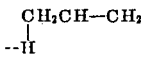

and Z is

6,6,10β-tri-(2'-propenyl)-4,5-seco-3-estryn-17β-ol-5-one 17-tetrahydropyranyl ether (R is H, X is oxygen, R' is 2'-propenyl,

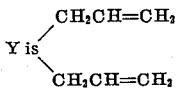

and Z is

6-n-butylthiomethylene-10β-n-todecyl-4,5-seco-3-estryn-17β-ol-5-one (R is H, X is oxygen, R' is n-dodecyl, Y is n-butyl-thiomethylene and Z is

6,6-dimethyl-17α,20-isopropylidenedioxy-4,5-seco-3-pregnyn-5-one

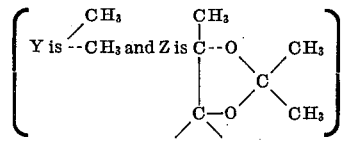

6,6-pentamethylene-17α,20-isopropylidenedioxy-4,5-seco-3-pregnyn-5-one

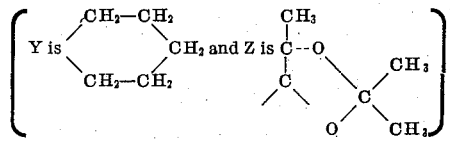

6,6-dimethyl-17α,20;20,21-bis-methylenedioxy-4,5-seco-3-pregnyn-5-one and the 11-keto derivative thereof

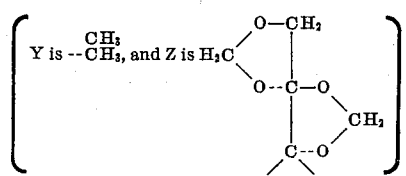

UTILITY OF 4,5-SECO COMPOUNDS OF THIS INVENTION

The 3'-keto-2,'3'-seco-1'(2')-yne-steroids of my invention such as those represented diagramatically by formulae I (a–f) and I' (a–f) in Chart A above, are useful mainly as intermediates in preparing new, substituted derivatives of the α,β-keto-steroids from whence they are derived (as represented diagramatically by the formulae listed in the first column in Chart A) via procedures discussed hereinbelow. Thus, utilizing compounds represented by formulae Ia and I'a, there are formed 1-methyl-10β-hydrocarbon (having up to 12 carbon atoms) substituted-3-keto-1-dehydro steroids;

from seco-compounds represented by formulae Ib and I'b, there are derived 7-keto-5-dehydro steroids substituted at C-10 and/or at C-4 by hydrocarbon radicals having up to 12 carbon atoms;

from seco-compounds represented by formulae Ic and I'c there are derived 6-keto-7-dehydro steroids substituted at 9 and/or at C-14 by hydrocarbon radicals having up to 12 carbon atoms;

from seco compounds represented by formulae Id and I'd there are derived 12-keto-9(11)-dehydro steroids substituted at C-10 and/or C-8 by a hydrocarbon radical having up to 12 carbon atoms;

from seco compounds represented by formulae Ie and I'e, there are derived 16-keto-14-dehydro steroids substituted at C-8 by a hydrocarbon having up to 12 carbon atoms, from the preferred seco compounds of this invention as represented by formulae If and I'f in Chart A (and by formula I above), there are derived 6 and/or 10-substituted steroidal derivatives which are further discussed hereinbelow.

The 6-unsubstituted 4,5-seco-3-estryn-5-ones and the 4,5-seco-3-androstyn-5-ones of the preferred species of the composition of matter aspect of my invention, in particular those compounds wherein Z is

and esters thereof, possess anti-androgenic activity. For example, when tested in the rat via the subcutaneous route, 4,5-seco-3-androstyn-17β-ol-5-one exhibited anti-androgenic activity at dosages about 10 mgm/kilogram and 4,5-seco-3-estryn-17β-ol-5-one exhibited antiandrogenic activity in doses as low as 1 mgm/kilogram body weight. The 6-unsubstituted 4,5-seco-3-androstyn-5-ones and the 6-unsubstituted 4,5-seco-3-estryn-5-ones are valuable in treating conditions which require an anti-androgen, e.g., in the treatment of benign prostatic hypertrophy in dogs.

The 4,5-seco-3-yne-5-ones such as those defined by formula I (and formulae If and I'f in Chart A) are useful mainly as intermediates via novel processes disclosed hereinbelow for the preparation of new steroid compounds as well as known, pharmacologically valuable steroids of the pregnane and androstane series including 1. 6-unsubstituted-10β-higher alkyl analogs of the pregnane and androstane series such as described in U.S. Pat. Nos. 3,309,386 and 3,309,387, and in French Patent No. 1,146,640.

Of these, by way of example, the A-ring-unsaturated-10β-n-propyl-androstenes (i.e., A-ring unsaturated-19-vinyl-androstenes) as exemplified by 10β-n-propyl-4-estrene-17β-ol-5-one (prepared via the novel compounds and processes of this invention as described in Examples 16, 20, and 21) are described in U.S. Pat. No. 3,309,386, useful as gonadotropin-inhibiting agents.

2. 6-spiroalkane derivatives (i.e., 6,6-cyclic-polymethylene derivatives) of steroids of the androstane and estrane series such as described and claimed in South African Patent No. 66/5332 and Netherlands Application 66,03861, and the 6-spiroalkane pregnanes in Netherlands Application Nos. 66,03861 and 66,03864, in British Patent No. 1,066,729, and in South African Patent No. 66/1036.

Of these, by way of example, the 6,6-ethyleneprogesterones (i.e., 6-spirocyclopropane-progesterones) as exemplified by 6,6-ethylene-17α-acetoxyprogesterone (prepared via the novel compounds and processes of this invention as described in Examples 28 and 39) are described in British published Patent No. 1,066,729 as possessing progestational activity via the oral and parenteral route and having a high degree of progestational activity via the parenteral route, and 3. in preparing 4,5-seco-3,5-dione analogs of the androstane and pregnane series some of which are known useful compounds, such as 4,5-seco-9-estryn-17β-ol-3,5-dione 17-acetals described in Belgian Patent No. 592,003, a useful intermediate to prepare 19-nor-9-dehydro-testosterone acetate; and 4,5-seco-19-nor-9-pregnene-3,5,20-trione described in U.S. Pat. No. 3,155,660 as a useful intermediate in the preparation of 19-nor-9-dehydroprogesterone.

The value of the 3'-keto-2'3'-seco-1'(2')-ynes of my invention as intermediates, is based upon my discovery that my novel 4,5-seco-5-keto-3-ynes may be readily ring closed to form normal 3-keto-Δ⁴-steroid compounds via either a direct, one-step, method by the action of mercuric acetate and sulfuric acid in acetic acid as solvent at reflux temperature for about two hours; or, alternatively via a two step procedure wherein a 5-keto-4,5-seco-3-yne of the general formula I above upon treatment at room temperature for about an hour with mercuric oxide and trifluoroacetic acid in aqueous dioxane as solvent is converted to another class of 4,5-seco compounds (some species of which are known in the art), i.e., the 3,5-diketo-4,5-seco steroids which, upon treatment with potassium tert.-butoxide in butanol, at reflux temperature for about three hours, are ring closed to a steroid of normal configuration. Both of these ring closure processes wherein my novel compounds are the requisite starting compounds, are illustrated diagramatically below via flow diagram, A being the remaining portion of a steroid molecule of the androstane and pregnane series:

Ring Closure Process A:

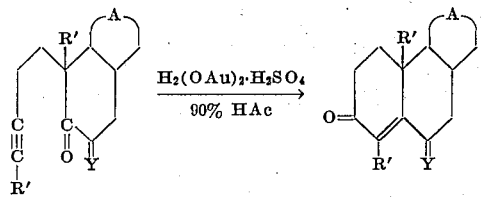

Ring Closure Process B:

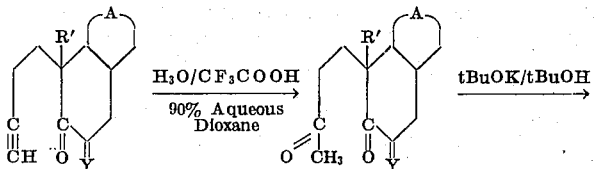

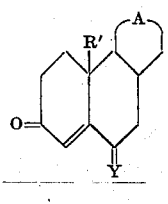

Examples 4-(Procedure 1), 12B, 17 and 33D of this application illustrate the novel ring closure process A. In these examples, 4,5-seco-3-androstyn-17β-ol-5-one, 4,5-seco-3-androstyn-5,17-dione, 4,5-seco-3-estryn-17β-ol-5-one 17-acetate and 6-n-butylthiomethylene-4,5-seco-3-androstyn-17β-ol-5-one are each treated with mercuric acetate and sulfuric acid in aqueous dioxane to form, respectively, testosterone, 4-androstene-3,17-dione, 19-nor-testosterone acetate, and 6-n-butylthiomethylene testosterone 17-acetate.

Examples 4 (Procedure2), 6, 9, 11, 14, 15, 21, 23, 25 (B–F), 29 (B–E) and 30 (B–E), 32 (C–F) and 34 (B–D) of this application illustrate ring closure Procedure B. In these examples, each of the following compounds of my invention:

1. 4,5-Seco-3-androstyn-17β-ol-5-one
2. 6,6-Dimethyl-4,5-seco-3-androstyn-17β-ol-5-one 17-methyl ether
3. 6,6-Di-(2'-propenyl)-4,5-seco-3-androstyn-17β-ol-5-one
4. 6,6-Pentamethylene-4,5-seco-3-androstyn-17β-ol-5-one
5. 6,6-Dimethyl-4,5-seco-3-androstyn-17β-ol-5-one 17-acetate
6. 10β-n-Propyl-4,5-seco-3-estryn-17β-ol-5-one,
7. 6,10-Di-(2'-propenyl)-4,5-seco-3-estryn-17β-ol-5-one
8. 6,6,10-Tri-(2'-propenyl)-4,5-seco-3-estryn-17β-ol-5-one 17-tetrahydropyranyl ether
9. 6-n-Butylthiomethylene-10-n-dodecyl-4,5-seco-3-estryn-17β-ol-5-one
10. 6,6-Dimethyl-17α,20-isopropylidenedioxy-4,5-seco-3-pregnyn-5-one
11. 6,6-Pentamethylene-17α,20-isopropylidenedioxy-4,5-seco-3-pregnyn-5-one
12. 6,6-Dimethyl-17α,20;20,21-bis-methylenedioxy-4,5-seco-3-pregnyn-5-one and the 11-keto derivative thereof, upon reaction with Mercuric oxide and trifluoroacetic acid in aqueous dioxane are converted to the corresponding 3,5-diketo-4,5-seco-derivative, respectively, i.e.

1. 4,5-Seco-3-androstan-17β-ol-3,5-dione
2. 6,6-Dimethyl-4,5-seco-3-androstan-17β-ol-3,5-dione 17-methyl ether
3. 6,6-Di-(2'-propenyl)-4,5-seco-3-androstan-17β-ol-3,5-dione
4. 6,6-Pentamethylene-4,5-seco-3-androstan-17β-ol-3,5-dione
5. 6,6-Dimethyl-4,5-seco-3-androstan-17β-ol-3,5-dione 17-acetate
6. 10β-n-Propyl-4,5-seco-3-estran-17β-ol-3,5-dione
7. 6,10β-Di-(2'-propenyl)-4,5-seco-3-estran-17β-ol-3,5-dione
8. 6,6,10β-Tri-(2'-propenyl)-4,5-seco-3-estran-17β-ol-3,5-dione 17-tetrahydropyranyl ether
9. 6-n-Butylthiomethylene-10-n-dodecyl-4,5-seco-3-estran-17β-ol-3,5-dione
10. 6,6-dimethyl-17α,20-isopropylidenedioxy-4,5-seco-3-pregnane-3,5-dione
11. 6,6-Pentamethylene-17α,20-isopropylidenedioxy-4,5-seco-3-pregnan-3,5-dione and
12. 6,6-Dimethyl-17α,20;20,21-bis-methylenedioxy-4,5-seco-3-pregnane-3,5-dione and the 11-keto derivative thereof, In the second step of Ring Closure Process B, each of the foregoing compounds in turn upon treatment with potassium tert.-butoxide in tert.-butanol is ring closed to form the following 3-keto-$\Delta^4$-steroids, respectively 1. testosterone,
2. 6,6-dimethyltestosterone 17-methyl ether,
3. 6,6-di-(2'-propenyl)-testosterone,
4. 6,6-pentamethylene-testosterone,
5. 6,6-dimethyltestosterone 17-acetate,
6. 10$\beta$-n-propyl-19-nortestosterone,
7. 6,10$\beta$-di-(2'-propenyl)-19-nortestosterone,
8. 6,6,10$\beta$-tri-(2'-propenyl)-19-nortestosterone 17-tetra hydropyranyl ether,
9. 6-n-butylthiomethylene-10-n-dodecyl-19-nortestosterone,
10. 6,6-dimethyl-17$\alpha$,20-propylidenedioxy-4-pregnene-3-one (which upon hydrolysis in acetic acid is converted to the 17$\alpha$,20-diol which, in turn, upon oxidation with dicyclodihexylcarbodiimide pyridinium trifluoroacetate yields 6,6-dimethyl-17$\alpha$-hydroxyprogesterone),
11. 6,6-Pentamethylene-17$\alpha$,20-isopropylidenedioxy-4-pregnene-3-one which upon hydrolysis in acetic acid is converted to the 20,21-diol which, in turn, is oxidized at C-20 to yield 6,6-pentamethylene-17$\alpha$-hydroxyprogesterone (6-spirocyclohexane-17$\alpha$-hydroxyprogesterone) and
12. 6,6-Dimethyl-17$\alpha$,20;20,21-bis-methylenedioxy-4-pregnene-3-one and the 11-keto derivative thereof (each of which upon hydrolysis in aqueous acetic acid followed by re-esterification with acetic anhydride in pyridine yields
6,6-dimethyl-4-pregnene-17$\alpha$,21-diol-3,20-dione and 6,6-dimethyl cortisone.

Similarly, in Examples 35–43 are described the preparation of 10$\beta$-n-propyl-4,5-seco-3-yne-5-ones and 6,6-ethylene-4,5-seco-3-yne-5-ones (i.e., 6-spirocyclopropane-4,5-seco-3-yne-5-ones) of my invention and the conversion of my 4,5-seco-3-ynes to the therapeutically valuable 10$\beta$-n-propyl- and 6,6-ethylene-steroids of the androstane, estrane, and pregnane series disclosed and claimed in the aforementioned patents.

General Description of the Process Aspects of this Invention

First Process Aspect

The invention sought to be patented in its broadest process aspect is based upon my discovery that when there is introduced into a 1'-keto-2',3'-dehydro steroid (i.e. a steroid possessing an $\alpha,\beta$-unsaturated keto system) having a tertiary carbon at the 3'-position, both a hydrazone derivative and preferably a hydrocarbonsulfonylhydrazone derivative of the 1'-keto and an epoxy function across the 2',3'-double bond, the 1'-hydrazono-2',3'-epoxy steroidal derivative thereby formed undergoes fission between C-2' and C-3' with concomitant fragmentation and rearrangement in situ in the reaction mixture, either immediately, or upon standing at room temperatures, or upon heating at moderate temperatures in the range of from about 35°C to about 75°C, to form a novel class of compounds, i.e., the 3'-keto-2',3'-seco-1'(2')-yne steroids of the composition of matter aspect of this invention. I have discovered, further, that this reaction is of a general nature, and that formation of a 1'-hydrocarbonsulfonylhydrazono-2',3' -epoxy derivative of any 1'-keto-2',3'-dehydro system present in the steroid molecule, e.g. such as the 3-keto-$\Delta^1$-, 3-keto-$\Delta^4$-, 7-keto-$\Delta^5$-, 12-keto-$\Delta^{9(11)}$-6-keto-66$^7$-, and 16-keto-$\Delta^{14}$ moieties will result in fission between C-2' and C-3' and the formation of a 3'-keto-2',3'-seco-1'(2')-yne steroid, provided the carbon at C-3' is tertiary.

Thus, (with reference to Chart A) when each of 1$\alpha$,17$\alpha$-dimethyl testosterone (i.e. $\Delta^1$-3-keto) 3-acetoxy-3,5-cholestadiene-7-one (i.e., $\Delta^5$-7-keto), 3$\beta$-acetoxy-5$\beta$-hydroxy-7,22-lumis-tadiene-6-one (i.e. $\Delta^7$-6-keto), 9(11)-dehydrohecogenin-3-acetate (i.e. $\Delta^{8(11)}$-12-keto), 3$\beta$-acetoxy-14-androstene-16-one (i.e. $\Delta^{14}$-16-keto), and testosterone ($\Delta^4$-3-keto) are converted to the corresponding hydrazono-epoxy derivatives, e.g.

3-p-toluene-sulfonylhydrazono-1,2-oxido-1$\alpha$,17$\alpha$-dimethyl-androstan-17$\beta$-ol,
3-acetoxy-5,6-oxido-7-p-toluenesulfonylhydrazono-3-cholestene,
3$\beta$-acetoxy-5$\beta$-hydroxy-6-p-toluenesulfonylhydrazono-7,8-oxido-22-lumistene,
9,11-oxido-hecogenin 3-acetate 12-p-toluenesulfonylhydrazone,
14,15-oxido-16-p-toluenesulfonylhydrazono androstane and 3-p-toluenesulfonylhydrazono-4,5-oxido-androstan-17$\beta$-ol, fission and rearrangement of each of the foregoing derivatives occurs and there are formed seco-steroid compounds of my invention, e.g.

1,17$\alpha$-dimethyl-1,2-seco-3-androstyn-17$\beta$-ol-1-one
3-acetoxy-5,6-seco-3-dehydro-7-cholestyn-5-one
3$\beta$-acetoxy-5$\beta$-hydroxy-7,8-seco-22-dehydro-6-lumistyn-8-one,
9,11-seco-22$\alpha$,25a-11-spirostyn-3$\beta$-ol-9-one 3-acetate
3$\beta$-acetoxy-14,15-seco-16-androstyn-14-one and
4,5-seco-3-androstyn-17$\beta$-ol-5-one, respectively.

The preferred mode of carrying out my process is that wherein a 3-keto-$\Delta^4$ steroid is utilized as starting compound (e.g., testosterone) and there is prepared a 4,5-seco-5-keto-3-yne steroid of this invention (e.g., 4,5-seco-3-androstyn-17$\beta$-ol-5-one).

Discussed in detail below is the manner of carrying out the physical embodiments of the preferred species of the process aspect of this invention, it being understood that, in similar manner, any $\alpha,\beta$-unsaturated keto steroid can be reacted by my process to form a 3'-keto-2',3'-seco-1'(2')-yne steroid of this invention.

In carrying out my process, known techniques for preparing the epoxy and hydrazone derivatives are used. It is immaterial, furthermore, whether the epoxy function or hydrazone derivative is introduced first into the molecule, although I have found it more convenient to first prepare the epoxy derivative, or to use a known $\alpha$-epoxy-$\beta$-keto steroid as a starting compound.

Thus to prepare 4,5-seco-3-androstyn-17$\beta$-ol-5-one compound I, R = CH$_3$) or to prepare 4,5-seco-3-estryn-17$\beta$-ol-5-one (compound I, R is hydrogen) by my process, one can utilize either one of the sequences of reactions shown in below Chart B, i.e. (1) by first treating testosterone (or 19-nor-testosterone) with a known epoxidizing reagent (such as alkaline hydrogen peroxide) followed by treatment of the thereby formed 4,5-oxido-androstan-17$\beta$-ol3-one (or 4,5-oxido-estran-17$\beta$-ol-3-one) with a hydrocarbonsulfonylhydrazine (preferably p-toluenesulfonylhydrazine) in a lower alkanol according to standard procedures for making hydrazone derivatives of ketones or (2) alternatively, by first reacting testosterone (or 19-nor-testosterone) with p-toluenesulfonylhydrazine in ethanol followed by treatment of the thereby formed 3-p- toluenesulfonylhydrazono4-androsten-17β-ol (or, when R is H, 3-p-toluenesulfonylhydrazono4-estren-17β-ol) with an epoxidizing reagent, e.g., a per-acid such as m-chlorperbenzoic acid in methylene chloride. The steric configuration of the epoxy group at C-4,5 is immaterial to my process. Both the 4α,5α-oxido- and the 4β,5β-oxido intermediates 2ab undergo fission and rearrangement to form the 4,5-seco-5-keto-3-ynes of formula I.

In both procedures (1) and (2) shown below in Chart B, the reaction mixtures in which intermediary products 2 ab (and thence seco steroids I') are being formed are stirred at room temperature for relatively long periods of time, i.e. 9 hours in procedure (1) and 17 hours in procedure (2). When carrying out my process for the first time on an α,β-unsaturated steroid, it is desirable to take aliquots of the reaction mixture at intervals to determine via thin layer chromatographic and spectral data the progress of the reaction as evidenced by the amount of starting products (1a) or (1b) remaining in the reaction mixture.

is converted to 3,4-seco-3-androstyn-17βol-5-one (compund I, R is methyl) there are used techniques similar to those known in the art. Thus, to prepare the hydrocarbonsulfonylhydrazone derivatives, e.g. product 1b, a steroid having a keto moiety is usually dissolved in a lower alkanol to which is added at least a molar equivalent of a hydrazine and usually a hydrocarbonsulfonylhydrazine, preferably p-toluenesulfonylhydrazine and methanesulfonylhydrazine. Other sulfonylhydrazines may also be employed, such as ethane-sulfonylhydrazine, benzenesulfonylhydrazine, napthalene-β-sulfonylhydrazine, sulfonylhydrazine, ortho-toluenesulfonylhydrazine, metatoluenesulfonylhydrazine, and, 3,4-xylenesulfonylhydrazine.

Similarly, the epoxy function is introduced utilizing techniques known in the art as those utilizing alkaline tertiary alkyl hydroperoxides, such as t-butyl hydroperoxide, t- cumyl hydroperoxide, or by utilizing a per acid such as perbenzoic, perphthalic, m-chloroperbenzoic acid, and the like, in an inert solvent.

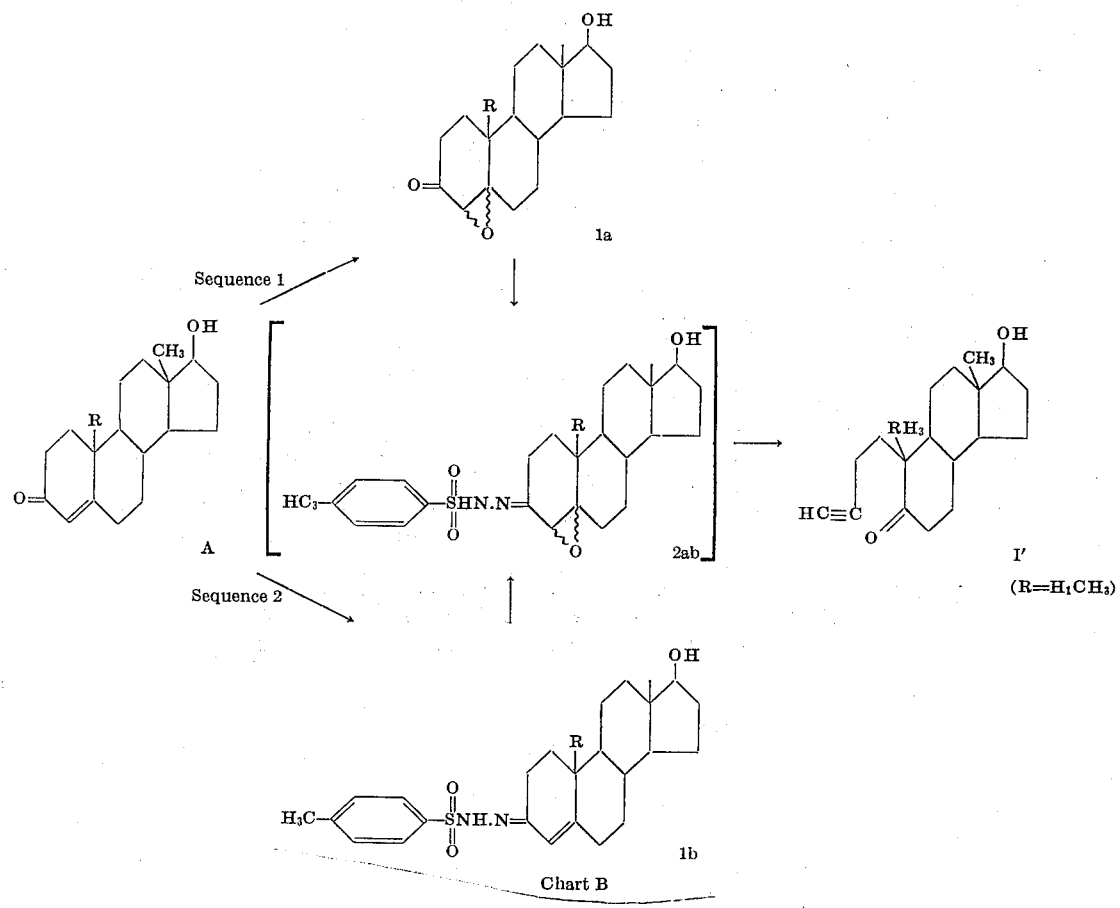

Chart B

The products (I) formed by my process, i.e. 4,5-seco-3-androstyn-17β-ol-5-one (when R is CH₃) and 4,5-seco-3-estryn-17β-ol-5-one (when R is H), via either of the above sequence of reactions, are conveniently isolated by treatment with water followed by extraction into an organic solvent. These products can be purified utilizing any of several techniques known in the art including, in particular, column and thin layer chromatography.

In carrying out the basic steps of my process as described in above procedures (1) and (2) (chart B) whereby testosterone (compound A wherein R is CH₃)

I have found it desirable when carrying out my process to utilize a per acid (e.g., perbenzoic acid) in an inert solvent, (e.g., methylene chloride) when introducing the epoxy function after the hydrazone derivative has been made; whereas alkaline hydrogen peroxide is my choice of epoxidizing reagent when introducing the epoxy group prior to the hydrazone derivative.

It is usually preferable to carry out my process under an atmosphere of an inert gas, such as argon or nitrogen. Second Process Aspect whereby groups are introduced on carbons vicinal the 3-carbon of the starting 1-keto-2,3-dehydro steroid which, in the case of the preferred species of this invention relates to the introduction of groups at C-6 and/or C-10.

Described above is a preferred mode of the basic first process aspect of my invention whereby a 3-keto-4-dehydro-steroid (e.g., testosterone and 19-nor-testosterone) upon epoxidation across the $\Delta^4$-bond and preparation of the p-toluenesulfonyl-hydrazone derivative of the 3-keto, is converted to form a 5-keto-4,5-seco-3-yne, product I, of my invention (e.g. 4,5-seco-3-androstyn-17$\beta$-ol-5-one and 4,5-seco-3-estryn-17$\beta$-ol-5-one, respectively).

In a second process aspect of my invention, 4,5-seco-3-yne-5-ones (prepared by the above described first process aspect), are further reacted in an alkylating medium, (such as those utilizing sodium hydride in tetrahydrofuran, butyl lithium in ethylene glycol dimethyl ether, or an alkali metal alkoxide in alkanol, e.g., potassium tert. butoxide is butanol or sodium methoxide in benzene, with a hydrocarbon sulfonate or, preferably, hydrocarbon halide including alkyl halides, aralkyl halides, alkenyl halides, e.g., methyl iodide, whereby (depending upon the quantity of reagent and the reaction conditions employed, in particular, temperature and length of reaction) any replaceable hydrogens on C-6 and/or C-10 are substituted by the hydrocarbon radical of said hydrocarbon halide (e.g., methyl) and there may be formed, for example, 6-methyl, 6,6-dimethyl, 10-methyl, 6,10-dimethyl or 6,6,10-trimethyl analogs of the starting 4,5-seco-3-yne-5-ones.

In carrying out the alkylating reactions of the second process aspect of my invention, it is preferable to protect any groups which might enter into a reaction with the reagents being employed. Thus, prior to subjecting the seco steroids to an alkylating agent according to this second process aspect of my invention, any secondary hydroxy groups present, such as at C-17, are protected either by esterification thereof or by preparation of the tetrahydropyranyl ether function.

Pregnane compounds having a cortical side chain at C-17 are desirably converted to a 17$\alpha$,20;20,21-bis-methylendioxy function, or to 17,21-acetonide derivatives. Similarly, in 17$\alpha$-hydroxyprogesterone compounds, the 20-keto group is desirably reduced to the corresponding 20-carbinol and the 17$\alpha$,20-diol thereby formed converted to the corresponding 17,20-acetonide prior to alkylation of a 6 and/or 10-unsubstituted-4,5-seco-5-keto-3-yne to a 6- and/or 10-hydrocarbon substituted 4,5-seco-5-keto-3-yne of my invention.

The second process aspect of my invention is based upon my discovery that, by utilizing alkylating techniques, hydrocarbon substituents may be introduced into the 6 and/or 10 positions of my novel 4,5-seco-5-keto-3-yne steroidal derivatives and that the C-10 tertiary hydrogen (when present) will alkylate prior to the secondary hydrogens at C-6. Furthermore, introduction of the second hydrocarbon group at C-6 usually requires forcing conditions (i.e. excess reagent, higher temperatures and longer reaction time). Thus, by varying the conditions under which the physical embodiment of the second process aspect is carried out, there may be obtained a 10-mono-, 6-mono-, 6,10-di-, or a 6,6,10-trisubstituted 4,5-seco-6-keto-3-yne of my invention.

Since, by my process, the carbon at C-10 undergoes alkylation prior to the carbon at C-6, the 10-alkyl- and 10-alkylene derivatives having up to 12 carbon atoms are conveniently prepared by the alkylation process aspect of my invention by reaction of a 19-nor-4,5-seco of formula I, i.e. 4,5-seco-3-estryn-17$\beta$-ol-5-one (after protection of the 17-hydroxyl group by preparation of an ester of tetrahydropyranyl ether thereof) with a molar equivalent of an alkyl halide, e.g., propyl iodide, in the presence of an alkylating medium, e.g., sodium hydride in tetrahydrofuran, under mild conditions, e.g., at room temperature for about 16 hours followed by a short period (1.5 hours) at about 60°C, whereby 10-n-propyl-4,5-seco-3-androstyn-17$\beta$-ol-5-one is formed (Example 20).

When starting with a 6 and 10-unsubstituted 4,5-seco-5-keto-3-yne of my invention, e.g., 4,5-seco-3-estryn-17$\beta$-ol-5-one, by using an excess of a hydrocarbon halide, together with heat and longer reaction times, there can be made 6,10-di- and 6,6,10-tri-substituted compounds. For example, 4,5-seco-3-estryn-17$\beta$-ol-5-one 17-tetrahydropyranyl ether in refluxing tetrahydro-furan in the presence of at least molar equivalents of sodium hydride to which has been added a large molar excess of 2-propenyl bromide will, after 17.5 hours be converted to 6,10-di-(2'-propenyl)-4,5-seco-3-androstyn-17$\beta$-ol-5-one 17-tetrahydro-pyranyl ether (Example 22A), whereas additional halide reagent, i.e., 2-propenyl bromide, is required plus a longer period of heating time, e.g., 72 hours at reflux temperature, in order to introduce the third 2'-propenyl group to obtain 6,6,10-tri-(2'-propenyl)-4,5-seco-3-androstyn-17$\beta$-ol-5-one 17-tetrahydro-pyranyl ether (Example 24A).

By combining varying alkylating reagents and techniques, there can be obtained derivatives having different substituents at C-6 and C-10. Thus, 4,5-seco-3-estryn-17$\beta$-ol-5-one (wherein the 17-hydroxy is protected by a 17-tetrahydropyranyl structure) upon treatment with sodium ethoxide in benzene and ethylformate at low temperatures is converted to 6-formyl-4,5-seco-3-estryn-17$\beta$-ol which, in turn, upon treatment in benzene with n-butyl-thiol in the presence of p-toluenesulfonic acid at reflux temperatures for short periods of time (e.g. 1–3 hours) will form the enol-thiol ether derivative of the 6-formyl group to produce 6-n-butylthiomethylene-4,5-seco-33stryn-17$\beta$-ol-5-one (Example 25B). Further treatment of the foregoing 4,5-seco steroid in a strongly basic alkylating medium (e.g. potassium tert.-butoxide in tert. butanol with an excess of dodecyl iodide under forcing conditions, i.e. at reflux temperature for 36 hours) according to the second process aspect of this invention is converted to 6-n-butylthiomethylene-10-dodecyl-3-androstyn-17$\beta$-ol novel steroidal derivatives of my invention.

In the foregoing procedure, the method of 6-formylation followed by enolization at C-6 via butyl-thiol, provides a means of introducing a novel substituent at C-6 prior to alkylation at C-10 in a 19-nor steroid to produce a 10-higher alkyl analog of the 4,5-seco-5-keto-3-ynes of my invention.

When utilizing methyl iodide as the alkylating hydrocarbon halide reagent, and an excess of reagent is used with respect to the molar quantity of starting steroid, all available hydrogens at C-6 and C-10 will alkylate with ease. Thus, when 4,5-seco-3-estryn-17$\beta$-ol-5-one 17-acetate and the 10-methyl analog thereof (i.e., 4,5-seco-3-androstyn-17$\beta$-ol-5-one 17-acetate) are each treated with an excess of methyl iodide in an alkylating medium such as butyl lithium in ethylene glycol dimethyl ether at room temperature for only 45 minutes, there is produced the 6,6,10-trimethyl derivative, i.e. 6,6,10-trimethyl-4,5-seco-3-estryn-17$\beta$-ol-5-one 17-acetate (identical to 6,6-dimethyl-4,5-seco-3-androstyn-17β-ol-5-one 17-acetate), Examples 15 A and 18.

Similarly, 4,5-seco-3-estryn-17β-ol-5-one and the 10-methyl analog thereof when treated in an alkylating medium such as sodium hydride in tetrahydrofuran with an excess of methyl iodide, will, upon stirring at 50°C for about 15 hours, be converted to the 6,6,10-trimethyl-17-methyl ether derivative, e.g., 6,6,-10-trimethyl-4,5-seco-3-(estryn)17β-ol-5-one 17-methyl ether (also named 6,6-dimethyl-4,5-seco-3-estryn-17β-ol-5-one 17-methyl ether) in admixture with some of the methyl ethinyl analog, i.e. 4,6,6-trimethyl-4,5-seco-androstan-17β-ol-5-one 17-methyl ether (Example 19).

Similarly 4,5-seco-3-pregnyn-17α,20-diol-5-one 17,20-acetonide, 4,5-seco-3-pregnyn-17α,21-diol-5,20-dione 17,20;20,21-bis-methylene dioxide and the 11-keto derivative thereof in an alkylating medium such as sodium hydride in tetrahydrofuran upon treatment with an excess of methyl iodide at 50°C for about 10–15 hours are each converted to the corresponding 6,6-dimethyl analogs, i.e., 6,6-dimethyl-4,5-seco-3-pregnyne-17α,20-diol-5-one 17,20-acetonide, 6,6-dimethyl-4,5seco-3-pregnyne-17α,21-diol-5,20-dione 17,20;20,21-bis-methylenedioxide and the 11-keto derivative thereof (Examples 29, 32, 34). When the acetonide and bis-methylenedioxy protective groups in the side chain at C-17 of the foregoing 4,5-seco-pregnanes of my invention are hydrolyzed in an acidic medium such as acetic acid, there is obtained respectively 6,6-dimethyl-4,5-seco-3-pregnyn-17α,20-diol-5-one (which upon oxidation with dicyclohexyldicarbodiimide and dimethylsulfoxide is converted to the corresponding 20-keto analog), 6,6-dimethyl 4,5-seco-3-pregnyn-17α,21 -diol-5,20-dione and 6,6-dimethyl-4,5 -seco-3-pregnyne-17α,21-diol-5,11,20-trione. The second process aspect of my invention provides a convenient means for introducing a spirocycloalkane derivative at C-6 into my novel 4,5-seco-5-keto-3-ynes. Thus, reaction of each of 4,5-Seco-3-androstyn-17β-ol-5-one 17-tetrahydropyranyl ether, 4,5-Seco-3-pregnyn-17α,20-diol-5-one 17,20-acetonide, and 4,5-Seco-3-pregnyne-17α,21-diol-5,11,20-trione 17,20;20,21-bis-methylenedioxide with sodium hydride in tetrahydrofuran followed by pentamethylene dibromide for about 16 hours at 70°C will yield, respectively, 6,6-Pentamethylene-4,5-seco-3-androstyn-17α-ol-5-one 17-tetrahydropyranyl ether, 6,6-Pentamethylene-4,5-seco-3-pregnyne-17α,20-diol-5-one 17,20-acetonide and 6,6-Pentamethylene-4,5-seco-3-pregnyne-17α,21-diol-5,11,20-trione 17α,20;20,21-bis-methylene dioxide (Examples 10A, 30).

Third Process Aspect

By means of a third process aspect of my invention, the 5-hydroxy-4,5-seco-3-ynes of my invention are derived from the corresponding 5-ones, in turn, prepared as described in the first two process aspects of my invention. The third process aspect of my invention comprises treating a 4,5-seco-5-one, e.g., 4,5-seco-3-androstyn-17α-ol-5-one, and 17α,20;20,21-bis-methylene-dioxy-4,5-seco-3-pregnyn-5-one, with a reducing agent which will not effect the alkinyl group at C-3, including alkali metal borohydrides such as lithium borohydride, potassium borohydride and, preferably, sodium borohydride in methanol, and the 5-keto is reduced to a 5-hydroxy function and there is formed respectively, 4,5-seco-3-androstyne-5,17α-diol and 17-α,20;20,21-bis-methylenedioxy-4,5-seco-3-pregnyn-5-ol.

Any reactive keto substituents present in the molecule are preferably protected prior to reduction with sodium borohydride by preparing functional derivatives thereof, such as dialkyl ketals, cyclic alkylene ketals, enol ethers and enol esters or, when they are present in the C-20 pregnane cortical side chain by preparing acetonide derivatives, e.g. 17α,21-acetonides or 17-α,20;20,21-bis-methylenedioxy derivatives.

The 5-hydroxy derivatives of my invention can be esterified utilizing known techniques, e.g., by lower alkanoic acid anhydride in pyridine or a hydrocarbon carboxylic acid halide, e.g., benzoyl chloride or a sulfonic acid chloride in pyridine. Thus 4,5-seco-3-androstyn-5,17α-diol-17-tetrahydro-pyranyl ether and 17α,20;20,21-bis-methylenedioxy-4,5-seco-3-pregnyn-5-ol upon treatment with either acetic anhydride or p-toluenesulfonyl chloride will yield the corresponding 5-ester, i.e., the 5-acetate and 5-p-toluenesulfonate, respectively.

In general, when carrying out any of the process aspects it is preferable to introduce into the normal steroid molecule prior to fission and rearrangement by the first process aspect of this invention, any protective groups which will be needed in any of the three process aspects of this invention. When the 4,5-seco-5-keto-3-yne steroidal derivatives thus prepared are to be utilized as intermediates for preparing pharmacologically valuable steroids as discussed hereinabove, the protective groups are conveniently retained until after ring closure of my seco compounds to a normal steroid structure. Alternatively, when the seco compounds are to be used per se, the protective groups, e.g., esters, ethers, acetonides, and bismethylene dioxy functions, can be removed after any one of the processes of this invention.

The above is a description of my invention concept and of physical embodiments thereof exemplifying the manner of making and using my invention. It is to be understood that my invention is not to be construed as limited to the above disclosed but as also encompassing equivalents thereof obvious to one skilled in the art of the class of chemistry to which this invention pertains.

EXAMPLE 1

4,5-Seco-3-androstyn-17β-ol-5-one

A. To a solution of 13.8 g. of 4,5-oxido-androstan-17β-ol-3-one in 1350 ml. of ethanol add 9 g. of p-toluenesulfonyl-hydrazine. Stir the reaction mixture for 2 hours at room temperature then pour into 3 liters of a saturated aqueous sodium chloride solution. Extract the aqueous mixture with three, liter portions of chloroform, then wash the combined chloroform extracts with 3 liters of a 5 percent sodium bicarbonate solution followed by 3 liters of 2N hydrochloric acid, and finally with 3 liters of water. Dry the chloroform solution of sodium sulfate, filter and evaporate in vacuo to a residue. Dissolve the residue in benzene and chromatograph on acid-washed alumina. Elute first and benzene followed by ether-benzene (1:4). Evaporate the combined benzene eluates to a residue comprising 4,5-seco-3-androstyn-17β-ol-5-one (2 g.). Evaporate the combined ether-benzene eluates to a residue comprising 4,5-seco-3-androstyn-17β-ol-5-one (9.5 g.).

Purify by sublimation at 110°C in vacuo ($10^{-2}$ mm Hg.). $[\alpha]_D + 29 \cdot \lambda max^{Nujol}$ 2.9, 3.0, 4.74, and 5.9 μ; nmr 6.4 τ (multiplet – C-17H), 8.0 τ (C 17-OH), 8.90 τ (C 19-3H), and 9.2 τ (C 18-3H).

B. Alternatively the compound of this example is also prepared utilizing methanesulfonylhydrazine as reagent as follows.

To a solution of 200 mg. of 4,5-oxido-androstan-17β-ol-3-one in 30 ml. of absolute ethanol add 80 mg. of methanesulfonylhydrazine. Stir the reaction mixture at room temperature under nitrogen for 9 hours then evaporate in vacuo to a residue. Chromatograph the residue on 20 g. of alumina, eluting with 5 percent ether-in-benzene to obtain 4,5-seco-3-androstyn-17β-ol-5-one (104 mg.) which is identical to the compound produced in above Example 1A. as determined by thin-layer chromatography (chloroform-ethyl acetate (1:1) - silica gel GF) and by infrared spectral analysis.

EXAMPLE 2

4,5-Seco-3-androstyn-17β-ol-5-one
(Via Alternate Starting Compound)

A. 4-Androsten-17β-ol-3-one 3-p-toluenesulfonylhydrazone

1. To 100 mg. (0.35 mmoles) of testosterone (4-androsten-17β-ol-3-one) in 15 ml. of absolute ethanol add 60 mg. (0.37 mmoles) of p-toluenesulfonylhydrazine. Stir the reaction mixture under an atmosphere of nitrogen for 15 hours at room temperature then pour into 75 ml. of ice water. Filter the reaction mixture and wash the residue with about 10 ml. of 1N hydrochloric acid, two 10 ml. portions of 5 percent aqueous sodium bicarbonate, and then with 10 ml. of water to obtain 4-androsten-17β-ol-3-one 3-p-toluenesulfonylhydrazone (60 mg.). m.p. 124°–139°C. dec., frothing, (darkens at 130°C.)

$\lambda max^{methanol}$ 259 mμ ε = 17,500

$\lambda max^{Nujol}$ 2.8 μ (NH); 3.1 μ (OH); 6.15 μ (C×C); 6.25 μ (N-H) 2. Alternatively, the compound of this example is prepared as follows:

Reflux a mixture of 5 gm. ($1.74 \times 10^{-2}$ moles) of testosterone and 3.55 gm. ($1.91 \times 10^{-2}$ moles) of p-toluene-sulfonylhydrazine in 125 ml. of absolute ethanol for 1.5 hours. Cool the reaction mixture and pour into 700 ml. of ice water. Extract the aqueous mixture with a one liter portion and then two 500 ml. portions of methylene chloride. Wash the combined methylene chloride extracts with two 400 ml. portions of 1N hydrochloric acid, followed by 400 ml. of 5 percent aqueous sodium bicarbonate, and finally with 400 ml. of saturated sodium chloride solution. Dry the methylene chloride solution over sodium sulfate, then concentrate under reduced pressure to 300 ml. comprising 4-androsten-17β-ol-3-one 3-p-toluene-sulfonylhydrazone in chloroform. This concentrated solution is used without further purification in following Example 2B B. 4,5-Seco-3-androstyn-17β-ol-5-one To the concentrated methylene chloride solution of 4-androsten-17β-ol-3-one 3-p-toluenesulfonylhydrazone (prepared as described in Example 2A-2) add 4.15 g. of 80 percent m-chloroperbenzoic acid ($1.91 \times 10^{-2}$ moles). Stir the reaction mixture for 17 hours at room temperature under an atmosphere of nitrogen. Wash the solution with two 400 ml. portions of 5 percent aqueous bisulfite, 400 ml. of 5 percent aqueous sodium bicarbonate and finally, with 400 ml. of saturated sodium chloride. Dry the methylene chloride solution over anhydrous sodium sulfate and evaporate in vacuo to a residue comprising 4,5-seco-3-androstyn-17β-ol-5-one (5.8 g.).

Purify this residue by chromatography on 150 g. of alumina, eluting with 5 percent ether in benzene. Evaporate the combined eluates in vacuo to a residue comprising 4,5-seco-3-androstyn-17β-ol-5-one (1.7 g.) which is identical to the compound produced in Example 1A, as determined by thin-layer chromatography and by infrared spectral analyses.

EXAMPLE 3

9,11-Seco-22α,25a-11-spirostyn-3β-ol-9-one 3-acetate

A. 9(11)-Dehydrohecogenin 3-acetate 12-p-toluenesulfonylhydrazone

Add 10 g. ($2.2 \times 10^{-2}$ moles) of 9(11)-dehydrohecogenin 3-acetate, 7.5 g. ($4 \times 10^{-2}$ moles) of p-toluenesulfonylhydrazine and 0.75 g. of p-toluenesulfonic acid to 800 ml. of absolute ethanol. Reflux the resulting solution for 60 hours under an atmosphere of nitrogen. Cool the reaction mixture and pour it into 3 liters of water. Filter the aqueous mixture and wash the residue with 1N hydrochloric acid followed by 5 percent aqueous sodium bicarbonate and finally, with saturated sodium chloride. Dry the washed precipitate in vacuo to yield 9(11)-dehydrohecogenin 3-acetate 12-p-toluenesulfonylhydrazone.

Purify by recrystallizing twice from methylene chloride-methanol.

m.p. 270–273°C. (dec.)

$\lambda_{max}^{Nujol}$ 3.05 μ, 5.83 μ, 6.23 μ, 8.15 μ, 8.65 μ, 12.4 μ.

B. 9,11-Seco-22α,25a-11-spirostyn-3β-ol-9-one 3-acetate

Dissolve 15 g. of 9(11)-dehydrohecogenin 3-acetate 12-p-toluenesulfonylhydrazone in 1800 ml. of methylene chloride and add 5.6 g. ($2.56 \times 10^{-2}$ moles) of 80 percent m-chloroperbenzoic acid. Stir the reaction mixture at room temperature for 24 hours under an atmosphere of nitrogen. Wash the methylene chloride solution with 500 ml. of 5 percent aqueous sodium bisulfite, 500 ml. of 5 percent aqueous bicarbonate and finally, with 500 ml. of saturated sodium chloride. Dry the methylene chloride solution over anhydrous sodium sulfate then evaporate in vacuo to a residue comprising 9,11-seco-22α,25a-11-spirostyn-3β-ol-9-one 3-acetate.

Purify by chromatography on 450 g. of alumina eluting with 10 percent ether in benzene. Evaporate the combined eluates to a residue, then crystallize the residue from methanol. m.p. 203.5°–207.5°C.

$\lambda_{max}^{Nujol}$ 3.05 μ (C ‑ CH), 4.65 μ (C ‑ C) 5.75μ (acetate).

EXAMPLE 4

Conversion of 4,5-seco-3-androstyn-17β-ol-5-one to prepare testosterone and testosterone acetate Procedure 1 - To a solution of 288 mg. of 4.5-seco-3-androstyn-17β-ol-5-one in 14 ml. of 90 percent acetic acid add 75 mg. of mercuric acetate and 0.05 ml. of concentrated sulfuric acid. Heat the reaction mixture at reflux temperature for 1.8 hours under an atmosphere of nitrogen then cool to room temperature and add 50 ml. of water. Extract the reaction mixture with chloroform, then evaporate the combined chloroform extracts to a residue of 295 mg. comprising testosterone (4-androsten-17β-ol-3-one) and testosterone acetate. Separate the mixture by thin layer chromatography on two 8×8 inches ×1 mm. Si - GF plates using chloroform-ethylacetate solvent system. Identify the components by ultraviolet absorption, then elute from the Si-GF plates with acetone to obtain 167 mg. of testosterone acetate (product 4A) and 20 mg. of testosterone (product 4B). Recrystallize 4A from methylene chloride-ether and 4B from ether to obtain products having a melting point, infrared spectrum and thin layer chromatographic mobility identical to that of authentic samples thereof. Procedure 2 - To a solution of 1 g. of 4,5-seco-3-androstyn-17β-ol-5-one (compound of Example 1) in 35 ml. of dioxane and 17 ml. of water add 0.1 g. of mercuric oxide and 0.3 ml. of trifluoroacetic acid. Stir the reaction mixture for one hour at room temperature, then add 400 ml. of water and extract with chloroform. Wash the combined chloroform extracts with 2N hydrochloric acid, 15 percent aqueous sodium bicarbonate, and finally water. Dry the chloroform solution over sodium sulfate and evaporate in vacuo to 800 mg. of a residue comprising 4,5-seco-androstan-17β-ol-3,5-dione (compound 4C), a homogeneous product as determined by thin layer chromatography (Si - GF with an ether solvent system). Purify by crystallization from ether; m.p. 112°–113°C $[\alpha]_D$ + 43° (CHCl$_3$), $\lambda_{max}^{Nujol}$ 2.9 (OH) and 5.85 (C=O), nmr: 6.2–6.5 (C$_{17}$–H), 7.53 (C$_{17}$–OH), 7.83 (C$_4$–3H); 8.89 (C$_{19}$–3H) and 9.20 τ (C$_{18}$–3H).

In a manner similar to that described in Example 6B, treat 4,5-seco-androstan-17β-ol-3,5-dione (compound 4C) with potassium tert.-butoxide in tert.-butanol. Isolate the resultant product in a manner similar to that described to obtain testosterone (compound 4B).

EXAMPLE 5

6,6-Dimethyl-4,5-seco-3-androstyn-17β-ol-5-one 17-methyl ether and 4,6,6-Trimethyl-4,5-seco-3-androstyn-17β-ol-5-one 17-methyl ether To a stirred solution of 1.8 g. of sodium hydride in 30 ml. of tetrahydrofuran under a nitrogen atmosphere add dropwise a solution of 2 g. of 4,5-seco-3-androstyn-17β-ol-5-one (compound of Example 1) in 30 ml. of tetrahydrofuran. Heat the reaction mixture for 2 hours at 50°C then cool to room temperature and add dropwise 12 ml. of methyl iodide. Heat the reaction mixture at 50°C for 16 hours, cool to room temperature and decompose any excess sodium hydride with water. Add an additional 150 ml. of water then 150 ml. of ether and separate the organic layer from the aqueous layer. Wash the ethereal solution with water then dry over sodium sulfate and evaporate the ether in vacuo to a residue comprising 6,6-dimethyl-4,5-seco-3-androstyn-17β-ol-5-one 17-methyl ether (compound 5A) and 4,6,6-trimethyl-4,5-seco-3-androstyn-17β-ol-5-one 17-methyl ether (compound 5B). Purify and separate compounds 5A and 5 B as follows. Dissolve the residue in benzene and chromatograph on Merck acid washed alumina. Elute with benzene-hexane, combine the eluates and evaporate to a residue comprising 4,6,6-trimethyl-4,5-seco-3-androstyn-17β-ol-5-one 17-methyl ether (compound 5B). Purify by sublimation at 50°C and 10$^{-5}$ mm Hg, $\lambda_{max}^{Nujol}$ 3.0, 4.7 and 5.9 μ. nmr 6.7 (C17-O-CH$_3$), 8.25 (doublet J = 2 cps) (C$_4$–CH$_3$), 8.94 (C$_{19}$–CH$_3$), 9.03 (2×C$_6$–CH$_3$) and 9.17 τ (C$_{18}$–CH$_3$).

Elute with benzene and evaporate the combined eluates to obtain 6,6-dimethyl-4,5-seco-3-androstyn-17β-ol-5-one 17-methyl ether (compound 5A). Purify by crystallization from ethanol, m.p. 96°–98°C $\lambda_{max}^{Nujol}$ 3.0, 4.7 and 5.9 μ. nmr 6.7 (C$_{17}$–OCH$_3$), 8.93 and 8.96 (C$_6$–CH$_3$), 8.88 (C$_{19}$–CH$_3$) and 9.18 (C$_{19}$–CH$_3$).

EXAMPLE 6

Conversion of 6,6-dimethyl-4,5-seco-3-androstyn-17β-ol-5-one 17- methyl ether to 6,6-dimethyl testosterone 17-methyl ether A. 6,6-Dimethyl-4,5-seco-androstan-17β-ol-3,5-dione To a slurry of 60 mg. red mercuric oxide and 0.1 ml. trifluoroacetic acid add a solution of 500 mg. 6,6-dimethyl-4,5-seco-3-androstyn-17β-ol-5-one 17-methyl ether (compound 5A) in 50 ml. dioxane and 8 ml. water. Stir the reaction mixture for 2 hours at room temperature, then add 200 ml. water and extract with chloroform. Wash the combined chloroform extracts with saturated aqueous sodium bicarbonate solution, 3 percent hydrochloric acid, and finally with water. Dry the solution over sodium sulfate and evaporate in vacuo to a residue of 496 mg. comprising 6,6-dimethyl-4,5-seco-androstan-17β-ol-e,5-dione 17-methyl ether (compound 6A), together with an impurity which appear at the origin on a thin layer plate (Si - GF benzene-ether solvent system). Purify by chromatography on a short silica gel column eluting with benzene-ether (1:1). Distill the combined eluates to give 6,6-dimethyl-4,5-seco-androstan-17β-ol-3,5-dione (256 mg.).

To obtain an analytical sample, purify further by repeated crystallization from methylene chloride-methanol, m.p. 161°–162°C; $[\alpha]_D^{24}$ –14.1° (CHCl$_3$), $\lambda_{max}^{Nujol}$ :5.83–5.93 μ

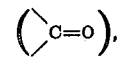

nmr; 6.67 (OCH$_3$),

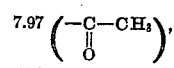

8.85 (C$_{19}$–CH$_3$), 8.90 (C$_6$–CH$_3$), 8.96 (C$_6$–CH$_3$) and 9.17τ(C$_{18}$–CH$_3$).

B. 6,6-Dimethyl-testosterone 17-methyl ether (6,6-Dimethyl-4-androsten-17β-ol-3-one 17-methyl ether)

To a solution of 227 mg. 6,6-dimethyl-4,5-seco-androstan-17β-ol-3,5-dione 17-methyl ether (compound 6A) in 15 ml. dry t-butanol, add 75 mg. potassium tertiary butoxide. Heat the reaction mixture at reflux temperature for 3 hours, then pour into 100 ml. water. Acidify the aqueous solution with 3 percent hydrochloric acid, extract with chloroform, and wash the combined chloroform extracts with water. Dry the solution over sodium sulfate and evaporate in vacuo to a residue (175 mg.) comprising 6,6-dimethyl-testosterone 17-methyl ether (compound 6B).

Purify by sublimation at 110°C and 10$^{-5}$ mm; m.p. 92°–96°C $\lambda_{max}^{Nujol}$; 6.0 (–C=O), 6.24 μ (–C=C–), nmr: 4.07 (C$_4$–H); 6.67 (OCH$_3$), 6.6–6.9 (C$_{17}$–H), 8.70 (C$_{19}$–CH$_3$), 8.82 and 8.86 (2 × C$_6$–CH$_3$) and 9.17 τ(C$_{18}$–CH$_3$).

EXAMPLE 7

4,5-Seco-3-androstyne-5β,17β-diol

To a solution of 0.6 g. 4,5-seco-3-androstyne-17β-ol-5-one in 80 ml. of methanol add 1.2 g. sodium borohydride. Stir the reaction mixture for one hour at room temperature then add an additional 1.2 g. of sodium borohydride and stir for an additional 16 hours at room temperature. Pour the reaction mixture into 200 ml. of ice water and extract two times with 150 ml. portions of chloroform. Wash the combined extracts with water, dry over sodium sulfate and evaporate in vacuo to a residue (430 mg.) comprising 4,5-seco-3-androstyne-5β,17β-diol. Purify by crystallization from methylene chloride-ether and recrystallize from ether-hexane; m.p. 120°–125°C, $[α]_D^{25}$ 9° (CHCl$_3$), $λ_{max}^{Nujol}$ 3.0 (C = C-H and OH) 4.68 μ (C = C), nmr: 9.17 (C$_{19}$–3H) and 9.28 τ(C$_{18}$–3H).

EXAMPLE 8

6,6-Di-(2-propenyl)-4,5-seco-3-androstyn-17β-ol-5-one

A.   4,5-Seco-3-androstyn-17β-ol-5-one   17-tetrahydropyranyl ether

To a solution of 10 g. of 4,5-seco-3-androstyn-17β-ol-5-one in 30 ml. of dry benzene add 10 mg. of p-toluenesulfonic acid and 0.6 ml. of dihydropyran. Stir the reaction mixture for 2 hours at room temperature, then add water and separate the organic solution from the aqueous phase. When the organic solution with water then dry over sodium sulfate and evaporate the benzene and excess dihydropyran in vacuo to a residue comprising 4,5-seco-3-androstyn-17β-ol-5-one 17-tetrahydropyranyl ether.

Purify by chromatography on silica gel eluting with benzene. Distill the benzene from the combined eluates to a residue comprising 4,5-seco-3-androstyn-17β-ol-5-one 17-tetra-hydropyranyl ether, $λ_{max}^{film}$ 3.0 and 4.7 (C = CH) and 5.85 μ (C=O). This compound is used without further purification in the procedure of Example 8B. B. 6,6-Di-(2-propenyl)-4,5-seco-3-androstyn-17β-ol-5-one 17-tetrahydropyranyl ether To a slurry of 3.2 g. of a 50 percent suspension of sodium hydride in mineral oil and 55 ml. of tetrahydrofuran, add dropwise a solution of 3.7 g. 4,5-seco-3-androstyn-17β-ol-5-one 17-tetra-hydropyranyl ether in 55 ml. of tetrahydrofuran. Heat the reaction mixture at reflux temperature for 2 hours under an atmosphere of nitrogen then cool to room temperature. Over a period of 20 minutes add dropwise a solution of 5.2 g. 1,3-dibromopropane in 55 ml. of tetrahydrofuran. Heat the reaction mixture at reflux temperature for 18 hours, cool to room temperature, decompose any excess sodium hydride with water, then add 400 ml. of ether. Wash the ether solution with water and dry over sodium sulfate and remove the solvent in vacuo to a residue comprising 6,6-Di-(2'-propenyl)-4,5-seco-3-androstyn-17β-ol-5-one 17-tetrahydropyranyl ether. Purify by dissolving in benzene and chromatographing on 150 g. of Merck acid washed aluminum eluting with benzene-hexane. Distill the combined eluates to a residue comprising 6,6-Di-(2'-propenyl)-4,5-seco-3-androstyn-17β-ol-5-one 17-tetrahydropyranyl ether (yield = 2.6 g.).

Prepare an analytical sample by sublimation at 10$^{-4}$ mm and 80°C. $λ_{max}^{film}$ 3.0 and 4.7 (C = C-H), 3.25, 6.1, and 10.9

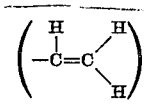

and 5.9 μ (C=O)

nmr 4.9 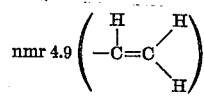

8.95 (C$_{19}$–3H), and 9.16 τ (C$_{18}$–3H).

C. 6,6-Di-(2-propenyl)-4,5-seco-3-androstyn-17β-ol-5-one

To a solution of 0.26 g. of 6.6-(2'-propenyl)-4,5-seco-3-androstyn-17β-ol-5-one in 12 ml. of methanol, add 1.3 ml. of water followed by 0.5 ml. 12N hydrochloric acid. Stir the reaction mixture for 2 hours at room temperature, add 25 ml. of water and extract the solution with chloroform. Remove the chloroform from the combined extracts in vacuo to give 250 mg. of a residue comprising 6,6-di-(2'-propenyl)-4,5-seco-androstyn-17β-ol-5-one. Purify by sublimation at 10$^{-4}$ mm Hg and 80°C. $λ_{max}^{Nujol}$ 2.9 (–OH) 3.0 and 4.7 (C = CH), 3.25, 6.1, and 10.9

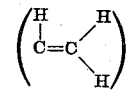

and 5.9 μ (C=O).

EXAMPLE 9

Conversion of 6,6-di-(2'-propenyl)-4,5-seco-3-androstyn-17β-ol-5-one to 6,6-di-(2'-propenyl)-testosterone A. 6,6-Di-(2'-propenyl)-4,5-seco-17β-ol-3,5-dione To a suspension of 0.1 g. red mercuric oxide in 30 ml. of 20 percent aqueous dioxane containing 0.1 ml. of trifluoroacetic acid, add dropwise a solution of 1.0 g. 6,6-di-(2'-propenyl)-4,5-seco-3-androstyn-17β-ol-5-one 17-tetrahydropyranyl ether in 30 ml. of 33 percent aqueous dioxane. Stir the reaction mixture for about 15 minutes and when the solution becomes cloudy add an additional 5 ml. of dioxane. Stir the reaction mixture at room temperature for an additional 20 hours, then add 2 ml. of 12N hydrochloric acid and continue stirring for an additional 2 hours. Add the reaction mixture to 400 ml. of a saturated sodium chloride solution and extract four times with 100 ml. portions of chloroform. Wash the combined chloroform extracts with water and dry over sodium sulfate and evaporate in vacuo to a residue (790 mg.) comprising 6,6-di-(2'-propenyl)-4,5-seco-androstan-17β-ol-3,5-dione. Purify by dissolving in benzene and chromatographing on 25 g. of silica gel-G eluting with ether. Distill the eluates comprising 6,6-di-(2'-propenyl)-4,5-seco-17β-ol-3,5-dione (purified yield = 600 mg.).

Prepare an analytical sample by sublimation at 10$^{-4}$ mm at 80°: $[α]_D$ –3; $λ_{max}^{Nujol}$ 2.8 (-OH), 3.0 and 4.7 (C = C-H) 3.25, 6.1 and 10.9

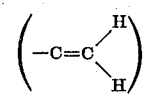

and 5.9 μ (2 × –C=O).

B. 6,6-Di-(2'-propenyl)-4-androsten-17β-ol-3-one (6,6-Di-(2'-propenyl)-testosterone)

To a solution of 150 mg. of 6,6-di-(2'-propenyl)-4,5-seco-androstan-17β-ol-3,5-dione in 15 ml. of t-butanol, add 50 mg. of potassium tertiary butoxide. Stir the reaction mixture at room temperature for 1.5 hours, at reflux temperature for 6 hours, at 40°C for an additional 17 hours and then cool to room temperature. Add the reaction mixture to 50 ml. of water, neutralize with 2N hydrochloric acid and extract three times with 25 ml. portions of chloroform. Wash the combined chloroform extracts with water, dry over sodium sulfate and distill the chloroform in vacuo to a residue (129 mg.) comprising 6,6-di-(2'-propenyl)-4-androsten-17β-ol-3-one (6,6-di-(2'-propenyl)-testosterone). Purify by repeated crystallization from acetone; m.p. 196°-198°C; [α]$_D$ + 55 (CHCl$_3$), λ$_{max}^{Nujol}$ 2.85 (—OH), 6.0 (C=O), 6.1 (C=C) and 6.23 and 10.9 μ

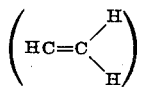

nmr 4.27 (4H); 4.83

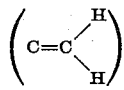

5.1 (HC=C), 8.68 (C$_{19}$-3H) and 9.18 (C$_{18}$-3H). δ$_{max}^{MeOH}$ 245 mμ (8700).

EXAMPLE 10

6,6-Pentamethylene-4,5-seco-3-androstyn-17β-ol-5-one

A. 6,6-Pentamethylene-4,5-seco-3-androstyn-17β-ol-5-one 17-tetrahydropyranyl ether To a stirred slurry of 0.43 g. of sodium hydride in 30 ml. of dry tetrahydrofuran under an atmosphere of nitrogen, add dropwise over a period of 10 minutes a solution of 2.2 g. of 4,5-seco-3-androstyn-17β-ol-5-one 17-tetrahydropyranyl ether in tetrahydrofuran. Heat the reaction mixture at reflux temperature for two hours, then cool to room temperature and add dropwise over a period of ten minutes a solution of 1.38 g. of 1,5-dibromopentane in tetrahydrofuran. Heat the reaction mixture for 16 hours at 70°C, cool to room temperature, then decompose the excess sodium hydride by the dropwise addition of water, then add 100 ml. of water followed by 100 ml. of ether. Wash the ethereal solution with water, dry over sodium sulfate, then remove the solvents in vacuo. Dissolve the resultant residue in benzene and chromatograph on 70 grams of Merck acid washed alumina eluting with hexane-benzene. Evaporate the eluates to a residue comprising 6,6-pentamethylene-4,5-seco-3-androstyn-17β-ol-5-one 17-tetrahydropyranyl ether (yield = 0.6 g.); λ$_{max}^{film}$ 3.0 (C≡C-H), 4.7 (C≡C) and 5.9 μ (C=O).

This compound is used without further purification in the procedure of Example 10B immediately following.

B. 6,6-Pentamethylene-4,5-seco-3-androstyn-17β-ol-5-one

To a solution of 0.4 g. of 6,6-pentamethylene-4,5-seco-3-androstyn-17β-ol-5-one 17-tetrahydropyranyl ether in 20 ml. of 10 percent aqueous methanol add dropwise 0.5 ml. of 12N hydrochloric acid. Stir the reaction mixture for three hours at room temperature, then add 10 ml. of water and 10 ml. of chloroform. Extract the aqueous phase two additional times with 10 ml. portions of chloroform. Dry the combined chloroform extracts over sodium sulfate, then evaporate in vacuo. Dissolve the resulting residue in benzene and chromatograph on 12 g. of silica gel-6 eluting with a solution of 5 percent ether in benzene. Evaporate the eluates to a residue comprising 6,6-pentamethylene-4,5-seco-3-androstyn-17β-ol-5-one (yield= 0.260 g.). Prepare an analytical sample by sublimation at 10$^{-4}$ mm at 80°C; λ$_{max}^{film}$ 2.9 (-OH), 3.0 and 4.7 (C≡C-H); and 5.9 μ (C=O).

EXAMPLE 11

6,6-Pentamethylene-testosterone (6,6-pentamethylene-4-androsten-17β-ol-3-one)

Conversion of 6,6-pentamethylene-4,5-seco-3-androstyn-17β-ol-5-one to 6,6-pentamethylene-testosterone A. 6,6-Pentamethylene-4,5-seco-androstan-17β-ol-3,5-dione To a slurry of 0.11 g. of red mercuric oxide in 20 ml. of dioxane containing 0.1 ml. trifluoroacetic acid, add dropwise a solution of 0.625 g. of 6,6-pentamethylene-4,5-seco-3-androstyn-17β-ol-5-one in 15 ml. of 33 percent aqueous dioxane. Stir the reaction mixture for 5 hours at room temperature under an atmosphere of nitrogen, then pour into 200 ml. of water and extract several times with 100 ml. portions of chloroform. Wash the combined chloroform extracts with a 5 percent aqueous sodium bicarbonate solution followed by a 2N hydrochloric acid solution, and finally with water. Dry the chloroform solution over sodium sulfate, then remove the chloroform in vacuo to a residue (0.600 g.) comprising 6,6-pentamethylene-4,5-seco-androstan-17β-ol-3,5-dione. Purify by crystallization from acetone. Prepare an analytical sample by recrystallization from acetone; m.p. 112°-113°C [α]$_D$7(CHCl$_3$), λ$_{max}^{Nujol}$ 2.8 (-OH) and 5.85 μ (C=O). nmr: 7.88 (C$_4$-3H); 8.92 (C$_{19}$-3H); 9.2 τ (C$_{18}$-3H).

B. 6,6-Pentamethylene-testosterone

To a stirred solution of 0.300 g. of 6,6-pentamethylene-4,5-seco-androstan-17β-ol-3,5-dione in 30 ml. of t-butyl alcohol add 0.1 g. of potassium tertiary butoxide. Heat the reaction mixture at reflux temperature for 6 hours under an atmosphere of nitrogen and stir for an additional 16 hours at room temperature. Pour the reaction mixture into 100 ml. of water and neutralize the resulting solution with 2N hydrochloric acid, then extract with three 75 ml. portions of chloroform. Wash the combined chloroform extracts with water, dry over sodium sulfate, then remove the chloroform in vacuo. Crystallize the resultant residue (0.227 g.) from acetone to give 6,6-pentamethylene-testosterone. Prepare an analytical sample by recrystallization from acetone; m.p. 181°-183°C; [α]$_D$ 121° (CHCl$_3$); λ$_{max}^{Nujol}$ 2.8 (-OH), 6.0 (C=O), and 6.23μ(C=C); λ$_{max}^{EtOH}$ 245 mμ (ε14,400); nmr: 4.0 (C$_4$-H); 8.72 (C$_{19}$-3H); and 9.18τ(C$_{18}$-3H).

EXAMPLE 12

4,5-Seco-3-androstyne-5,17-dione and conversion thereof to 4-androstene-3,17-dione A. 4,5-Seco-3-androstyne-5,17-dione To a stirred solution of 0.38 g. of 4,5-seco-3-androstyn-17β-ol-5-one in 20 ml. of acetone, add chromium trioxide until a permanent yellow color appears. Add the reaction mixture to 75 ml. of ice and saturated sodium chloride solution, then extract with three 50 ml. portions of ether. Wash the combined ether extracts with water, dry over sodium sulfate and distill in vacuo to a residue (0.33 g.) comprising 4,5-seco-3-androstyne-5,17-dione. Purify by crystallization from ether. Prepare an analytical sample by recrystallization from ether; m.p. 116°-118°C [α]$_D$ 99 (CHCl$_3$); λ$_{max}^{Nujol}$ 3.0 (C≡CH), 4.7 (C≡C), 5.8 (C=O), and 5.9 μ (C=O). nmr: 8.9 (C$_{19}$-3H) and 9.07 τ (C$_{18}$-3H).

B. 4Androstene-3,17-dione

In a manner similar to that described in Example 4 (Procedure 1), treat 4,5-seco-3-androstyne-5,17-dione in acetic acid with mercuric acetate and concentrated sulfuric acid to obtain 4-androstene-3,17-dione.

C. 4,5-Seco-3-estryne-5,17-dione and conversion thereof to 4-estrene-3,17-dione In a manner similar to that described in Example 12A, above, treat 4,5-seco-3-estryn-17β-ol-5-one (the compound of Example 16) in acetone with chromium trioxide and isolate and purify the resultant product to obtain 4,5-seco-3-estryne-5,17-dione (compound 12C) which in turn, upon treatment with mercuric acetate and concentrated sulfuric acid in acetic acid according to the procedure described in the above Example 12B is converted to 4-estrene-3,17-dione.

EXAMPLE 13

6,6-Dimethyl-4,5-seco-3-androstyn-17β-ol-5-one 17-acetate

A. 4,5-Seco-5-dehydro-3-androstyne-5,17β-diol diacetate

To a solution of 1.0 g. 4,5-seco-3-androstyn-17β-ol-5-one (compound of Example 1) in 12 ml. of carbon tetrachloride, add 3 ml. of acetic anhydride and two drops of 70 percent perchloric acid. Allow the solution to stand at room temperature for 1.5 hours, then dilute with ether to a volume of 150 ml. Wash the ether solution with saturated aqueous sodium bicarbonate, then water and dry over sodium sulfate. Distill the solution in vacuo to a residue (1.18 g.) comprising 4,5-seco-5-dehydro-3-androstyne-5,17β-diol diacetate. $\lambda_{max}^{film}$ 3.0 ( ≡ C-H), 4.72 (C ≡ C); 5.72 (enol acetate), 5.88 μ (acetate). nmr: 5.4 ($C_{17}$-H), 7.98 (2 × acetate), 8.92 ($C_{19}$-3H) and 9.13τ($C_{18}$-3H)

This product is used without further purification in the following Example 13B.

B. 6,6-Dimethyl-4,5-seco-3-androstyn-17β-ol-5-one 17-acetate

Into a dry nitrogen filled flask inject a solution of 12 ml. 1.6M n-butyl lithium in hexane. Evaporate the solvent in vacuo and to the residue add 5 ml. of dry ethylene glycol dimethyl ether in small portions, then add in 2 ml. portions a solution of 375 mg. of 4,5-seco-5-dehydro-3-androstyne-5,17β-diol diacetate in 10 ml. dry ethylene glycol dimethyl ether. Stir the reaction mixture at room temperature for 30 minutes then add 2 ml. of methyl iodide and stir the reaction mixture another 20 minutes. Stop the reaction by adding 3 percent hydrochloric acid to the solution, then dilute the two layers with ether and water. Wash the ether extract with aqueous sodium bicarbonate, then with water. Dry over sodium sulfate and evaporate in vacuo to a residue (376 mg.) comprising 6,6-dimethyl-4,5-seco-3-androstyn-17β-ol-5-one 17-acetate in admixture with a trace of 6,6-dimethyl-4,5-seco-3-androstyn-17β-ol-5-one 17-methyl ether as detected by nmr and some starting material. Separate the starting material from the product mixture by chromatography on two 8 × 8-inch 1-mm thick Si-GF plates (solvent system: benzene-ether (1:1)). $\delta_{max}^{film}$ 3.0 ( ≡ C-H); 4.72 (C ≡ C);

5.78 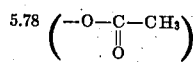

5.9 μ (-C=O). nmr: 5.4 (multiplet $C_{17}$-H); 7.96

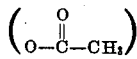

8.85 ($C_6$-$CH_3$); 8.92 ($C_{19}$-$CH_3$); 8.96 ($C_6$-$CH_3$); 9.13τ($C_{18}$-$CH_3$).

This product was used without further purification in the procedure of Example 14A.

EXAMPLE 14

Conversion of 6,6-dimethyl-4,5-seco-3-androstyn-17β-ol-5-one 17-acetate to 6,6-dimethyl-testosterone A. 6,6-Dimethyl-4,5-seco-androstan-17β-ol-3,5-dione 17-acetate To a solution of 133 mg. of 6,6-dimethyl-4,5-seco-3-androstyn-17β-ol-5-one 17-acetate containing a trace of 6,6-dimethyl-4,5-seco-3-androstyn-17β-ol-5-one 17-methyl ether (the product of Example 13B) in 7 ml. of glacial acetic acid, add 40 mg. of mercuric acetate and 0.02 ml. of concentrated sulfuric acid. Heat the reaction mixture to 115°C and stir at 115°C for 20 minutes, then stir for another 40 minutes at room temperature. Pour the reaction mixture into water and extract the resultant precipitate with ether. Wash the combined ether extracts with aqueous sodium bicarbonate, 3 percent hydrochloric acid, then water. Dry over sodium sulfate and distill the ether in vacuo to a residue (129 mg.) comprising 6,6-dimethyl-4,5-seco-androstan-17β-ol-3,5-dione 17-acetate containing a trace of 6,6-dimethyl-4,5-seco-androstan-17β-ol-3,5-dione 17-methyl ether as detected by nmr. $\delta_{max}^{film}$

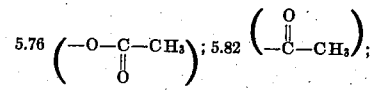

5.9 μ (C=O). nmr 5.4 ($C_{17}$-H),

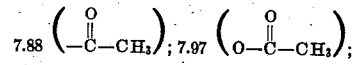

8.87 ($C_6$-$CH_3$); 8.92 ($C_{19}$-$CH_3$); 8.96 ($C_6$-$CH_3$); 9.13τ($C_{18}$-$CH_3$). This product was used without further purification in procedure 14B immediately following.

B. 6,6-Dimethyl-4,5-seco-androstan-17β-ol-3,5-dione

To a solution of 129 mg. of 6,6-dimethyl-4,5-seco-androstan-17β-ol-3,5-dione 17-acetate containing a trace of 6,6-dimethyl-4,5-seco-androstan-17β-ol-3,5-dione 17-methyl ether (the product of Example 14A) in 15 ml. of dioxane, add 2 ml. of 25 percent aqueous potassium hydroxide solution. Stir the reaction mixture at 110°C for 6 hours, then cool to room temperature and stir an additional 70 hours. Pour the solution into ice water, acidify with 3 percent hydrochloric acid and extract with chloroform. Wash the combined chloroform extracts with aqueous sodium bicarbonate solution, 3 percent hydrochloric acid, then water. Dry the chloroform solution over sodium sulfate, then remove the chloroform in vacuo to a residue (128 mg.). Chromatograph the residue on an 8 × 8-inch 1-mm thick Si-GF plate utilizing benzene-ether as the solvent system. Elute the product comprising 6,6-dimethyl-4,5-seco-androstan-17β-ol-3,5-dione in admixture with a trace of 6,6-dimethyl-testosterone from the Si-GF with chloroform. Yield = 42 mg. $\delta_{max}^{film}$ 2.9 (OH); 5.8–5.95

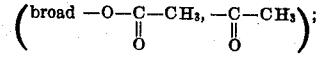

6.0 μ (C=O), nmr 4.15–4.50 (multiplet $C_{17}$-H:),

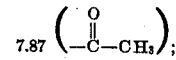

8.84 ($C_6$-$CH_3$); 8.89 ($C_{19}CH_3$); 8.96 ($C_6$-$CH_3$); 9.17τ($C_{18}$-$CH_3$).

This product was used in the following procedure 14C without further purification.

C. 6,6-Dimethyl-testosterone (6-6-dimethyl-4-androsten-17β-ol-3-one)

To a solution of 40 mg. of 6,6-dimethyl-4,5-seco-androstan-17β-ol-3,5-dione in admixture with a small quantity of 6,6-dimethyl-testosterone (product of Example 14B) in 12 ml. of dry t-butanol add 50 mg. of potassium t-butoxide. Stir the mixture at 50°C for 16 hours, then pour into 100 ml. of water, acidify the aqueous solution with 3 percent hydrochloric acid and extract with chloroform. Wash the combined chloroform extracts with water, dry over sodium sulfate and distill the chloroform in vacuo to a residue (39 mg.) comprising 6,6-dimethyl-testosterone. Purify by chromatography on an 8 × 8-inch 1-mm thick Si-GF plate utilizing benzene-ether (1:1) as the solvent system. Elute the 6,6-dimethyl-testosterone from Si-GF with acetone (yield = 25 mg.). Prepare an analytical sample by sublimation at 108° and 2 × 10$^{-5}$ mm; m.p. 150°–156°C [α]$_{365}$ = 750.2°. The infrared and nmr data for 6,6-dimethyl-testosterone are in agreement with data recorded in the literature (T. D. Y. D'Silva and Howard T. Ringold. Tetrahedron Letters, No. 50, p. 4490 (1965).

EXAMPLE 15

Conversion of 4,5-seco-3-androstyn-17β-ol-5-one 17-acetate to 6,6-dimethyl-testosterone A. 6,6-Dimethyl-4,5-seco-3-androstyn-17β-ol-5-one 17-acetate Inject 25 ml. of 1.6M n-butyl lithium in hexane into a dry nitrogen filled flask. Evaporate the hexane in vacuo and to the resultant semi-solid residue add in small portions 15 ml. of dry ethylene glycol dimethyl ether. Then add to this mixture in 3 ml. portions 500 mg. of 4,5-seco-3-androstyn-17β-ol-5-one 17-acetate (prepared by the action of 4,5-seco-3-androstyn-17β-ol-5-one in pyridine with acetic anhydride in a manner similar to the procedure of Example 18A) in 18 ml. of ethylene glycol dimethyl ether. Stir the solution at room temperature for 1.5 hours, then add 5 ml. methyl iodide and continue stirring for another 45 minutes. Add 20 ml. of 3 percent hydrochloric acid, then dilute the reaction mixture with ether and water to a total of 100 ml. Wash the ether extracts with aqueous sodium bicarbonate, then water and dry over sodium sulfate. Distill the solvents in vacuo to a residue (610 mg.) comprising 6,6-dimethyl-4,5-seco-3-androstyn-17β-ol-5-one 17-acetate in admixture with a small quantity of 6,6-dimethyl-4,5-seco-3-androstyn-17β-ol-5 -one 17-methyl ether. This product is identical to the product obtained in Example 13B as determined by thin layer chromatographic analysis, infrared and nmr spectral data. The product of this example is used without further purification in the following procedure Example 15B.

B. Alternate procedure of converting 6,6-dimethyl-4,5-seco-3-androstyn-17β-ol-5-one 17-acetate to 6,6-dimethyl-4,5-seco-androstan-17β-ol-3,5-dione 17-acetate To a slurry of 60 mg. red mercuric oxide in 10 ml. dioxane add 0.1 ml. trifluoroacetic acid followed by a solution of 600 mg. 6,6-dimethyl-4,5-seco-3-androstyn-17β-ol-5-one 17-acetate mixed with the corresponding 17-methyl ether (i.e., the product of Example 15A) in 15 ml. of dioxane and 5 ml. of water. Stir the reaction mixture for 5.5 hours at room temperature, then pour into 200 ml. cold water, extract the resultant white suspension with three 50 ml. portions of chloroform. Wash the combined chloroform extracts with water, dry over sodium sulfate and evaporate in vacuo to a residue (537 mg.) comprising 6,6-dimethyl-4,5-seco-androstan-17β-ol-3,5-dione 17-acetate in admixture with a small quantity of 6,6-dimethyl-4,5-seco-androstan-17β-ol-3,5-dione 17-methyl ether. This product is identical to the product of Example 14A as determined by thin layer chromatographic data and spectroscopic data.

C. 6,6-Dimethyl-testosterone (6,6-dimethyl-4-androsten-17β-ol-3-one)

Treat 6,6-dimethyl-4,5-seco-androstan-17β-ol-3,5-dione 17-acetate with potassium tertiary butoxide in t-butanol in a manner similar to that described in Example 9B to obtain 6,6-dimethyl-testosterone in admixture with a small quantity of the corresponding methyl ether, i.e., 6,6-dimethyl-testosterone methyl ether.

EXAMPLE 16

4,5-Seco-3-estryn-17β-ol-5-one

To a solution of 8.0 g. of 4,5-oxido-estran-17β-ol-3-one in 250 ml. of methanol add 5.15 g. of p-toluenesulfonyl-hydrazine. Stir the resulting mixture at 50°C for 5 minutes, then at room temperature for an additional 10 minutes. Pour the resulting yellow solution onto an ice-water sodium chloride solution and extract the resulting precipitate with chloroform. Wash the combined chloroform extracts with aqueous sodium bicarbonate followed by dilute hydrochloric acid, then water and dry over sodium sulfate and concentrate to a residue comprising 4,5-seco-3-estryn-17β-ol-5-one.

Purify by chromatography on 250 g. of Florisil followed by elution with ether (5.2 g.). Upon further purification by crystallization from ether-hexane there is obtained an analytical sample of 4,5-seco-3-estryn-17β-ol-5-one.

| mp | 89–90°C. | λmax$^{Nujol}$ | 3.0 (3340)(OH); |
|---|---|---|---|
| α/D | −1 (chloroform) | | 3.05 (3280) (C≡C—H; |
| | | | 4.72 (2120) (C≡C); |
| | | | 5.85 μ (17 cm$^{-1}$) (C=O) | nmr 6.4 τ (C-17-H); 9.17 τ(C-18-$CH_3$)

EXAMPLE 17

Conversion of 4,5-seco-3-estryn-17β-ol-5-one to 19-nor-testosterone 17-acetate

To a solution of 160 mg. of 4,5-seco-3-androstyn-17β-ol-5-one in 8 ml. of 90 percent acetic acid, add 42 mg. mercuric acetate and 0.03 ml. of concentrated sulfuric acid. Stir the resulting mixture under nitrogen at 100°C for 90 minutes then pour into cold water. Extract the aqueous mixture with ether, wash the combined etheral extracts with aqueous sodium bicarbonate then dilute hydrochloric acid and finally with water. Dry over sodium sulfate and evaporate in vacuo to obtain a residue comprising 19-nor-testosterone 17-acetate. Thin layer chromatographic data and spectroscopic data of the product of this example is similar to that of an authentic sample of 19-nor-testosterone 17-acetate. δ$_{max}^{Nujol}$: 5.76 (1735)(OAc); 5.98 (1670)(C=O); 6.13 μ (1630 cm$^{-1}$) (—C=C—).

EXAMPLE 18

Conversion of 4,5-seco-3-estryn-17β-ol-5-one to 6,6-dimethyl-4,5-seco-3-androstyn-17β-ol-5-one 17-acetate A. 4,5-Seco-3-estryn-17β-ol-5-one 17-acetate To a solution of 1.0 g. of 4,5-seco-3-estryn-17β-ol-5-one (compound of Example 16) in 10 ml. of pyridine, add 1 ml. of acetic anhydride and leave at room temperature for 16 hours. Evaporate in vacuo to a small volume, then dissolve the residue in 100 ml. of ether. Wash the ether solution with water, dry over sodium sulfate and remove the ether in vacuo to a residue (1.1 g.) comprising 4,5-seco-3-estryn-17β-ol-5-one 17-acetate. $\delta_{max}^{Nujol}$ 3.05 (C ≡ C-H),

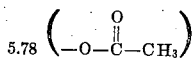

5.90 (-C=O). nmr 5.2–5.6 ($C_{17}$-H); 7.98

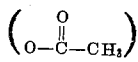

9.11 τ ($C_{19}$-CH$_3$).

B. In a manner similar to that described in Example 15A, treat 4,5-seco-3-estryn-17β-ol-5-one 17-acetate with n-butyl lithium in ethylene glycol dimethyl ether followed by an excess of methyl iodide to obtain 6,6-dimethyl-4,5-seco-3-androstyn-17β-ol-5-one 17-acetate, which is identical to the compound obtained in Example 15A as determined by chromatographic and spectroscopic data.

EXAMPLE 19

Conversion of 4,5-seco-3-estryn-17β-ol-5-one to 6,6-dimethyl-4,5-seco-3-androstyn-17β-ol-5-one 17-methyl ether In a manner similar to that described in Example 5 treat 4,5-seco-3-estryn-17β-ol-5-one (compound of Example 16) with sodium hydride in tetrahydrofuran followed by an excess of methyl iodide to obtain 6,6-dimethyl-4,5-seco-3-androstyn-17β-ol-5-one 17-methyl ether.

EXAMPLE 20

10β-n-Propyl-4,5-seco-3-estryn-17β-ol-5-one

A. 4,5-Seco-3-estryn-17β-ol-5-one 17-tetrahydropyranyl ether

To a solution of 50 mg. of p-toluenesulfonic acid in 100 ml. dry benzene add a solution of 2.1 g. 4,5-seco-3-estryn-17β-ol-5-one (compound of Example 16) in 100 ml. dry benzene. To this mixture add 1 ml. dihydropyran in one portion. Stir the reaction mixture for one hour at room temperature then wash with water and dry over sodium sulfate. Evaporate the benzene in vacuo to a residue (2.6 g.) comprising 4,5-seco-3-estryn-17β-ol-5-one 17-tetrahydropyranyl ether (i.e., 17-OTHP) $\lambda_{max}^{film}$ 3.04 (≡ C-H), 4.70 (C ≡ C-), 5.85 μ(C=O). nmr 5.25–5.50, 5.85–6.75 (OTHP and $C_{17}$-H), 9.13 and 9.15τ ($C_{18}$-CH$_3$).

B. 10β-n-Propyl-4,5-seco-3-estryn-17β-ol-5-one 17-tetrahydropyranyl ether

To a slurry of 3 g. of 62.4 percent sodium hydride (in mineral oil) in 30 ml. dry tetrahydrofuran add in one portion a solution of 1.54 g. 4,5-seco-3-estryn-17β-ol-5-one 17-tetrahydropyranyl ether in 45 ml. dry tetrahydrofuran. Stir the reaction mixture at room temperature under a nitrogen atmosphere for 1.5 hours, then add 0.42 ml. n-propyl iodide. Stir the reaction mixture at room temperature for 16 hours, then heat at reflux temperature for 1.5 hours. Decompose the excess sodium hydride by adding 25 ml. of water, then dilute the reaction mixture with 150 ml. of ether, separate the layers and wash the organic layer with water. Dry the organic solution over sodium sulfate, then remove the solvent in vacuo, chromatograph the resultant residue on 200 g. of Florisil eluting with 5 percent ether. Evaporate the ether from the combined eluates to a residue (471 mg.) comprising 10β-n-propyl-4,5-seco. 3-estryn-17β-ol-5-one 17-tetrahydropyranyl ether. $\lambda_{max}^{film}$ 3.0 (≡ C-H); 4.7 (C ≡ C); 5.85 μ (C=O). This product was used without further purification in the following procedure of Example 20C.

C. 10β-n-Propyl-4,5-seco-3-estryn-17β-ol-5-one

To a solution of 470 mg. 10β-n-propyl-4,5-seco-3-estryn-17β-ol-5-one 17-tetrahydropyranyl ether in 40 ml. 90 percent aqueous methanol, add 2 ml. concentrated hydrochloric acid and stir the mixture at room temperature for 1.5 hours. Pour the reaction mixture into cold water (25°C) and extract the resulting white suspension into chloroform. Wash the combined chloroform extracts with aqueous sodium bicarbonate, then water and dry over sodium sulfate. Evaporate the solvent in vacuo to a residue (270 mg.) comprising 10β-n-propyl-4,5-seco-3-estryn-17β-ol-5-one $\lambda_{max}^{film}$ 2.9 (OH), 3.0 (≡ C-H), 4.7 (C ≡ C), 5.88–5.95 μ (broad C=O). nmr 6.35 ($C_{17}$-H); 9.16 τ ($C_{18}$-CH$_3$ + propyl-CH$_3$ shoulder). This product is used without further purification in the procedure of Example 21A.

EXAMPLE 21

Conversion of 10β-n-Propyl-4,5-seco-3-estryn-17β-ol-5-one to 10β-n-Propyl-4-estren-17β-ol-3-one A. 10β-n-Propyl-4,5-seco-estran-17β-ol-3,5-dione Treat 10β-n-propyl-4,5-seco-3-estryn-17β-ol-5-one in 90 percent dioxane with mercuric oxide in trifluoroacetic acid and isolate the resultant product in a manner similar to that described in Example 15B to obtain 10β-n-propyl-4,5-seco-estran-17β-ol-3,5-dione. $\lambda_{max}^{film}$ 2.84 (OH), 5.85 μ

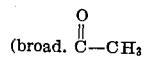

and C=O). nmr 6.4 ($C_{17}$-H), 7.19 ($C_{17}$-acetate),

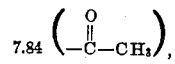

9.18 ($C_{18}$-CH$_3$), 9.12 τ (center of propyl CH$_3$ triplet). This product was used without further purification for the procedure of the following Example 21B.

B. 10β-n-Propyl-4-estren-17β-ol-3-one

Treat 10β-n-propyl-4,5-seco-estran-17β-ol-3,5-dione with t-butoxide in t-butanol and isolate the resultant product in a manner similar to that described in Example 6B to obtain 10β-n-propyl-4-estren-17β-ol-3-one. Purify the product by chromatography on 8 × 8 inch 1 mm thick Si-GF plate utilizing as solvent system chloroform-ethyl acetate (1:1). Extract the 10β-n-propyl-4-estren-17β-ol-3-one from the Si-GF with chloroform, evaporate the chloroform and crystallize the resultant product from methylene chloride-hexane. To obtain an analytical sample recrystallize several times from methylene chloride-hexane, m.p. 150–151°C; $\lambda_{max}^{Nujol}$ 2.9 (OH), 6.02 (C=O), 6.20 μ (C=C). nmr 4.20 ($C_4$-H), 6.35 ($C_{17}$-H), 4.7 (OH), 9.19 τ ($C_{18}$-CH$_3$).

EXAMPLE 22 Conversion of 4,5-seco-3-estryn-17β-ol-5-one 17-tetrahydropyranyl ether to
6,10β-di-(2'-propenyl)-4,5-seco-3-estryn-17β-ol-5-one 17-tetrahydropyranyl ether In a manner similar to that descirbed in Example 20B, treat 4,5-seco-3-estryn-17β-ol-5-one 17-tetrahydropyranyl ether (compound of Example 20A) with sodium hydride in refluxing tetrahydrofuran for 12 hours followed by treatment with an excess of 3-bromo-1-propene. (This procedure is carried out in refluxing tetrahydrofuran, whereas the procedure of Example 20B is carried out at room temperature.) Isolate the resultant product in a manner similar to that described in Example 20B to obtain 6,10β-di-(2'-propenyl)-4,5-seco-3-estryn-17β-ol-5-one 17-tetrahydropyranyl ether. Purify by chromatographing on silica gel eluting with benzene-ether (20:1) and distilling the combined eluates to give 6,10β-di-(2'-propenyl)-4,5-seco-3-estryn-17β-ol-5-one 17-tetrahydropyranyl ether. $\lambda_{max}^{film}$ 3.0 ($\equiv$ C-H), 4.70 (C $\equiv$ C), 5.78 (C=O), 3.25, 6.1, 10.9 μ

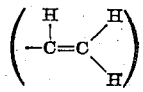

nmr: 4.9, 4.0 → 5.25 (6 protons

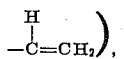, 5.25 → 5.50, 5.85 → 6.75 (OTHP, C$_{17}$-H), 9.11 and 9.13 τ (C$_{18}$-CH$_3$).

EXAMPLE 23

Conversion of 6,10β-di-(2'-propenyl)-4,5-seco-3-estryn-17β-ol-5-one 17-tetrahydropyranyl ether to 6,10β-di-(2'-propenyl)-4-estren-17β-ol-3-one A. 6,10β-Di-(2'-propenyl)-4,5-seco-estran-17β-ol-3,5-dione In a manner similar to that described in Example 9A, treat 6,10β-di-(2'-propenyl)-4,5-seco-3-estryn-17β-ol-5-one 17-tetrahydropyranyl ether (compound of Example 22A) with mercuric oxide and trifluoroacetic acid in 90 percent aqueous dioxane followed by treatment with 12N hydrochloric acid to obtain 6,10β-di-(2'-propenyl)-4,5-seco-estran-17β-ol-3,5-dione. Purify the resultant product, isolate in the manner described in Example 9A by chromatography on Florisil eluting with benzene-ether (1:3) and distill the eluates in vacuo to a residue comprising 6,10β-di-(2'-propenyl)-4,5seco-estran-17β-ol-3,5-dione. Prepare an analytical sample by sublimation at 105° and 2 × 10$^{-5}$ mm. Product is an oil. [α]$_D$ = −28.5° $\lambda_{max}^{film}$ 2.9 (OH), 5.88 (2 C=O), 3.22, 6.10, 10.9 μ

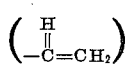

nmr 4.87 and 4.0 → 5.25 (6 protons

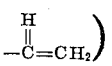

6.35 (C$_{17}$-H); 7.88 (

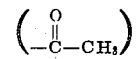

9.17 τ (C$_{18}$-CH$_3$).

B. 6,10β-Di-(2'-propenyl)-4-estren-17β-ol-3-one

In a manner similar to that described in Example 9B, treat 6,10-di-(2'-propenyl)-4,5-seco-estran-17β-ol-3,5-dione with potassium tertiary butoxide in t-butanol to obtain 6,10-di-(2'-propenyl)-4-estren-17β-ol-3-one. Isolate the resultant product in a manner similar to that described in Example 9B and purify by thin layer chromatography on 8 × 8 inch 1 mm Si-GF plates utilizing as solvent system chloroform-ethyl acetate (1:1) to give 6,10β-di-(2'-propenyl)-4-estren-17β-ol-3-one. The product is an oil. [α]$_D$ 18.7° $\lambda_{max}^{film}$ 2.9 (OH), 5.9–6.1 (broad C=O), 3.25, 6.24, 10.9 μ

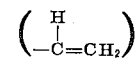

nmr 4.13 (C$_4$-H), 4.84, 4.87 + 4.0 → 5.25

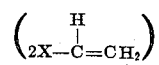

6.35 (C$_{17}$-H), 7.24 (C$_{17}$-OH); 9.18 τ (C$_{18}$-CH$_3$).

EXAMPLE 24 Conversion of
6,10β-di-(2'-propenyl)-4,5-seco-3-estryn-17β-ol-5-one 17-tetrahydropyranyl ether to
6,6,10β-tri-(2'-propenyl)-4,5-seco-estran-17β-ol-3,5-dione A. 6,6,10β-Tri-(2'-propenyl)-4,5-seco-3-estryn-17β-ol-5-one 17-tetrahydropyranyl ether To a slurry of 1.8 g 62.4 percent sodium hydride (in mineral oil) in 20 ml. dry tetrahydrofuran, add a solution of 840 mg. of 6,10β-di-(2'-propenyl)-4,5-seco-3-estryn-17β-ol-5-one 17-tetrahydropyranyl ether in 40 ml. tetrahydrofuran. Stir the mixture at room temperature for 24 hours, then add 14 ml. of 3-bromo-1-propene and then heat the reaction mixture at reflux temperature for 72 hours. Add 50 ml. of water dropwise at first, to decompose excess sodium hydride, then extract the oily suspension with chloroform. Wash the combined chloroform extracts with water, dry over sodium sulfate and evaporate in vacuo to a residue (1.44 g., containing mineral oil). Dissolve the residue in benzene and chromatograph on 40 g. silica gel eluting with benzene-ether (9:1). Evaporate the combined eluates to a residue (884 mg.) comprising 6,610β-tri-(2'-propenyl)-4,5-seco-3-estryn-17β-ol-5-one 17-tetrahydropyranyl ether as an oil. $\lambda_{max}^{film}$ 2.98 ($\equiv$ C-H), 5.92 (C=O), 3.22, 6.08, 10.95 μ

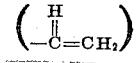

nmr 4.9 and 4.0 → 5.25 (6 protons

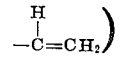

5.25 → 5.50, 5.58 → 6.75 (OTHP, C$_{17}$-H); 9.11 5.85 9.13 τ (C$_{18}$-CH$_3$).

b. 6,6,10β-Tri-(2'-propenyl)-4,5-seco-estran-17β-ol-3,5-dione

In a manner similar to that described in Example 9A, treat 6,6,10β-tri-(2'-propenyl)-4,5-seco-3-estryn-17β-ol-5-one 17-tetrahydropyranyl ether with mercuric oxide and trifluoroacetic acid in 90 percent aqueous dioxane followed by treatment with 12N hydrochloric acid. Isolate the resultant product in a manner similar to that described to obtain 6,6,10β-tri-(2'-propenyl)-4,5-seco-3-estran-17β-ol-3,5-dione. Purify by chromatographing the residue on silica gel eluting with benzene-ether (20:1). Evaporate the combined eluates to a residue comprising 6,6,10β-tri-(2'-propenyl)-4,5-seco-estran-17β-ol-3,5-dione. Prepare an analytical sample by sublimation at 110°C and 2 × 10⁻⁵ mm Hg to obtain an oil. $[\alpha]_D$ −7.1 $\lambda_{max}^{film}$ 3.0 (OH); 5.8–5.95

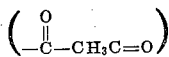

3.22, 6.10, 10.9 μ

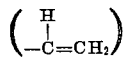

nmr 4.88 and 4.0 → 5.25 (9 protons

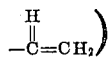

6.35 (C$_{17}$-H); 7.87

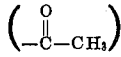

9.17 τ (C$_{18}$-CH$_3$).

EXAMPLE 25

Conversion of 4,5-seco-3-estryn-17β-ol-5-one 17-tetrahydropyranyl ether to 10β-dodecyl-4-estren-17β-ol-3-one A. 6-Formyl-4,5seco-3-estryn-17β-ol-5-one 17-tetrahydropyranyl ether To a solution of 3.1 g. of 4,5-seco-3-estryn-17β-ol-5-one 17-tetrahydropyranyl ether (the compound of Example 20A) in 125 ml. of benzene, add in three portions 6.4 g. sodium methoxide in 125 ml. benzene. Cool the reaction mixture in a cold water bath and add dropwise an excess (25 ml.) of ethyl formate. Stir the reaction mixture for three hours, then dilute the solution with benzene to a volume of 200 ml. and extract with four 100 ml. portions of 4 percent aqueous sodium hydroxide. Acidify the combined basic extracts with 3 percent aqueous hydrochloric acid. Extract the resultant precipitate into 300 ml. chloroform then wash the combined chloroform extracts with three 150 ml. portions of water. Dry the chloroform solution over sodium sulfate and evaporate in vacuo to a residue (2.85 g.) comprising 6-formyl-4,5-seco-3-estryn-17β-ol-5-one 17-tetrahydropyranyl ether. $\lambda_{max}^{film}$ 3.0 ( ≡ C-H); 4.7 (-C ≡ C-), 6.1 (broad C=O); 6.3 μ (broad C=O). This compound is used without further purification in the reaction of Example 25B immediately following.

B. 6-n-Butylthiomethylene-4,5-seco-3-estryn-17β-ol-5-one 17-tetrahydropyranyl ether To a solution of 2.85g. 6-formyl-4,5-seco-3-estryn-17β-ol-5-one 17-tetrahydropyranyl ether in 150 ml. of benzene, add 60 mg. p-toluenesulfonic acid and 1.5 ml. n-butyl mercaptan. Heat the reaction mixture at reflux temperature for 3 hours and continuously remove water by means of a Soxhlet extractor utilizing calcium carbide as drying agent. Cool the reaction mixture to room temperature, dilute with benzene to a volume of 250 ml., then wash the benzene solution three times with aqueous sodium bicarbonate solution and then with water. Dry the benzene solution over sodium sulfate and remove the solvent in vacuo to a residue (3.14 g.) comprising 6-n-butylthiomethylene-4,5-seco-3-estryn-17β-ol-5-one in admixture with the corresponding 17-tetrahydropyranyl ether. Convert the product to the tetrahydropyranyl ether by treatment thereof with dihydropyran in benzene in the presence of p-toluenesulfonic acid in a manner described in Example 20A. Isolate the product in the manner described and purify by chromatography on 200 g. Florisil eluting first with benzene-ether (50:1) and then with benzene-ether (25:1). Evaporate the combined eluates to a residue (1.1 g.) comprising 6-n-butylthiomethylene-4,5-seco-3-estryn-17β-ol-5-one 17-tetrahydropyranyl ether as an oil. $\lambda_{max}^{film}$ 3.0 ( ≡ C-H); 4.7 (C ≡ C); 6.05 μ (C=O). nmr 2.67

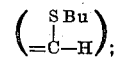

5.30 → 5.60, 5.85 → 6.85 (OTHP, C$_{17}$-H); 9.18 and 9.20 τ (C$_{18}$-CH$_3$). This compound is used without further purification in the reaction of Example 25C immediately following.

C. 6-(n-Butylthiomethylene)-10β-(n-dodecyl)-4,5-seco-3-estryn-17β-ol-5-one

To a solution of 1.41 g. of 6-(n-butylthiomethylene)-4,5-seco-3-estryn-17β-ol-5-one 17-tetrahydropyranyl ether in 120 ml. dry t-butanol, add 700 mg. potassium tertiary butoxide in three portions. Stir the reaction mixture at room temperature for 30 minutes, then add 15 ml. n-dodecyl iodide in one portion. Stir the mixture for 36 hours at 50°C, then pour into 300 ml. water. Extract the resulting suspension into chloroform and wash the combined chloroform extracts with water, dry over sodium sulfate and remove the solvent in vacuo to a residue. Chromatograph the residue on 150 g. of Florisil eluting with hexane (to remove the excess n-dodecyl iodide) followed by benzene-ether (9:1). Evaporate the combined benzene-ether eluates to a residue (270 mg.) comprising 6-(n-butylthiomethylene)-10β-(n-dodecyl)-4,5seco-3-estryn-17β-ol-5-one, as an oil. $\lambda_{max}^{film}$ 2.9 (OH); 3.0 ( ≡ C-H); 4.7 (C ≡ C); 6.05 μ (C=O). nmr 2.67

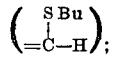

6.44 (C$_{17}$-H); 8.74 (broad -(CH$_2$)$_{11}$-); 9.22 τ (C$_{18}$-CH$_3$). This compound is used without further purification in the procedure of Example 25D immediately following D. 6-(n-Butylthiomethylene)-10β-(n-dodecyl)-4,5-seco-estran-17β-ol-3,5-dione Treat 6-(n-butylthiomethylene)-10β-(n-dodecyl)-4,5-seco-3-estryn-17β-ol-5-one with mercuric oxide and trifluoroacetic acid in 90 percent aqueous dioxane in a manner similar to that described in Example 15B. Isolate the resultant product in a manner similar to that described to obtain 6-(n-butylthiomethylene)-10β-(n-dodecyl)-4,5-seco-estran-17β-ol-3,5-dione as an oil. $\lambda_{max}^{film}$ 2.88 (OH);

5.85 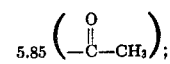

6.02 (C=O). nmr 2.5

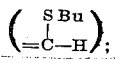

6.42 (multiplet $C_{17}$-H);

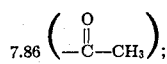

8.73 (broad-$(CH_2)_{11}$-); 920 τ ($C_{18}$-$CH_3$). This compound was homogeneous by thin layer chromatographic analysis (Si-GF, chloroform-ethyl acetate (1:1).

This compound is used without further purification of the procedure of Example 25E immediately following.

E. 6-(n-Butylthiomethylene)-10β-(n-dodecyl)-4-estren-17β-ol-3-one

In a manner similar to that described in Example 14C, treat 6-(n-butylthiomethylene)-10β-(n-dodecyl)-4,5-seco-estran-17β-ol-3,5-dione with potassium tertiary butoxide in t-butanol. Isolate the resultant product in a manner similar to that described to obtain 6-(n-butylthiomethylene)-10β-(n-dodecyl)-4-estren-17β-ol-3-one as an oil. $\lambda_{max}^{film}$ 2.86 (OH); 6.0 μ (broad C=O). nmr 3.43 ;

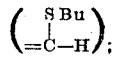

3.98 ($C_4$-H); 6.43 (multiplet $C_{17}$-H); 8.73 (broad -$(CH_2)_{11}$-); 9.20 τ ($C_{18}$-$CH_3$). This compound is used without further purification in the example of 25F immediately following.

F. 10β-n-Dodecyl-4-estren-17β-ol-3-one

To a solution of 310 mg. of 6-(n-butylthiomethylene)-10β-(n-dodecyl)-4-estren-17β-ol-3-one in 60 ml. 90 percent aqueous dioxane, add 6 ml. concentrated hydrochloric acid. Stir the mixture at 80°C for 16 hours, then pour into 200 ml. cold water. Extract the resulting suspension with three 100 ml. portions of chloroform, wash the combined chloroform extracts with several portions of aqueous sodium bicarbonate solution and then with water. Dry the chloroform extracts over sodium sulfate and remove the solvent in vacuo to a residue (252 mg.). Chromatograph the residue on 5 g. Florisil eluting with benzene-ether (5:1). Evaporate the combined eluates to a residue (55 mg.) comprising 10β-n-dodecyl-4-estren-17β-ol-3-one as an oil $\lambda_{max}^{film}$ 2.86 (OH); 6.0 (C=O); 6.22 μ (C=C). nmr 4.2 ($C_4$-H); 4.4 (multiplet $C_{17}$-H); 8.75 (broad-$(CH_2)_{11}$-); 9.21 τ ($C_{18}$-$CH_3$).

EXAMPLE 26

Conversion of 4,5-seco-3-androstyn-17β-ol-5-one 17-tetrahydropyranyl ether to androstan-17β-ol-3-one A. 4,5-Seco-3-androstyn-5β,17β-diol 17-tetrahydropyranyl ether Cool a solution of 6.8 g. of 4,5-seco-3-androstyn-17β-ol-5-one 17-tetrahydropyranyl ether in 500 ml. of methanol to 0°C, then add in three portions 1.1 g. of sodium borohydride. Stir the reaction mixture at 0°C for three hours, then pour into 500 ml. cold water. Add sodium bicarbonate to the resulting suspension, then extract into three 150 ml. portions of chloroform. Wash the combined chloroform extracts with water, dry over sodium sulfate, then evaporate in vacuo to a residue (7.3 g.). Chromatograph the residue on 200 g. Florisil eluting with benzene-ether (50:1). Distill the combined eluates to a residue (5.04 g.) comprising 4,5-seco-3-androstyn-5β,17β-diol 17-tetra-hydropyranyl ether as an oil. $\lambda_{max}^{film}$ 2.85 (OH); 3.0 (C ≡ C-H); 4.74 μ (C ≡ C). nmr 5.25 → 5.50, 5.85 → 6.75 (OTHP, $C_5$-H and $C_{17}$-H); 9.15 and 9.18 ($C_{18}$-$CH_3$); 9.24 τ ($C_{19}$-$CH_3$). This compound is used without further purification in the procedure of following Example 26B.

B. 4,5-Seco-3-androstyn-5β,17β-diol 5-p-toluenesulfonate 17-tetrahydropyranyl ether To a solution of 2 g. of 4,5-seco-3-androstyn-5β,17β-diol 17-tetrahydropyranyl ether in 100 ml. dry pyridine, add an excess (5 g.) of p-toluenesulfonyl chloride. Stir the mixture at 60°C for 16 hours, then pour into 200 ml. cold water. Extract the resulting suspension into three 100 ml. portions of chloroform. Wash the combined chloroform extracts with aqueous sodium bicarbonate, then with water. Dry the chloroform solution over sodium sulfate and evaporate in vacuo to a residue (2.24 g.) comprising a mixture of 4,5-seco-3-androstyn-5β,17β-diol 5-p-toluenesulfonate 17-tetrahydropyranyl ether, together with the corresponding 5,17-ditosylate. Isolate and purify by chromatographing the mixture on 100 g. of Florisil eluting with benzene-ether (50:1). Evaporate the combined eluates to a residue (420 mg.) comprising 4,5-seco-3-androstyn-5β,17β-diol 5-p-toluenesulfonate 17-tetrahydropyranyl ether. $\lambda_{max}^{film}$ 3.0 ( ≡ C—H); 4.7 (C ≡ C); 6.24 μ (OTS). nmr 2.35, 2.84 (4 protons, 2 doublets J = 9 cps OTS); 5.25–5.50, 5.85–6.75 (OTHP, $C_5$-H and $C_{17}$-H); 6.73 (OTS-$CH_3$); 9.15, 9.18 ($C_{18}$-$CH_3$); 9.27 τ($C_{18}$-$CH_3$). This compound is unstable on standing and must be used immediately in the following reaction of Example 26C.

C. 3-Androstene-3,17β-diol 3-trifluoroacetate

Stir at room temperature for 1.5 hours a solution of 93 mg. of freshly prepared 4,5-seco-3-androstyne-5β,17β-diol 5-p-toluenesulfonate 17-tetrahydropyranyl ether in 10 ml. trifluoroacetic acid. Pour the reaction mixture into 100 ml. cold water and extract the resulting suspension into three 80 ml. portions of chloroform. Wash the combined chloroform extracts with aqueous sodium bicarbonate solution, then with water and dry over sodium sulfate. Evaporate the chloroform in vacuo to a residue (77 mg.) comprising 3-androstene-3,17β-diol 3-trifluoroacetate. $\lambda_{max}^{film}$ 2.9 (OH); 5.55 μ

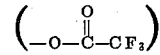

This compound is used without further purification in the procedure of following Example 26D.

D. Androstan-17β-ol-3-one

To a solution of 75 mg. 3-androstene-3,17β-diol 3-trifluoroacetate in 20 ml. of methanol, add 10 mg. sodium methoxide. Stir the reaction mixture at room temperature for 16 hours, then add 5 ml. 3 percent hydrochloric acid and continue stirring for 10 minutes. Pour the reaction mixture into 100 ml. cold water and extract the resulting white suspension into three 80 ml. portions of chloroform. Wash the combined chloroform extracts with water, dry over sodium sulfate and evaporate in vacuo to a residue (60 mg.). Chromatograph the residue on an 8 × 8 inches 1 mm thick Si-GF plate utilizing as solvent system benzene-ether (1:1). Extract the main product from the Si-GF plate with chloroform, then evaporate the chloroform to a residue (21 mg.) comprising androstan-17β-ol-3-one in admixture with 5β-androstan-17β-ol-3-one. Purify by sublimation at 75°C and 2 × 10$^{-5}$ mm Hg. λ$_{max}^{Nujol}$ 2.85 (OH); 5.85 μ (C = O).

EXAMPLE 27

17α,20-Isopropylidenedioxy-4-pregnen-3-one

A. 4-Pregnene-17α,20-diol-3-one

To a stirred slurry of 2.5 g. of lithium aluminum hydride in 150 ml. of tetrahydrofuran and 150 ml. of ether, add dropwise over 0.5 hour a solution of 5 g. of 17α-hydroxyprogesterone in 50 ml. of tetrahydrofuran. Stir the reaction mixture for 16 hours at room temperature under a nitrogen atmosphere. Decompose the excess lithium aluminum hydride by the dropwise addition of a saturated aqueous sodium sulfate solution, then add 25 g. of sodium sulfate and filter the solution, washing the filter cake with 100 ml. of tetrahydrofuran. Evaporate the combined filtrate and wash the solution in vacuo to a residue (5 g.) λ$_{max}^{Nujol}$ 2.9 μ (-OH).

Purify as follows: to 1 g. of residue in 300 ml. of chloroform add 3 g. of activated magnesium dioxide and stir at room temperature for 40 hours. Filter through Celite and evaporate the solvent in vacuo to a residue (0.9 g.). Crystallize the residue from ethyl acetate to give 4-pregnene-17α,20-diol-3-one (0.5 g.). λ$_{max}^{Nujol}$ 2.9 (—OH) 6.0 (C = O) and 6.15 (C = C).

B. 17α,20-Isopropylidenedioxy-4-pregnen-3-one

To a stirred solution of 10 g. of 4-pregnene-17α,20-diol-3-one in 800 ml. of acetone under a nitrogen atmosphere add 400 g. of anhydrous copper sulfate. Vigorously stir the reaction mixture at reflux temperature for 20 hours, then cool to room temperature. Filter and wash the filter cake with 200 ml. of acetone. Evaporate the combined filtrate and wash acetone in vacuo to a residue (11 g.). Thin layer chromatography on an Si-GF plate utilizing as solvent system chloroform-ethyl acetate indicates that all the starting compound has been converted to 17α,20-isopropylidenedioxy-4-pregnen-3-one. Prepare an analytical sample by crystallization from acetone, m.p. 178°–181°C [α] D + 45° (CHCl$_3$); λ$_{max}^{Nujol}$ 6.0 (C = O) and 6.2 μ (C = C).

EXAMPLE 28

4,5-Seco-3-pregnyn-17α-ol-5,20-dione
Procedure 1: (28A–28D)
A. 4,5-Oxido-17α,20-isopropylidenedioxy-pregnan-3-one To a stirred solution of 5 g. of 17α,20-isopropylidene-dioxy-4-pregnen-3-one in 350 ml. of methanol cooled to 0°C, add dropwise simultaneously 3 ml. of a 10 percent sodium hydroxide solution and 9 ml. of 30 percent hydrogen peroxide. Regulate the rate of addition so that the reaction temperature does not exceed 3°C so that the addition of both solutions is completed at the same time. Stir the reaction mixture for 48 hours at 0°C, then pour into 3 liters of ice-saturated sodium chloride solution. Extract with three 1 liter portions of chloroform, then wash the combined chloroform extracts with a 5 percent aqueous sodium bicarbonate solution, then with water. Dry over sodium sulfate and evaporate the chloroform in vacuo to a residue. Dissolve the residue in benzene and chromatograph on 175 g. of silica gel-G eluting with benzene-2.5 percent ether. Evaporate the combined benzene ether eluates to a residue (3.3 g.) comprising 4,5 -oxido-17α,20-isopropylidenedioxy-pregnan-3-one. Prepare an analytical sample by sublimation at 70°C and 10$^{-4}$ mm, m.p. 73°–79° [α]$_D$ 48 (CHCl$_3$) λ$_{max}^{Nujol}$ 5.85 μ (C = O).

B. 17α,20-Isopropylidenedioxy-4,5-seco-3-pregnyn-5-one

To a stirred solution of 3.2 g. of 4β,5β-oxido-17α,20-isopropylidenedioxy-pregnan-3-one in 180 ml. of methanol, add 1.58 g. of p-toluenesulfonyl hydrazine. Stir the mixture at 60°C for 15 minutes and then at room temperature for 2 hours. Pour into 1 liter of an ice-saturated sodium chloride solution and extract with three 300 ml. portions of chloroform. Wash the combined chloroform extracts with a 5 percent aqueous sodium bicarbonate solution, then with water and dry over sodium sulfate. Remove the solvent in vacuo and dissolve the resultant residue in benzene and chromatograph on 110 g. of silica gel-G eluting with benzene-2.5 percent ether. Evaporate the combined eluates to a residue (2.2 g.) comprising 17α,20-isopropylidenedioxy-4,5-seco-3-pregnyn-5-one. Prepare an analytical sample by crystallization from methylene chloride-hexane, m.p. 110°–112°C [α]$_D$ 24 (CHCl$_3$) λ$_{max}^{Nujol}$ 3.0, 4.7 (C ≡ C—H) and 5.85 μ (C = O).

C. 4,5-Seco-3-pregnyne-17α,20-diol-5-one

To a solution of 0.5 g. of 17α,20-isopropylidenedioxy-4,5-seco-3-pregnyn-5-one in 30 ml. of glacial acetic acid, add 30 ml. of water. Heat the reaction mixture on a steam bath under an atmosphere of nitrogen for three hours, then cool to room temperature. Distill the water and acetic acid in vacuo and dissolve the resultant residue in benzene and chromatograph the benzene solution on 18 g. of silica gel-G eluting with benzene-ether. Evaporate the combined eluates to a residue (0.3 g.) comprising 4,5-seco-3-pregnyne-17α,20-diol-5-one. λ$_{max}^{Nujol}$ 2.9 (—OH) 3.0 and 4.7 (C ≡ C—H) 6.0 (C = O) and 6.2 μ (C = C). This product is homogeneous by thin layer chromatographic analyses (Si-GF, CHCl$_3$-EtOAc).

D. 4,5-Seco-3-pregnyn-17α-ol-5,20-dione

To a stirred solution of 0.3 g. of 4,5-seco-3Pregnyne-17α,20-diol-5-one in 30 ml. of acetone, add dropwise chromium trioxide in acetone until a permanent yellow color appears. Filter the reaction mixture through Celite and wash the filter cake with 10 ml. of acetone, then add 75 ml. of chloroform to the filtrate. Wash the chloroform solution with water and dry over sodium sulfate. Evaporate the chloroform in vacuo to a residue (0.250 g.) comprising a mixture of 4,5-seco-3-pregnyn-17α-ol-5,20-dione together with 4,5-seco-3-androstyne-5,20-dione as determined by thin layer chromatographic analysis on Si-GF utilizing a chloroform-ethyl acetate solvent system. Purify by crystallization from ether to obtain 0.04 g. of 4,5-seco-3-pregnyn-17α-ol-5,20-dione. Prepare an analytical sample by recrystallization from methanol; m.p. 185°–188°C λ$_{max}^{Nujol}$ 2.9 (—OH), 3.0 and 4.7 (C ≡ C—H) and 5.85, 5.90 μ (C = O).

An additional amount of the product of this example is obtained by applying the ether filtrate from the above crystallization to an 8 × 8 inches × 1 mm Si-GF thin layer chromatographic plate and developing the plate with a benzene-ether solvent system. Elute separately the two products thereby isolated to obtain 35 mg. of 4,5-seco-3-pregnyn-17α-ol-5,20-dione (product 28D) and 68 mg. of 4,5-seco-3-androstyne-5,17-dione (similar to compound 12A).

Procedure 2:

E. 4,5-Epoxy-17α-hydroxy-pregnan-3,20-dione

To a stirred solution of 5 g. of 17α-hydroxyprogesterone in 800 ml. of methanol cooled to 0°C under an atmosphere of nitrogen, add dropwise simultaneously 7 ml. of 10 percent aqueous sodium hydroxide and 22 ml. of 30 percent aqueous hydrogen peroxide at such a rate that the additions are completed at the same time and the temperature of the reaction mixture does not rise above 0°C. Stir the reaction mixture for 48 hours at 5°C, then pour into 4 l. of saturated aqueous sodium chloride and ice, then extract the mixture with 5 one-liter portions of chloroform. Wash the combined chloroform extracts with 5 percent aqueous sodium bicarbonate the hydrochloric acid and finally water. Dry the chloroform solution over sodium sulfate then evaporate the chloroform in vacuo to a residue (3.5 g.). Chromatograph on silica gel-G eluting with benzene - 10 percent ether in benzene. Evaporate the combined eluates to a residue comprising 4,5-epoxy-17α-hydroxy-pregnan-3,20-dione $\lambda_{max}^{Nujol}$ 2.8 (—OH) and 5.85 (C = O). The product is used without further purification in procedure 28F.

F. 17α-Hydroxy-4,5-seco-3-pregnyne-5,20-dione

To a stirred solution of 1 g. (3nM.) of 4,5-epoxy-17α-hydroxy-pregnan-3,20-dione in 200 ml. of ethanol, add 0.56 g. (3nM.) of p-toluenesulfonyl hydrazine. Stir the reaction mixture at room temperature for 2 hours then pour into 1 l. of saturated aqueous sodium chloride and ice. Extract 3 times with 500 ml. portions chloroform, then wash the combined chloroform extracts with a 5 percent aqueous sodium bicarbonate solution, 2N hydrochloric solution then water. Dry over sodium sulfate and distill the chloroform in vacuo. Chromatograph the resultant residue on silica gel-G eluting with benzene - 5 percent ether in benzene. Evaporate the combined eluates to a residue (0.76 g.) comprising 17-α-hydroxy-4,5-seco-3-pregnyne-5,20-dione.

Prepare an analytical sample by crystallization from methanol; m.p. 185°–188°; $\lambda_{max}^{Nujol}$ 2.9 (—OH), 3.0 and 4.7 (C ≡ CH) and 5.85 (C = O).

EXAMPLE 29

Conversion of 17α,20-isopropylidenedioxy-4,5-seco-3-pregnyn-5-one to 6,6-dimethyl-17α-hydroxyprogesterone A. 6,6-Dimethyl-17α,20-isopropylidenedioxy-4,5-seco-3-pregnyn-5-one In a manner similar to that described in Example 5 (with the single exception that this reaction is carried out completely at room temperature) treat 17α,20-isopropylidenedioxy-4,5-seco-3-pregnyn-5-one (compound of Example 28B) with sodium hydride in tetrahydrofuran followed by an excess of methyl iodide under an atmosphere of nitrogen, and isolate the product thereby formed to obtain 6,6-dimethyl-17α,20-isopropylidenedioxy-4,5-seco-3-pregnyn-5-one. Purify by chromatography on Florisil eluting with benzene-ether (50:1). Evaporate the combined eluates to a residue comprising 6,6-dimethyl-17α,20-isopropylidenedioxy-4,5-seco-3-pregnyn-5-one; $\lambda_{max}^{film}$ 3.0 and 4.7 (C ≡ C—H); 5.9 μ (C = O). nmr 6.02 (quartet, J = 6 cps, $C_{20}$-H); 8.60 ($I_p$-CH$_3$); 8.69 (doublet, J = 6 cps, $C_{21}$-CH$_3$); 8.74 ($I_p$-CH$_3$); 8.87 ($C_8$-CH$_3$); 8.94 ($C_{19}$-CH$_3$); 8.98 ($C_6$-CH$_3$); 9.13 τ ($C_{18}$-CH$_3$). This product is used in the following reaction 29B without further purification.

B. 6,6-Dimethyl-17α,20-isopropylidenedioxy-4,5-seco-pregnane-3,5-dione

In a manner similar to that described in Example 15B treat 6,6-dimethyl-17α,20-isopropylidenedioxy-4,5-seco-3-pregnyn-5-one in 80 percent dioxane with mercuric oxide and trifluoroacetic acid. Isolate the resultant product to obtain 6,6-dimethyl-17α,20-isopropylidenedioxy-4,5-seco-pregnane-3,5-dione. This product is homogeneous as determined by thin layer chromatographic analysis on Si-GF utilizing as solvent system benzene-ether (1:1) $\lambda_{max}^{film}$

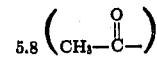

5.9 μ (C=O). nmr 6.02 (quartet, J = 6 cps, $C_{20}$-H); 7.93

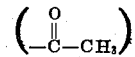

8.63 (doublet, J = 6 cps, $C_{21}$-CH$_3$); 8.74 ($I_p$-CH$_3$); 8.88 ($C_6$-CH$_3$); 8.92 ($C_{19}$-CH$_3$); 8.98 ($C_6$-CH$_3$); 9.31 τ ($C_{18}$-CH$_3$). This product is used in the subsequent reaction of Example 29C without further purification.

C. 6,6-Dimethyl-17α,20-isopropylidenedioxy-4-pregnen-3-one

In a manner similar to that described in Example 14C treat 6,6-dimethyl-17α,20-isopropylidenedioxy-4,5-seco-pregnane-3,5-dione with potassium tertiary butoxide in t-butanol and isolate the resultant product to obtain 6,6-dimethyl-17α,20-isopropylidenedioxy-4-pregnen-3-one. Purify by crystallization from acetone; m.p. 200°–203°C $\lambda_{max}^{Nujol}$ 6.0(C=O); 6.25(C=C). nmr 4.22($C_4$-H); 6.04 (quartet, J = 6 cps, $C_{20}$-H); 8.64 ($I_p$-CH$_3$); 8.72 (doublet, J = 6 cps, $C_{21}$-CH$_3$); 8.74 ($I_p$-CH$_3$ and $C_{19}$-CH$_3$); ($C_6$-CH$_3$); 8.90 ($C_6$-CH$_3$); 9.32 τ ($C_{18}$-CH$_3$).

D. 6,6-Dimethyl-4-pregnene-17α,20-diol-3-one

Heat at reflux temperature for 5 hours a solution of 500 mg. of 6,6-dimethyl-17α,20-isopropylidenedioxy-4-pregnen-3-one in 50 ml. 80 percent aqueous acetic acid. Pour the reaction mixture into ice water and extract with chloroform. Wash the combined chloroform extracts with aqueous sodium bicarbonate solution, then water and dry over sodium sulfate. Evaporate in vacuo to a residue (417 mg.) comprising 6,6-dimethyl-4-pregnene-17α,20-diol-3-one. $\lambda_{max}^{Nujol}$ 2.85 (OH); 6.03 (C=O); 6.25 μ (C=C). nmr 4.06 ($C_4$-H); 6.0 (multiplet, $C_{20}$-H); 8.70 ($C_{19}$-CH$_3$); 8.81 and 8.82 (doublet, J = 6 cps, two different $C_{21}$-CH$_3$'s); 8.82 ($C_6$-CH$_3$); 8.87 ($C_6$-CH$_3$); 9.13 and 9.20 τ (two different $C_{18}$-CH$_3$'s). This product was a mixture of isomers at $C_{20}$. This product is used without further purification in the procedure of Example 29E immediately following.

E. 6,6-Dimethyl-17α-hydroxyprogesterone

To a solution of 680 mg. of 6,6-dimethyl-17α,20-diol-4-pregnen-3-one in 15 ml. of dry dimethylsulfoxide and 15 ml. dry benzene, add 1.16 g. of dicyclohexylcarbodiimide and 182 mg. pyridinium trifluoroacetate. Stir under an atmosphere of nitrogen at 70°C for 24 hours. Add 30 ml. of ethyl acetate and remove the resultant precipitate by filtration. Extract the filtrate with aqueous sodium bicarbonate solution, 3 percent hydrochloric acid, then water and dry over sodium sulfate. Evaporate the solvent in vacuo and chromatograph the resultant residue on 75 g. Florisile eluting first with benzene-ether (9:1) and then with benzene-ether (3:1). Evaporate the 3:1 benzene-ether eluates to a residue (254 mg.) comprising 6,6-dimethyl-17α-hydroxyprogesterone. Prepare an analytical sample by repeated crystallization from methylene chloride-hexane; $\lambda_{max}^{Nujol}$ 2.9 (OH); 5.85 (CH$_3$-C=O); 6.0 (C=O); 6.25 μ (-C=C-). nmr 4.05 ($C_4$-H); 7.74 ($C_{21}$-

CH$_3$); 8.72 (C$_{19}$-CH$_3$); 8.83 (C$_6$-CH$_3$); 8.87 (C$_6$-CH$_3$); 9.24 $\tau$ (C$_{18}$-CH$_3$).

EXAMPLE 30

Conversion of 17$\alpha$,20-isopropylidenedioxy-4,5-seco-3-pregnyn-5-one to 6,6-pentamethylene-17$\alpha$-hydroxyprogesterone A. 6,6-Pentamethylene-17$\alpha$,20-isopropylidenedioxy-4,5-seco-3-pregnyn-5-one In a manner similar to that described in Example 10A treat 17$\alpha$,20-isopropylidenedioxy-4,5-seco-3-pregnyn-5-one (compound of Example 28B) with sodium hydride in tetrahydrofuran under an atmosphere of nitrogen followed by treatment with 1,5-dibromo-pentane in tetrahydrofuran. Isolate the product thereby formed to give 6,6-pentamethylene-17$\alpha$,20-isopropylidene-dioxy-4,5-seco-3-pregnyn-5-one. Purify by chromatography on silica gel eluting with benzene-ether (100:1); $\lambda_{max}$-$^{Nujol}$ 3.0 and 4.7 (C $\equiv$ C-H); 5.9 $\mu$ (C=O). nmr 6.06 (quartet, J = 6 cps, C$_{20}$-H); 8.6 (-(CH$_2$) $\equiv$ ); 8.64 (I$_p$-CH$_3$); 8.73 (doublet, J = 6 cps, C$_{21}$-CH$_3$); 8.76 (I$_p$-CH$_3$); 9.01 (C$_{19}$-CH$_3$); 9.32 $\tau$(C$_{18}$-CH$_3$). This compound is used without further purification in the procedure of Example 30B immediately following.

B. 6,6-Pentamethylene-17$\alpha$,20-isopropylidenedioxy-4,5-seco-pregnane-3,5-dione In a manner similar to that described in Example 15B, treat 6,6-pentamethylene-17$\alpha$,20-isopropylidenedioxy-4,5-seco-3-pregnyn-5-one in 90 percent dioxane with mercuric oxide and trifluoroacetic acid. Isolate the product thereby formed in a manner similar to that described in 15B to obtain 6,6-pentamethylene-17$\alpha$,20-isopropylidenedioxy-isopropylidenedioxy- 4,5-seco-pregnane-2,5-dione; $\lambda_{max}$-$^{Nujol}$ 5.93 (CH$_3$-C'=O); 5.97 $\mu$ (C = O). This compound is used without further purification in the procedure of Example 30C immediately following.

C. 6,6-Pentamethylene-17$\alpha$,20-isopropylidenedioxy-4-pregnen-3-one

In a manner similar to that described in Example 9B, treat 6,6-pentamethylene-17$\alpha$,20-isopropylidenedioxy-4,5-seco-pregnane-3,5-dione with potassium tertiary butoxide in t-butanol. Isolate the resultant product in the manner described in 9B to obtain 6,6-pentamethylene-17$\alpha$,20-isopropylidendioxy-4-pregnen-3-one which is a homogeneous product by thin layer chromatographic analysis on Si-GF plate utilizing as solvent system benzene-ether (1:1). $\lambda_{max}$$^{film}$ 5.96 (C = O); 6.25 $\mu$ (C = C). This product is used without further purification in the procedure of Example 30D immediately following.

D. 6,6-Pentamethylene-4-pregnene-17$\alpha$,20-diol-3-one

In a manner similar to that described in Example 29D, reflux an acetic acid solution of 6,6-pentamethylene-17$\alpha$,20-isopropylidenedioxy-4-pregnen-3-one for 5 hours. Isolate the resultant product in a manner similar to that described in 29D to obtain 6,6-pentamethylene-4-pregnene-17$\alpha$,20-diol-3-one. This compound is used without further purification in the procedure of Example 30 E immediately following, E. 6,6-Pentamyethylene-17$\alpha$-hydroxyprogesterone In a manner similar to that described in Example 29E, treat 6,6-pentamethylene-4-pregnene-17$\alpha$,20-diol-3-one with dimethylsulfoxide, dicyclohexylcarbodiimide and pyridinium trifluoro acetate. Isolate the resultant product in a manner similar to that described in 29E to obtain 6,6-pentamethylene-17$\alpha$-hydroxyprogesterone.

EXAMPLE 31

4,5-Seco-3-pregnyne-17$\alpha$,21-diol-5,20-dione 21-acetate

A. 4,5-Oxido-17$\alpha$,20;20,21-bis-methylenedioxypregnan-3-one

To a stirred solution of 5 g. 17$\alpha$,20;20,21-bis-methylenedioxy-4-pregnen-3-one cooled to 0°C, add dropwise 20 ml. of a 10 percent aqueous sodium hydroxide solution and 62.5 ml. of 30 percent hydrogen peroxide. Add these solutions simultaneously at rates such that the addition of both solutions will be completed at the same time and so that the reaction temperature will not exceed 3°C. Stir the reaction mixture at 0°C for 148 hours and then pour into 4 liters of ice-saturated sodium chloride solution and extract with three 1 liter portions of chloroform. Wash the combined chloroform extracts with 5 percent aqueous sodium bicarbonate solution, 2N hydrochloric acid solution, then water and dry over sodium sulfate. Distill the chloroform in vacuo and chromatograph the resultant residue dissolved in benzene on 150 g. of Merck acid washed alumina eluting with benzene. Distill the combined eluates to a residue (3.18 g.) comprising 4,5-oxido-17$\alpha$,20;20,21-bis-methylenedioxy-pregnan-3-one. Prepare an analytical sample by crystallization from ether, m.p. 167°–172°C [$\alpha$]$_D$ - 6 (CHCl$_3$), $\lambda_{max}$ $^{Nujol}$ 5.85 $\mu$ (C=O), 9.2 and 10.6 $\mu$ (BMD).

B. 17$\alpha$,20;20,21-Bis-methylenedioxy-4,5-seco-3-pregnyn-5-one

To a solution of 0.56 g. of 4$\beta$,5$\beta$-oxido-17$\alpha$,20;20,21-bis-methylenedioxy-pregnan-3-one in 100 ml. of methanol, add 0.260 g. of p-toluenesulfonyl hydrazine. Heat the reaction mixture for 15 minutes at 60°C, then stir at room temperature for 20 hours. Pour the reaction mixture into 500 ml. of an ice-saturated sodium chloride solution and extract with three 150 ml. portions of chloroform. Wash the combined chloroform extracts with a 5 percent aqueous sodium bicarbonate solution, 2N hydrochloric acid solution, then water and dry over sodium sulfate. Distill the chloroform in vacuo and dissolve the resultant residue in benzene and chromatograph on 20 g. of Merck acid washed alumina eluting with benzene-ether. Evaporate the combined benzene-ether eluates to a residue (0.370 g.) comprising 17$\alpha$,20;20,21-bis-methylenedioxy-4,5-seco-3-pregnyn-5-one. Prepare an analytical sample by recrystallization from methylene chloride-hexane, m.p. 101°–102°C [$\alpha$]$_D$ 75 (CHCl$_3$), $\lambda_{max}$ $^{Nujol}$ 3.0 and 4.7 (C $\equiv$ C-H), 5.8 (C=O), and 9.2 and 10.6 $\mu$ (BMD). nmr 4.9 and 5.14 $\tau$(BMD-4H, 6.1 (C$_{21}$-2H) 8.93 (C$_{19}$3H) and 9.13 $\tau$(C$_{18}$-3H)

C. 4,5-Seco-3-pregnyne-17$\alpha$,21-diol-5,20-dione 21-acetate

To a solution of 2.5 g. of 17$\alpha$,20;20,21-bis-methylenedioxy-4,5-seco-3-pregnyn-5-one in 150 ml. of glacial acetic acid under an atmosphere of nitrogen, add 100 ml. of water. Heat the reaction mixture on a steam bath for 7 hours, then distill the aqueous acetic acid in vacuo. Dissolve the resultant residue in 50 ml. of pyridine and add 50 ml. of acetic anhydride. Allow the reaction mixture to stand at room temperature under an atmosphere of nitrogen for 16 hours. Distill the pyridine and acetic anhydride in vacuo and dissolve the resultant residue in benzene and chromatograph on 75 g. of silica gel-G eluting with ether-25 percent benzene, ether, and chloroform. Evaporate the combined eluates to a residue (0.7 g.) comprising 4,5-seco-3-pregnyne-17α,21-diol-5,20-dione 21-acetate. Prepare an analytical sample by crystallization from ether; m.p. 128°–130°C. $\lambda_{max}^{Nujol}$ 2.85 (-OH), 5.73, 5.78, and 59.3 (C=O), and 8.0 μ

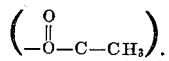

EXAMPLE 32

Preparation of 17α,20;20,21-bis-methylenedioxy-4,5-seco-3-pregnyne-5,11-dione and conversion thereof to 6,6-dimethyl-4-pregnene-17α,21-diol-3,11,20-trione A. 4,5-Oxido-17α,20;20,21-bis-methylenedioxy-pregnane-3,11-dione To a stirred solution of 8 g. of 17α,20;20,21-bis-methylenedioxy-4-pregnene-3,11-dione in 300 ml. of dioxane cooled to 0°C, add 16 ml. 30 percent hydrogen peroxide and 30 ml. 1N sodium hydroxide. Stir the reaction mixture for 24 hours at room temperature, then pour into 1500 ml. of ice water, filter the resultant precipitate, wash with water and crystallize from methylene chloride-ether to obtain 4,5-oxido-17α,20;20,21-bis-methylenedioxy-pregnane-3,11-dione (4.32 g.); m.p. 291°–295°C. $\delta_{max}^{Nujol}$ 5.85 (C=O), 9.2, 10.6 μ (BMD). nmr 4.81, 4.93, 5.00 (BMD-4H), 6.04 ($C_{21}$-2H), 6.98 ($C_4$-H), 8.73 ($C_{18}$-3H), 9.17 ($C_{19}$-3H).

B. 17α,20;20,21-Bis-methylenedioxy-4,5-seco-3-pregnyne-5,11-dione

Dissolve 4.32 g. of 4,5-oxido-17α,20;20,21-bismethylenedioxy-pregnane-3,11-dione in 1 liter n-propyl alcohol and add 2.14 g. p-toluenesulfonyl hydrazine. Stir the reaction mixture at room temperature for 22 hours then concentrate in vacuo to a residue. Chromatograph the residue on 200 g. alumina eluting with benzene-10 percent ether and benzene-20 percent ether. Evaporate the combined eluates to a residue (2.43 g.) comprising 17α,20;20,21-bis-methylenedioxy-4,5-seco-3-pregnyne-5,11-dione. Prepare an analytical sample by recrystallizing from methanol; m.p. 149.5°–150.5°C $\lambda_{max}^{Nujol}$ 3.0, 4.70 (C ≡ C-H) 5.85 μ (C=O). nmr 4.80, 4.92, 5.00 (BMD-4H) 6.03 ($C_{21}$-2H), 8.70 ($C_{18}$-3H), 9.17 ($C_{19}$-3H).

C. 6,6-Dimethyl-17α,20;20,21-bis-methylenedioxy-4,5-seco-3-pregnyne-5,11-dione

Add 1 g. 17α,20;20,21-bis-methylenedioxy-4,5-seco-3-pregnyne-5,11-dione to a slurry of 2.1 g. of a 55 percent sodium hydride suspension in mineral oil and 150 ml. tetrahydrofuran. Stir the mixture at 25°C for 8 hours, then add 3 ml. methyl iodide and stir the reaction mixture for an additional 9 hours. Add dropwise 5 ml. of water to decompose any excess sodium hydride followed by an additional 300 ml. of water. Separate the tetrahydrofuran layer and extract the water layer with 100 ml. of ether. Wash the combined organic extracts with water, dry over sodium sulfate and evaporate in vacuo to a residue. Chromatograph the residue on 90 g. of alumina eluting with benzene-5 percent ether. Evaporate the combined eluates to a residue (150 mg.) comprising 6,6-dimethyl-17α,20;20,21-bis-methylenedioxy-4,5-seco-3-pregnyne-5,11-dione. Prepare an analytical sample by recrystallization from ether; m.p. 173°–175°C. $\delta_{max}^{Nujol}$ 3.0, 4.7 μ (C ≡ C-H), 5.90 μ (C=O). nmr 4.75, 4.85–5.0, (BMD-4H), 6.03 ($C_{21}$-2H), 8.71 ($C_6$-2X3H), 9.13 τ ($C_{19}$-3H).

D. 6,6-Dimethyl-17α,20;20,21-bis-methylenedioxy-4,5-seco-pregnane-3,5,11-trione

To a slurry of 5 mg. mercuric oxide in 1 ml. of dioxane, 0.1 ml. water and 0.1 ml. trifluoroacetic acid, add 50 mg. of 6,6-dimethyl-17α,20;20,21-bis-methylenedioxy-4,5-seco-3-pregnyne-3,5-dione in 1 ml. dioxane and 0.1 ml. distilled water. Stir the reaction mixture under nitrogen at 25°C for 2 hours, then pour into 50 ml. ice water and extract with methylene chloride. Wash the combined methylene chloride extracts with saturated aqueous sodium chloride then dry over sodium sulfate and evaporate in vacuo to a residue (45 mg.) comprising 6,6-dimethyl-17α,20;20,21-bis-methylenedioxy-4,5-seco-pregnane-3,5,11-trione. IR: $\lambda_{max}^{Nujol}$ 5.85 μ (C=O). nmr 4.83, 4.9-5.0 (BMD-4H), τ6.03 ($C_{21}$-2H), 7.93 ($C_4$-3H), 8.68, 8.80 ($C_6$-2X3H), 8.90 ($C_{18}$-3H), 9.10 ($C_{19}$-3H).

E. 6,6-Dimethyl-17α,20;20,21-bis-methylenedioxy-4-pregnene-3,11-dione

In a manner similar to that described in Example 14C, treat 6,6-dimethyl-17α,20;20,21-bis-methylenedioxy-4,5-seco-pregnane-3,5,11-trione with potassium tertiary butoxide in t-butanol and isolate the resultant product to obtain 6,6-dimethyl-17α,20;20,21-bis-methylenedioxy-4-pregnene-3,11-dione.

F. 6,6-Dimethyl-4-pregnene-17α,21-diol-3,11,20-trione (6,6-dimethyl cortisone)

In a manner similar to that described in Example 31C treat 6,6-dimethyl-17α,20;20,21-bis-methylenedioxy-4-pregnene-3,11-dione with 60 percent acetic acid followed by treatment of the product thereby formed with acetic anhydride in pyridine to obtain 6,6-dimethyl-4-pregnene-17α,21-diol-3,11,20-trione 21-acetate (6,6-dimethyl cortisone acetate).

EXAMPLE 33

Conversion of 4,5-seco-3-estryn-17β28-ol-5-one to 6-(n-butylthiomethylene)-testosterone 17-acetate (and of 4,5-seco-3-androstyn-17β-ol-5-one to 6-(n-butylthiomethylene)-testosterone 17-acetate)

A. 6-Formyl-4,5-seco-3-estryn-17β-ol-5-one and the C-19 analog thereof

1. In a manner similar to that described in Example 25A, treat 4,5-seco-3-estryn-17β-ol-5-one (the compound of Example 16) with ethyl formate and sodium methoxide in benzene followed by acidification and isolation of the product thereby formed to yield 6-formyl-4,5-seco-3-estryn-17β-ol-5-one (product 33A-1). $\lambda_{max}^{film}$ 2.9 (OH); 3.0 (≡ C-H); 4.7 (-C ≡ C-); 6.1 (C=O); 6.3 (C=O). This product is used without further purification in the procedure of Example 33B-1.

2. In a similar manner (i.e., as described in Example 25A), treat 4,5-seco-3-androstyn-17β-ol-5-one (the compound of Example 1) with ethyl formate and sodium methoxide in benzene followed by acidification and isolation of the product thereby formed to obtain 6-formyl-4,5-seco-3-androstyn-17β-ol-5-one (product 33A-2). $\lambda_{max}^{film}$ 2.9 (OH); 3.0 (≡ C-H); 4.7 (C ≡ C); 6.1 (C=O); 6.3 μ (C=O). This product is used without further purification in the procedure of Example 33C-2.

B. 6-(n-Butylthiomethylene)-4,5-seco-3-estryn-17β-ol-5-one

1. To a solution of 1 g. of 6-formyl-4,5-seco-3-estryn-17β-ol-5-one (product 33A-1) in 60 ml. of benzene, add 20 mg. p-toluenesulfonic acid and 0.5 ml. n-butyl mercaptan. Heat the reaction mixture for 35 hours at reflux temperature in a reaction vessel equipped with a Soxhlet extractor (calcium carbide as drying agent) under an atmosphere of nitrogen. Cool the reaction mixture to room temperature, dilute with benzene to a volume of 100 ml., then wash the organic solution with aqueous sodium bicarbonate solution and dry over sodium sulfate. Evaporate the solvent in vacuo to a residue (1.1 g.) comprising 6-(n-butylthiomethylene)-4,5-seco-3-estryn-17β-ol-5-one as an oil. $\lambda_{max}^{film}$ 2.9 (OH); 3.0 ( ≡ C-H); 4.7 (-C ≡ C-); 6.05 μ (C=O). This product is used without further purification in the procedure of Example 33C which immediately follows.

C. 6-(n-Butylthiomethylene)-4,5-seco-3-androstyn-17β-ol-5-one

1. To a solution of 1.1 g. 6-(n-butylthiomethylene)-4,5-seco-3-estryn-17β-ol-5-one (product 33B-1) in 50 ml. of dry t-butanol, add 1.3 g. of potassium tertiary butoxide. Stir the reaction mixture at room temperature under an atmosphere of nitrogen for 5 minutes, then add an excess (10 ml.) of methyl iodide and stir at 40°C for 16 hours. Distill most of the solvent from the reaction mixture in vacuo and dissolve the resultant residue in 100 ml. of chloroform. Wash the chloroform solution with water and dry over sodium sulfate. Evaporate the solvent in vacuo and chromatograph the resultant residue (1.2 g.) on 50 g. of Florisil eluting with benzene-ether (20:1). Distill the combined eluates to a residue (610 mg.) comprising 6-(n-butylthiomethylene)-4,5-seco-3-androstyn-17β-ol-5-one (product 33C-1) as an oil. [α]$_D$ + 11° (CHCl$_3$). $\lambda_{max}^{film}$ 2.9 (OH); 3.0 ( ≡ C-H); 4.7 (-C ≡ C-); 6.0 μ (C=O).

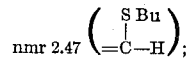

4.3 (C$_{17}$-H); 8.94 (C$_{19}$-CH$_3$); 9.20 τ(C$_{18}$-CH$_3$).

2. Alternatively the compound of this example is prepared as follows. In a manner similar to that described in Example 33B-1, treat 6-formyl-4,5-seco-3-androstyn-17β-ol-5-one with n-butyl mercaptan in benzene in the presence of p-toluenesulfonic acid. Isolate the resultant product in a manner similar to that described to obtain 6-(n-butylthiomethylene)-4,5-seco-3-androstyn-17β-ol-5-one (product 33C-2). This product is identical with that obtained in Example 33C-1 as determined by thin layer chromatographic data (Si-GF benzene-ether (1:1)) and by spectroscopic data.

D. 6-(n-Butylthiomethylene)-testosterone 17-acetate

In a manner similar to that described in Example 4A-Procedure 1, treat 6-(n-butylthiomethylene)-4,5-seco-3-androstyn-17β-ol-5-one with mercuric acetate and concentrated sulfuric acid. Isolate the resultant product in the manner described to obtain 6-(n-butylthiomethylene)-testosterone 17-acetate. Purify by chromatography on 8 × 8 inch 1 mm thick Si-GF plates utilizing as solvent system benzene-ether (1:1). Extract the product from the Si-GF plates with chloroform. Evaporate the combined chloroform eluates to a residue comprising 6-(n-butylthiomethylene)-testosterone 17-acetate. $\lambda_{max}^{film}$

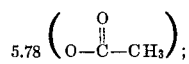

6.02 μ (C=O).

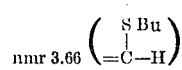

4.19 (C$_4$-H); 5.4 (C$_{17}$-H);

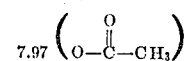

8.92 (C$_{19}$-CH$_3$); 9.17 τ(C$_{18}$-CH$_3$).

EXAMPLE 34

6,6-Dimethyl-4-pregnene-17α,21-diol-3,20-dione

A. 6,6-Dimethyl-17α,20;20,21-bis-methylenedioxy-3-pregnyn-5-one

In a manner similar to that described in Example 32C, treat 17α,20;20,21-bis-methylenedioxy-4,5-seco-3-pregnyn-5-one (compound of Example 31B) with sodium hydride in tetrahydrofuran followed by methyl iodide. Isolate and purify the resultant product in a manner similar to that described to obtain 6,6-dimethyl-17α,20;20,21-bis-methylenedioxy-3-pregnyn-5-one.

B. 6,6-Dimethyl-17α,20;20,21-bis-methylenedioxy-4,5-seco-pregnane-3,5-dione

In a manner similar to that described in Example 32D, treat 6,6-dimethyl-17α,20;20,21-bis-methylenedioxy-3-pregnyn-5-one with mercuric oxide in trifluoroacetic acid in aqueous dioxane. Isolate and purify the resultant product in a manner similar to that described to obtain 6,6-dimethyl-17α,20;20,21-bis-methylenedioxy-4,5-seco-pregnane-3,5-dione.

C. 6,6-Dimethyl-17α,20;20,21-bis-methylenedioxy-4-pregnen-3-one

In a manner similar to that described in Example 32E, treat 6,6-dimethyl-17α,20;20,21-bis-methylenedioxy-4,5-seco-pregnane-3,5-dione with potassium tertiary butoxide in t-butanol. Isolate and purify the resultant product in a manner similar to that described to obtain 6,6-dimethyl-17α,20;20,21-bis-methylenedioxy-4-pregnen-3-one.

D. 6,6-Dimethyl-4-pregnene-17α,21-diol-3,20-dione 21-acetate

In a manner similar to that described in Example 31C, treat 6,6-dimethyl-17α,20;20,21-bis-methylenedioxy-4-pregnen-3-one with 60 percent acetic acid followed by treatment of the product thereby formed with acetic anhydride in pyridine. Isolate and purify the resultant product in a manner similar to that described to obtain 6,6-dimethyl-4-pregnene-17α,21-diol-3,20-dione 21-acetate.

EXAMPLE 35

10β-n-Propyl-4,5-seco-3-estryne-5,17-dione and conversion thereof to 10β-n-propyl-4-estrene-3,17-dione (i.e. 19-ethyl-4-androstene-3,17-dione)

A. 10β-n-Propyl-4,5-seco-3-estryne-5,17-dione

In a manner similar to that described in Example 12A, treat 10β-n-propyl-4,5-seco-3-estryn-17β-ol-5-one (compound of Example 20C) with chromium trioxide in acetone. Isolate and purify the resultant product in a manner similar to that described to obtain 10β-n-propyl-4,5-seco-3-estryne-5,17-dione.

B. 10β-n-Propyl-4-estrene-3,17-dione

In a manner similar to that described in Example 4, procedure 1, treat 10β-n-propyl-4,5-seco-3-estryne-5,17-dione in acetic acid with mercuric acetate and concentrated sulfuric acid to obtain 10β-n-propyl-4-estrene-3,17-dione.

EXAMPLE 36

10β-n-Propyl-17α,20;20,21-bismethylenedioxy-4,5-seco-19-nor-3-pregnyn-11β-ol-5-one 11-acetate and conversion thereof to 10β-n-propyl- 19-nor-4-pregnene-11β,17α,21-triol-3,20-dione 21-acetate A. 17α,20;20,21-bismethylenedioxy-19-nor-4-pregnen-11β-ol-3-one-11-acetate Prepare the 17α,20;20,21-bismethylenedioxy derivative of 19-nor-hydrocortisone according to known procedures by treating 19-nor-cortisone in chloroform with 37 percent formaldehyde and hydrochloric acid.

In a manner similar to that described in Example 18A, treat 17α,20;20,21-bismethylenedioxy-19-nor-4-pregnen-11β-ol-3-one (prepared as described in the preceding paragraph) with acetic anhydride in pyridine. Isolate and purify the resultant product in a manner similar to that described in Example 18A to obtain 17α,20;20,21-bismethylenedioxy-19-nor-4-pregnen-11β-ol-3-one 11-acetate.

B. 4,5-Oxido-17α,20;20,21-bismethylenedioxy-19-nor-pregnan-11β-ol-3-one 11-acetate In a manner similar to that described in Example 32A, treat 17α,20;20,21-bismethylenedioxy-19-nor-4-pregnen-11β-ol-3-one 11-acetate with aqueous hydrogen peroxide and sodium hydroxide and isolate and purify the resultant product to obtain 4,5-oxido-17α,20;20,21-bismethylenedioxy-19-nor-pregnan-11β-ol-3-one 11-acetate.

C. 17α,20;20,21-bismethylenedioxy-4,5-seco-19-nor-3-pregnyn-11β-ol-5-one 11-acetate In a manner similar to that described in Example 32B, treat 4,5-oxido-17α,20;20,21-bismethylenedioxy-19-nor-pregnan-11β-ol-3-one 11-acetate in n-propyl alcohol with p-toluenesulfonylhydrazine. Isolate and purify the resultant product in a manner similar to that described to obtain 17α,20;20,21-bismethylenedioxy-4,5-seco-19-nor-3-pregnyn-11β-ol-5-one 11-acetate.

D. 10β-n-Propyl-17α,20;20,21-bismethylenedioxy-4,5-seco-19-nor3-pregnyn-11β-ol-5-one 11-acetate In a manner similar to that described in Example 20B, treat 17α,20;20,21-bismethylenedioxy-4,5-seco-19-nor-3-pregnyn-11β-ol-5-one 11-acetate with sodium hydride in tetrahydrofuran under an atmosphere of nitrogen followed by n-propyl iodide for 16 hours at room temperature. Isolate and purify the resultant product in a manner similar to that described to obtain 10β-n-propyl-17α,20;20,21-bismethylenedioxy-4,5-seco-19-nor-3-pregnyn-11β-ol-5-one 11-acetate.

E. 10β-n-Propyl-17α,20;20,21-bismethylenedioxy-4,5-seco-19-nor-pregnan-11β-ol-3,5-dione 11-acetate In a manner similar to that described in Example 32D, treat 10β-n-propyl-17α,20;20,21-bismethylenedioxy-4,5-seco-19-nor3-pregnyn-11β-ol-5-one 11-acetate in dioxane with mercuric oxide in aqueous trifluoroacetic acid. Isolate and purify the resultant product in a manner similar to that described to obtain 10β-n-propyl-17α,20;20,21-bismethylenedioxy-4,5-seco-19-nor-pregnan-11β-ol-3,5-dione 11-acetate.

F. 10β-n-Propyl-17α,20;20,21-bismethylenedioxy-19-nor-4-pregnen-11β-ol-3-one 11-acetate In a manner similar to that described in Example 14C, treat 10β-n-propyl-17α,20;20,21-bismethylenedioxy-4,5-seco-19-nor-pregnan-11β-ol-3,5-dione 11-acetate with potassium tertiary butoxide in t-butanol and isolate the resultant product to obtain 10β-n-propyl-17α,20;20,21-bismethylenedioxy-19-nor-4-pregnen-11β-ol-3-one 11-acetate.

G. 10β-n-Propyl-17α,20;20,21-bismethylenedioxy-19-nor-4-pregnen11β-ol-3-one

Hydrolyze the 11-acetate ester microbiologically according to known procedures utilizing *Flavo Bacterium dehydrogenans* var. *hydrolithicum* (SCH.-1111) as follows:

Prepare a culture of *Flavo Bacterium dehydrogenans* in a 1 percent Difco yeast buffered solution (10 g. of Difco yeast, 4.68 g. of disodium hydrogen phosphate, 4.48 g. of potassium dihydrogen phosphate) with shaking and illumination for 20 hours. To the culture add 0.5 g. of 10β-n-propyl-17α,20;20,21-bismethylenedioxy-19-nor-4-pregnen-11β-ol-3-one 11-acetate in 20 ml. of methanol and proceed with shaking and illumination until chromatographic analysis of an aliquot of the fermentation medium indicates deacetylation is complete. Then adjust the pH of the broth to 4.0, heat the solution to 90°C for 30 minutes with stirring, filter with the addition of filter-seal and extract the filtrate with chloroform. Extract the fermentation broth exhaustively with chloroform, dry the combined chloroform extracts over anhydrous sodium sulfate, filter and evaporate the chloroform in vacuo to a residue comprising 10β-n-propyl-17α,20;20,21-bismethylenedioxy-19-nor-4-pregnen-11β-ol-3-one.

After slight purification by trituration with hexane, this product is used without further purification in procedure 36H immediately following.

H. 10β-n-propyl-19-nor-4-pregnen-11β,17α,21-triol-3,20-dione-21-acetate (i.e. 10β-n-propyl-19-nor-hydrocortisone 21-acetate)

In a manner similar to that described in Example 31C, heat 10β-n-propyl-17α,20;20,21-bismethylenedioxy-19-nor-4-pregnen-11β-ol-3-one in aqueous acetic acid under an atmosphere of nitrogen for 7 hours, followed by treatment of the product thereby formed with acetic anhydride in pyridine to obtain 10β-n-propyl-19-nor-hydrocortisone 21-acetate.

In a similar manner, 19-nor-4-pregnene-17α,21-diol-3,20-dione may be subjected to a series of transformations similar to those described in procedures 36B through F and H to obtain 10β-n-propyl-19-nor-4-pregnene-17α,21-diol-3,20-dione 21-acetate.

EXAMPLE 37

10β-n-Propyl-17β,20-isopropylidenedioxy-4,5-seco-19-nor-3-pregnyn-5-one and conversion thereof to 10-β-n-propyl-17α-hydroxy-19-nor-progesterone A. 19-Nor-4-pregnen-17α,20-diol-3-one In a manner similar to that described in Example 27A treat 17α-Hydroxy-19-nor-progesterone with lithium aluminum in tetrahydrofuran-ether and isolate the resultant product in a manner similar to that described, and purify by treatment with magnesium dioxide in chloroform to obtain 19-nor-4-pregnen-17α,20-diol-3-one.

B. 17α,20-Isopropylidenedioxy-19-nor-4-pregnen-3-one

In a manner similar to that described in Example 37B, treat 19-nor-4-pregnen-17α,20-diol-3-one with anhydrous copper sulfate in acetone and isolate and purify the resultant product to obtain 17α,20-isopropylidenedioxy-19-nor-4-pregnen-3-one.

C. 4,5-Oxido-17α,20-isopropylidenedioxy-19-nor-pregnan-3-one

In a manner similar to that described in Example 28A, treat 17α,20-isopropylidenedioxy-19-nor-4-pregnen-3-one with 30 percent hydrogen peroxide and 10 percent sodium hydroxide and isolate and purify the resultant product to obtain 4,5-oxido-17α,20-isopropylidenedioxy-19-nor-pregnan-3-one.

D. 17α,20-Isopropylidenedioxy-4,5-seco-19-nor-3-pregnyn-5-one

In a manner similar to that described in Example 28B, treat 4,5-oxido-17α,20-isopropylidenedioxy-19-nor-pregnan-3-one with p-toluenesulfonylhydrazine in methanol. Isolate and purify the resultant product in a manner similar to that described to obtain 17α,20-isopropylidenedioxy-4,5-seco-19-nor-3-pregnyn-5-one.

E. 10β-n-Propyl-17α,20-isopropylidenedioxy-4,5-seco-3-pregnyn-5-one

In a manner similar to that described in Example 20B, treat 17α,20-isopropylidenedioxy-4,5-seco-19-nor-3-pregnyn-5-one with sodium hydride in tetrahydrofuran under an atmosphere of nitrogen followed by n-propyl iodide. Stir the reaction mixture at room temperature for 16 hours and isolate and purify the resultant product in a manner similar to that described to obtain 10β-n-propyl-17α,20-isopropylidenedioxy-4,5-seco-19-nor-3-pregnyn-5-one.

F. 10β-n-Propyl-17α,20-isopropylidenedioxy-4,5-seco-19-nor-pregnane-3,5-dione

In a manner similar to that described in Example 32D, treat 10β-n-propyl-17α,20-isopropylidenedioxy-4,5-seco-19-nor-3-pregnyn-5-one in dioxane with mercuric oxide and aqueous trifluoroacetic acid. Isolate the resultant product in a manner similar to that described to obtain 10β-n-propyl-17α,20-isopropylidenedioxy-4,5-seco-19-nor-pregnane-3,5-dione.

G. 10β-n-Propyl-17α,20-isopropylidenedioxy-19-nor-4-pregnen-3-one

In a manner similar to that described in Example 14C, treat 10β-n-propyl-17α,20-isopropylidenedioxy-4,5-seco-19-nor-pregnane-3,5-dione with potassium tertiary butoxide in t-butanol and isolate the resultant product to obtain 10β-n-propyl-17α,20-isopropylidenedioxy-19-nor-4-pregnen-3-one.

H. 10β-n-Propyl-19-nor-4-pregnene-17α,20-diol-3-one

In a manner similar to that described in Example 29D, treat 10β-n-propyl-17α,20-isopropylidenedioxy-19-nor-4-pregnen-3-one with 80 percent aqueous acetic acid at reflux temperature for 5 hours. Isolate the resultant product in a manner similar to that described to obtain 10β-n-propyl-19-nor-4-pregnene-17α,20-diol-3-one.

I. 10β-n-Propyl-17α-hydroxy-19-nor-progesterone (i.e. 10β-n-propyl-17α-hydroxy-19-nor-4-pregene-3,20-dione)

In a manner similar to that described in Example 29E, treat 10β-n-propyl-19-nor-4-pregnene-17α,20-diol-3-one in dimethylsulfoxide and benzene with dicyclohexylcarbodiimide and pyridinium trifluoro acetate. Isolate the resultant product in a manner similar to that described to obtain 10β-n-propyl-17α-hydroxy-19-nor-progesterone.

EXAMPLE 38

6,6-Ethylene-17α,20;20,21-bismethylenedioxy-4,5-seco-3-pregnyn-5-one and conversion thereof to 6,6-ethylene-4-pregnene-17α,21-diol-3,20-dione (i.e. 6,1-spirocyclopropyl-4-pregnene-17α,21-diol-3,20-dione)

A. 6,6-Ethylene-17α,20;20,21-bismethylenedioxy-4,5-seco-3-pregnyn-5-one

Add 38.9g. (0.1 mole) of 17α,20;20,21-bismethylenedioxy-4,5-seco-3-pregnyn-5-one (compound of Example 31D) to a refluxing suspension of 11.7 g. (0.3 moles) of sodium amide in 150 ml. of liquid ammonia, and stir the mixture for 1 hour. Add over a 30 minute period 56.4 g. (0.3 moles) of 1,2-dibromoethane and stir for an additional 4 hours, then stop the reaction by adding 16.1 g. of ammonium chloride. Allow the ammonia to evaporate, then add methylene chloride to the residue. Wash the methylene chloride solution with water, with 20 percent aqueous ammonium chloride and finally with water. Dry the chloroform solution over anhydrous magnesium sulfate and evaporate in vacuo to a residue comprising 6,6-ethylene-17α,20;20,21-bismethylenedioxy-4,5-seco-3-pregnyn-5-one.

In similar manner treat 17α,20;20,21-bismethylenedioxy-4,5-seco-3-pregnyne-5,11-dione (the compound of Example 32B) with sodium amide in liquid ammonia and 1,2-dibromoethane and isolate the resultant product to obtain 6,6-ethylene-17α,20;20,21-bismethylenedioxy-4,5-seco-3-pregnyne-5,11-dione.

B. 6,6-Ethylene-17α,20;20,21-bismethylenedioxy-4,5-seco-pregnane-3,5-dione

In a manner similar to that described in Example 32D, treat 6,6-ethylene-17α,20;20,21-bismethylenedioxy-4,5-seco-3-pregnyn-5-one in aqueous dioxane with mercuric oxide and aqueous trifluoroacetic acid and isolate the resultant product to obtain 6,6-ethylene-17α,20;20,21-bismethylenedioxy-4,5-seco-pregnane-3,5-dione.

C. 6,6-Ethylene-17α,20;20,21-bismethylenedioxy-4-pregnen-3-one

In a manner similar to that described in Example 32E, treat 6,6-ethylene-17α,20;20,21-bismethylenedioxy-4,5-seco-3-pregnyne-3,5-dione with potassium tertiary butoxide in t-butanol and isolate the resultant product to obtain 6,6-ethylene-17α,20;20,21-bismethylenedioxy-4-pregnen-3-one.

D. 6,6-Ethylene-4-pregnene-17α,21-diol-3,20-dione 21-acetate

In a manner similar to that described in Example 32F, treat 6,6-ethylene-17α,20;20,21-bismethylenedioxy-4-pregnen-3-one with 60 percent acetic acid followed by treatment of the product thereby formed with acetic anhydride in pyridine to obtain 6,6-ethylene-4-pregnene-17α,21-diol-3,20-dione 21-acetate.

By going through the sequence of reactions set forth in Examples 38B, C and D, 6,6-ethylene-17α,20;20,21-bismethylenedioxy-4,5-seco-3-pregnyn-5-one (prepared as in Example 38A) is converted to 6,6-ethylenecortisone 21-acetate (i.e. 6,6-ethylene-4-pregnene-17α,21-diol-3,11,20-trione 21-acetate.

EXAMPLE 39

6,6-Ethylene-17α,20-isopropylidenedioxy-4,5-seco-3-pregnyn-5-one and conversion thereof to 6,6-ethylene-17α-hydroxyprogesterone A. 6,6-Ethylene-17α,20-isopropylidenedioxy-3-pregnyn-5-one In a manner similar to that described in Example 38A, treat 17α,20-isopropylidenedioxy-4,5-seco-3-pregnyn-5-one (compound of Example 28B) with sodium amide in liquid ammonia followed by 1,2-dibromoethane and isolate the resultant product to obtain 6,6-ethylene-17α,20-isopropylidenedioxy-3-pregnyn-5-one.

B. 6,6-Ethylene-17α,20-isopropylidenedioxy-4,5-seco-pregnane-3,5-dione

In a manner similar to that described in Example 32D, treat 6,6-ethylene-17α,20-isopropylidenedioxy-4,5-seco-3-pregnyn-5-one in aqueous dioxane with mercuric oxide in aqueous trifluoroacetic acid. Isolate the resultant product to obtain 6,6-ethylene-17α,20-isopropylidenedioxy-4,5-seco-pregnane-3,5-dione.

C. 6,6-Ethylene-17α,20-isopropylidenedioxy-4-pregnen-3-one

In a manner similar to that described in Example 32E, treat 6,6-ethylene-17α,20-isopropylidenedioxy-4,5-seco-pregnane-3,5-dione with potassium tertiary butoxide in t-butanol. Isolate the resultant product to obtain 6,6-ethylene-17α,20-isopropylidenedioxy-4-pregnen-3-one.

D. 6,6-Ethylene-17α-hydroxyprogesterone

In a manner similar to that described in Example 29D, treat 6,6-ethylene-17α,20-isopropylidenedioxy-4-pregnen-3-one with 80 percent aqueous acetic acid and isolate the resultant product comprising 6,6-ethylene-4-pregnene-17α,20-diol-3-one. Treat the foregoing diol with dimethylsulfoxide, dicyclohexylcarbodiimide and pyridinium trifluoro acetate in the manner described in Example 29E. Isolate the resultant product to obtain 6,6-ethylene-17α-hydroxyprogesterone.

E. 6,6-Ethylene-17α-acetoxyprogesterone

To a solution of 1 g. of 6,6-ethylene-17α-hydroxyprogesterone in 10 ml. of acetic acid through which argon gas is being bubbled, add under anhydrous conditions 1.99 ml. of trifluoroacetic anhydride. Heat the solution at about 80–95°C for an hour, then pour into ice water, extract with methylene chloride and wash the combined extracts with 3 percent aqueous potassium carbonate and then with water. Evaporate the methylene chloride solution in vacuo to a residue comprising 6,6-ethylene-17α-acetoxyprogesterone.

EXAMPLE 40

6,6-Ethylene-9α-fluoro-16β-methyl-17α,20;20,21-bismethylenedioxy-4,5-seco-3-pregnyn-11β-ol-5-one and conversion thereof to 6,6-ethylene-betamethasone 21-acetate (i.e. 6,6-ethylene-9α-fluoro-16β-methyl-1,4-pregnadiene-11β,17α,21-triol-3,20-dione 21-acetate)

A. 4,5Oxido-9α-fluoro-16β-methyl-17α,20;20,21-bismethylendioxy-pregnan-11β-ol-3-one Prepare the 17α,20;20,21-bismethylenedioxy derivative of betamethasone according to known procedures by treating betamethasone in chloroform with 37 percent formaldehyde and hydrochloric acid.

In a manner similar to that described in Example 32A, treat 9α-fluoro-16β-methyl-17α,20;20,21-bismethylenedioxy-4-pregnen-11β-ol-3-one with aqueous hydrogen peroxide and sodium hydroxide and isolate the resultant product to obtain 4,5-oxido-9α-fluoro-16β-methyl-17α,20;20,21-bismethylenedioxy-pregnan11β-ol-3-one.

B. 9α-Fluoro-16β-methyl-17α,20;20,21-bismethylenedioxy-4,5-seco-3-pregnyn-11β-ol-5-one In a manner similar to that described in Example 32B, treat 4,5-oxido-9α-fluoro-16β-methyl-17α,20;20,21-bismethylenedioxy-pregnan-11β-ol-3-one in n-propanol with p-toluenesulfonylhydrazine. Isolate and purify the resultant product in a manner similar to that described to obtain 9α-fluoro-16β-methyl-17α,20;20,21-bismethylenedioxy-4,5-seco-3-pregnyn-11β-ol-5-one.

C. 6,6-Ethylene-9α-fluoro-16β-methyl-17α,20;20,21-bismethylenedioxy-4,5-seco-3-pregnyn-11β-ol-5-one In a manner similar to that described in Example 38A, treat 9α-fluoro-16β-methyl-17α,20;20,21-bismethylenedioxy-4,5-seco-3-pregnyn-11β-ol-5-one with sodium amide in refluxing ammonia followed by 1,2-dibromoethane. Isolate the resultant product in a manner similar to that described to obtain 6,6-ethylene-9α-fluoro-16β-methyl-17α,20;20,21-bismethylenedioxy-4,5-seco-3-pregnyn-11β-ol-5-one.

D. 6,6-Ethylene-9α-fluoro-16β-methyl-17α,20;20,21-bismethylenedioxy-4,5-seco-pregnan-11β-ol-3,5-dione In a manner similar to that described in Example 32D, treat 6,6-ethylene-9α-fluoro-16β-methyl-17α,20;20,21-bismethylenedioxy-4,5-seco-3-pregnyn-11β-ol-5-one in aqueous dioxane with mercuric oxide and aqueous trifluoroacetic acid. Isolate the resultant produce to obtain 6,6-ethylene-9α-fluoro-16β-methyl-17α,20;20,21-bismethylenedioxy-4,5-seco-pregnan-11β-ol-3,5-dione.

E. 6,6-Ethylene-9α-fluoro-16β-methyl-17α,20;20,21-bismethylenedioxy-4-pregnen-11β-ol-3-one In a manner similar to that described in Example 32E, treat 6,6-ethylene-9α-fluoro-16β-methyl-17α,20;20,21-bismethylenedioxy-4,5-seco-pregnan-11β-ol-3,5-dione with potassium tertiary butoxide in t-butanol. Isolate the resultant product in a manner similar to that described to obtain 6,6-ethylene-9α-fluoro-16β-methyl-17α,20;20,21-bismethylenedioxy-4-pregnen-11β-ol-3-one.

F. 6,6-Ethylene-dexamethasone 21-acetate (6,6-ethylene-9α-fluoro-16β-methyl-1,4-pregnadiene-11β,17α,21-triol-3,20-dione-21-acetate)

Subject 6,6-ethylene-9α-fluoro-16β-methyl-17α,20;20,21-bismethylenedioxy-4-pregnen-11β-ol-3-one to the action of the microorganism *Corynebacterium simplex* (A.T.C.C. 6946) according to known procedures such as described in U.S. Pat. No. 2,837,464 to obtain 6,6-ethylene-9α-fluoro-16β-methyl-17α,20;20,21-bismethylenedioxy-1,4-pregnadien-11β-ol-3-one.

In a manner similar to that described in Example 32F, treat the 6,6-ethylene-1,4-pregnadiene prepared in the paragraph above with aqueous acetic acid followed by treatment of the product thereby formed with acetic anhydride in pyridine to obtain 6,6-ethylene-dexamethasone 21-acetate (6,6-ethylene-9α-fluoro-16βmethyl-1,4-pregnadiene-11β,17α,21-triol-3,20-dione 21-acetate).

EXAMPLE 41

2-, 7-, and 17-Methyl analogs of 4,5-seco-3-androstyn-17β-ol-5-one and 4,5-seco-3-estryn-17β-ol-5-one and alkylated derivatives derived therefrom A. In a manner similar to that described in the procedures of Example 28A and Example 1, treat each of the following testosterone derivatives with alkaline hydrogen peroxide followed by treatment of the thereby produced 4,5-oxido derivatives with p-toluenesulfonylhydrazine in ethanol:

1. 17α-Methyltestosterone
2. 17α-Methyltestosterone 17-acetate
3. 17α-Methyl-19-nor-testosterone
4. 17α-Methyl-19-nor-testosterone acetate
5. 2α-Methyltestosterone
6. 2α-Methyltestosterone 17-acetate 7. 2α-Methyl-19-nor-testosterone
8. 2α-Methyltestosterone 17-acetate
9. 7α-Methyltestosterone
10. 7α-Methyltestosterone 17-acetate
11. 7α-Methyl-19-nor-testosterone
12. 7α-Methyl-19-nor-testosterone acetate Isolate and purify the resultant respective products in a manner similar to that described in Example 1 to obtain respectively, 1. 17α-Methyl-4,5-seco-3-androstyn-17β-ol-5-one
2. 17α-Methyl-4,5-seco-3-androstyn-17β-ol-5-one 17-acetate
3. 17α-Methyl-4,5-seco-3-estryn-17β-ol-5-one
4. 17α-Methyl-4,5-seco-3-estryn-17β-ol-5-one 17-acetate
5. 2α-Methyl-4,5-seco-3-androstyn-17β-ol-5-one
6. 2α-Methyl-4,5-seco-3-androstyn-17β-ol-5-one 17 acetate
7. 2α-Methyl-4,5-seco-3-estryn-17β-ol-5-one
8. 2α-Methyl-4,5-seco-3-estryn-17β-ol-5-one 17-acetate
9. 7αMethyl-4,5-seco-3-androstyn-17β-ol-5-one
10. 7α-Methyl-4,5-seco-3-androstyn-17β-ol-5-one 17-acetate
11. 7α-Methyl-4,5-seco-3-estryn-17β-ol-5-one
12. 7α-Methyl-4,5-seco-3-estryn-17β-ol-5-one 17acetate B. Alkylation of 4,5-seco compounds at C-6

By subjecting the 4,5-seco-3-androstyne products to 6) and 10) listed above to alkylating procedures such as described in Examples 10A, 15A and 38A, there are obtained respectively the 6,6-pentamethylene-, the 6,6-dimethyl-, and the 6,6-ethylene derivatives of 17α-methyl-4,5-seco-3-androstyn-17β-ol-5-one 17-acetate, 2α-methyl-4,5-seco-3-androstyn-17β-ol-5-one 17-acetate and 7α-methyl-4,5-seco-17β-ol-5-one 17-acetate. By treating each of the foregoing 6,6-disubstituted 4,5-seco compounds according to procedures similar to those described in Examples 9A and 9B, there are obtained respectively, 1. 6,6-Pentamethylene-17α-methyltestosterone 17-acetate
2. 6,6,17-Trimethyltestosterone 17-acetate
3. 6,6-Ethylene-17α-methyltestosterone 17-acetate
4. 2α-Methyl-6,6-pentamethylenetestosterone 17-acetate
5. 2α-Methyl-6,6-trimethyltestosterone 17-acetate
6. 2α-Methyl-6,6-ethylenetestosterone 17-acetate
7. 6,6-Pentamethylene-7α-methyltestosterone 17-acetate
8. 6,6,7α-Trimethyltestosterone 17-acetate
9. 6,6-Ethylene-7α-methyltestosterone 17-acetate C. Alkylation of 4,5-seco compounds at C-10

Treat each of the 4,5-seco-3-estryne products in Example 41A identified under Nos. 4), 8) and 12) with sodium hydride in tetrahydrofuran followed by n-propyl iodide according to the procedure to Example 20B to obtain respectively, 10β-n-propyl-17α-methyl-4,5-seco-3-androstyn-17β-ol-5-one 17-acetate, 2α-methyl-10β-n-propyl-4,5-seco-3-androstyn-17β-ol-5-one, and 7α-methyl-10β-n-propyl-4,5-seco-3-androstyn-17β-ol-5-one 17-acetate.

D. By treating each of the foregoing 10β-n-propyl derivatives in a manner similar to that described in Examples 9A and 9B, there are obtained respectively, 10β-n-propyl-17α-methyl-19-nor-testosterone 17-acetate, 2α-methyl-10β-n-propyl-19-nor-testosterone 17-acetate and 7α-methyl-10β-n-propyl-19-nor-testosterone 17-acetate.

EXAMPLE 42

21-Desoxy-4,5-seco-3-pregnynes and alkylated derivatives produced therefrom

A. Treat each of the progesterone derivatives listed below in the following manner:

a. Reduce the 20-keto group to a 20-hydroxy function in a manner similar to that described in Example 20.
b. In any 17α-hydroxy compound convert the resulting 17α,20-diol to the corresponding 17α,20-isopropylidenedioxy derivative via the procedure described in Example 27B.
c. In the 17-desoxyprogesterones esterify the resulting 20-ol via procedures such as in Example 18A.
d. In the 9-unsubstituted compounds convert any 11β-hydroxyl group present to the corresponding 11-acetate by procedures such as in Example 39E.
e. Treat the resulting derivatives prepared as outlined in steps a.–d. above with alkaline hydrogen peroxide in the manner of Example 28A followed by treatment of the 4,5-oxido compound thereby formed with p-toluenesulfonylhydrazine in the manner of Example 28B.

1. 16α-Methyl-17α-hydroxyprogesterone
2. 16β-Methyl-17α-hydroxyprogesterone
3. 11β,17α-Hydroxyprogesterone
4. 9α-Fluoro-11β,17α-dihydroxyprogesterone
5. 11β,17α-Dihydroxy-16α-methylprogesterone
6. 11β,17α-Dihydroxy-16β-methylprogesterone
7. 9α-Fluoro-11β,17α-dihydroxy-16α-methylprogesterone
8. 9α-Fluoro-17α-hydroxy-16β-methylprogesterone
9. 16α-Methylprogesterone
10. 16β-Methylprogesterone
11. 11β-Hydroxyprogesterone 12. gα-Fluoro-11β-hydroxyprogesterone
13. 11β-Hydroxy-16α-methylprogesterone
14. 11β-Hydroxy-16β-methylprogesterone
15. 9α-Fluoro-11α-hydroxy-16α-methylprogesterone
16. 9αFluoro-11β-hydroxy-16β-methylprogesterone
17. Progesterone
18. 11β,17α-Hydroxy-19-nor-progesterone
19. 19-Nor-progesterone
20. 11β-Hydroxy-19-nor-progesterone.

The respective products obtained after treatment according to procedures 42A a) to e) outlined above are as follows:

1. 16α-Methyl-17α,20-isopropylidenedioxy-4,5-seco-3-pregnyn-5-one
2. 16β-Methyl-17α,20-isopropylidenedioxy-4,5-seco-3-pregnyn-5-one
3. 11β-Acetoxy-17β,20-isopropylidenedioxy-4,5-seco-3-pregnyn-5-one
4. 9α-Fluoro-11β-hydroxy-17α,20-isopropylidenedioxy-4,5-seco-3-pregnyn-5-one
5. 11β-Acetoxy-16α-methyl-17α,20-isopropylidenedioxy-4,5-seco-3-pregnyn-5-one
6. 11β-Acetoxy-16β-methyl-17α,20-isopropylidenedioxy-4,5-seco-3-pregnyn-5-one
7. 9α-Fluoro-11β-hydroxy-16α-methyl-17α,20-isopropylidenedioxy-4,5-seco-3-pregnyn-5-one
8. 9α-Fluoro-11β-hydroxy-16β-methyl-17α,20-isopropylidenedioxy-4,5-seco-3-pregnyn-5-one
9. 16α-Methyl-20-acetoxy-4,5-seco-3-pregnyn-5-one
10. 16β-Methyl-20-acetoxy-4,5-seco-3-pregnyn-5-one 11. 11β,20-Diacetoxy-4,5-seco-3-pregnyn-5-one
12. 9α-Fluro-11β-hydroxy-20-acetoxy-4,5-seco-3-pregnyn-5-one
13. 16α-Methyl-11β,20-diacetoxy-4,5-seco-3-pregnyn-5-one
14. 16β-Methyl-11β,20-diacetoxy-4,5-seco-3-pregnyn-5-one
15. 9α-Fluoro-11β-hydroxy-16α-methyl-20-acetoxy-4,5-seco-3-pregnyn-5-one
16. 9α-Fluoro-11β-hydroxy-16β-methyl-20-acetoxy-4,5-seco-3-pregnyn-5one
17. 20-Acetoxy-4,5-seco-3-pregnyn-5-one
18. 11β-Acetoxy-17α,20-isopropylidenedioxy-19-nor-4,5-seco-3-pregnyn-5-one
19. 20-Acetoxy-4,5-seco-3-pregnyn-5-one
20. 11β,20-Diacetoxy-19-nor-4,5-seco-3-pregnyn-5-one.

B. Alkylation of the 4,5-seco products at C-6 and C-10

By treating each of the 4,5-seco-3-pregnyne products listed in Example 40A above under Nos. 1) through 17) with sodium amide in liquid ammonia followed by ethylene bromide according to the procedure of Example 17A, there is obtained the corresponding 6,6-ethylene derivative thereof. Similarly, by treating each of the products listed in Example 42A under Nos. 1) through 17) with sodium hydride in tetrahydrofuran followed by treatment with pentamethylene dibromide according to the procedure of Example 10A, there is obtained the corresponding 6,6-pentamethylene derivative thereof.

By treating each of the 19-nor-3-pregnyne products listed in Example 42A under Nos. 18) through 20) in tetrahydrofuran with sodium hydride followed by n-propyl iodide according to procedure 20B, there is obtained the corresponding 10β-n-propyl derivative, i.e., 10β-n-propyl-11β-acetoxy-17α,20-isopropylidenedioxy-4,5-seco-3-pregnyn-5-one, 10β-n-propyl-20-acetoxy-4,5-seco-3-pregnyn-5-one and 10β-n-propyl-11β,20-diacetoxy-4,5-seco-3-pregnyn-5-one.

C. Ring closure of alkylated 4,5-seco derivatives

Treat each of the 6,6-ethylene derivatives prepared as described in above Example 42B, first paragraph, and each of the 10β-n-propyl derivatives prepared as described in Example 42B, third paragraph, in the manner described in procedures 39A through 39D together with the procedure of Example 36G for hydrolysis of any 11 and/or 20-acetate esters which may be present, and there will be obtained the following respective products:

1. 6,6-Ethylene-16α-methyl-17α-hydroxyprogesterone
2. 6,6-Ethylene-16β-methyl-17α-hydroxyprogesterone
3. 6,6-Ethylene-11β,17α-hydroxyprogesterone
4. 6,6-Ethylene-9α-fluoro-11β,17α-dihydroxyprogesterone
5. 6,6-Ethylene-11β,17α-dihydroxy-16α-methylprogesterone
6. 6,6-Ethylene-11β,17α-dihydroxy-16β-methylprogesterone
7. 6,6-Ethylene-9α-fluoro-11β,17α-dihydroxy-16α-methylprogesterone
8. 6,6-Ethylene-9α-fluoro-17α-hydroxy-16β-methylprogesterone
9. 6,6-Ethylene-16α-methylprogesterone
10. 6,6-Ethylene-16β-methylprogesterone
11. 6,6-Ethylene-11β-hydroxyprogesterone
12. 6,6-Ethylene-9α-fluoro-11β-hydroxyprogesterone
13. 6,6-Ethylene-11β-hydroxy-16α-methylprogesterone
14. 6,6-Ethylene-11β-hydroxy-16β-methylprogesterone
15. 6,6-Ethylene-9α-fluoro-11β-hydroxy-16α-methylprogesterone
16. 6,6-Ethylene-9α-fluoro-11β-hydroxy-16β-methylprogesterone
17. 6,6-Ethylene-progesterone
18. 10β-n-Propyl-11β,17α-dihydroxy-19-nor-progesterone
19. 10β-n-Propyl-19-nor-progesterone
20. 10β-n-Propyl-11β-hydroxy-19-nor-progesterone

EXAMPLE 43

21-Oxygenated-4,5-seco-3-pregnynes and alkylated derivatives produced therefrom

A. Treat each of the starting compounds listed above in the following manner:
a. Prepare the 17α,20;20,21-bismethylenedioxy derivative according to known procedures as outlined in the first paragraph of Example 40A.
b. In any 9-unsubstituted corticoid having an 11β-hydroxyl group, esterify the 11β-hydroxyl group according to procedures such as described in Example 36A.
c. Treat each of the resulting derivatives prepared in steps a) and b) with alkaline hydrogen peroxide followed by treatment of the 4,5-oxido compounds thereby formed with p-toluene-sulfonylhydrazine according to the procedures of Examples 32A and 32B.

1. 2α-Methyl-4-pregnene-17α,21-diol-3,11,20-trione
2. 9α-Fluoro-4-pregnene-17α,21-diol-3,11,20-trione
3. 16α-Methyl-4-pregnene-17α,21-diol-3,11,20-trione
4. 16β-Methyl-4-pregnene-17α,21-diol-3,11,20-trione
5. 2α,16α-Dimethyl-4-pregnene-17α,21-diol-3,11,20-trione
6. 2α,16β-Dimethyl-4-pregnene-17α,21-diol-3,11,20-trione
7. 2α-Methyl-9α-fluoro-4-pregnene-11β,21-diol-3,11,20-trione
8. 9α-Fluoro-16α-methyl-4-pregnene-17α,21-diol-3,11,20-trione
9. 9α-Fluoro-16β-methyl-4-pregnene-17α,21-diol-3,11,20-trione
10. 2α,16α-Dimethyl-9α-fluoro-4-pregnene-17α,21-diol-3,11,20-trione
11. 2α,16β-Dimethyl-9α-fluoro-4-pregnene-17α,21-diol-3,11,20-trione
12. 4-Pregnene-11β,17α,21-triol-3,20-dione
13. 2α-Methyl-4-pregnene-11β,17α,21-triol-3,20-dione
14. 9α-Fluoro-4-pregnene-11β,17α,21-triol-3,20-dione
15. 16α-Methoxy-4-pregnene-11β,17α,21-triol-3,20-dione
16. 16α-Methyl-4-pregnene-11β,17α,21-triol-3,20-dione
17. 16β-Methyl-4-pregnene-11β,17α,21-triol-3,20-dione
18. 2α,16α-Dimethyl-4-pregnene-11β,17α,21-triol-3,20-dione 19. 2α,16β-Dimethyl-4-pregnene-11β,17α,21-triol-3,20-dione
20. 2α-Methyl-9α-fluoro-4-pregnene-11β,17α,21-triol-3,20-dione
21. 9α-Fluoro-16α-methyl-4-pregnene-11β,17α,21-triol-3,20-dione
22. 9α-Fluoro-16β-methyl-4-pregnene-11β,17α,21-triol-3,20-dione
23. 2α,16α-Dimethyl-9α-fluoro-4-pregnene-11β,17α,21-triol-3,20-dione
24. 2α,16β-Dimethyl-9α-fluoro-4-pregnene-11β,17α,21-triol-3,20-dione
25. 16α-Methyl-4-pregnene-17α,21-diol-3,20-dione
26. 16β-Methyl-4-pregnene-17α,21-diol-3,20-dione
27. 2α,16α-Dimethyl-4-pregnene-17α,21-diol-3,20-dione
28. 2α,16β-Dimethyl-4-pregnene-17α,21-diol-3,20-dione.

The respective resultant products obtained when the above compounds are treated in accordance with steps a through c listed above are as follows:

1. 2α-Methyl-17α,20;20,21-bismethylenedioxy-4,5-seco-3-pregnyne-5,11-dione
2. 9α-Fluoro-17α,20;20,21-bismethylenedioxy-4,5-seco-3-pregnyne-5,11-dione
3. 16α-Methyl-17α,20;20,21-bismethylenedioxy-4,5-seco-3-pregnyne-5,11-dione
4. 16β-Methyl-17α,20;20,21-bismethylenedioxy-4,5-seco-3-pregnyne-5,11-dione
5. 2α,16α-Dimethyl-17α,20;20,21-bismethylenedioxy-4,5-seco-3-pregnyne-5,11-dione
6. 2α,16β-Dimethyl-17α,20;20,21-bismethylenedioxy-4,5-seco-3-pregnyne-5,11-dione
7. 2α-Methyl-9α-fluoro-17α,20;20,21-bismethylenedioxy-4,5-seco-3-pregnyne-5,11-dione
8. 9α-Fluoro-16α-methyl-17α,20;20,21-bismethylenedioxy-4,5-seco-3-pregnye-5,11-dione
9. 9α-Fluoro-16β-methyl-17α,20;20,21-bismethylenedioxy-4,5-seco-3-pregnyne-5,11-dione
10. 2α,16α-Dimethyl-9α-fluoro-17α,20;20,21-bismethylenedioxy-4,5-seco-3-pregnyne-5,11-dione
11. 2α,16β-Dimethyl-9α-fluoro-17α,20;20,21-bismethylenedioxy-4,5-seco-3-pregnyne-5,11-dione
12. 11β-Acetoxy-17α,20;20,21-bismethylenedioxy-4,5-seco-3-pregnyn-5-one
13. 2α-Methyl-11β-acetoxy-17α,20;20,21-bismethylenedioxy-4,5-seco-3-pregnyn-5-one
14. 9α-Fluoro-11β-hydroxy-17α,20;20,21-bismethylenedioxy-4,5-seco-3-pregnyn-5-one
15. 11β-Acetoxy-16α-methoxy-17α,20;20,21-bismethylenedioxy-4,5-seco-3-pregnyn-5-one
16. 11β-Acetoxy-16α-methyl-17α,20;20,21-bismethylenedioxy-4,5-seco-3-pregnyn-5-one
17. 11β-Acetoxy16β-methyl-17α,20;20,21-bismethylenedioxy-4,5-seco-3-pregnyn-5-one
18. 2α,16α-Dimethyl-11β-acetoxy-17α,20;20,21-bismethylenedioxy-4,5-seco-3-pregnyn-5-one
19. 2α,16β-Dimethyl-11β-acetoxy-17α,20;20,21-bismethylenedioxy-4,5-seco-3-pregnyn-5-one
20. 2α-Methyl-9α-fluoro-11β-hydroxy-17α,20;20,21-bismethylenedioxy-4,5-seco-3-pregnyn-5-one
21. 9α-Fluoro-11β-hydroxy-16α-methyl-17α,20;20,21-bismethylenedioxy-4,5-seco-3-pregnyn-5-one
22. 9α-Fluoro-11β-hydroxy-16β-methyl-17α,20;20,21-bismethylenedioxy-4,5-seco-3-pregnyn-5-one
23. 2α,16α-Dimethyl-9α-fluoro-11β-hydroxy-17α,20;20,21-bismethylenedioxy-4,5-seco-3-pregnyn-5-one
24. 2α,16β-Dimethyl-9α-fluoro-11β-hydroxy-17α,20;20,21-bismethylenedioxy-4,5-seco-3-pregnyn-5-one
25. 16α-Methyl-17α,20;20,21-bismethylenedioxy-4,5-seco-3-pregnyn-5-one
26. 16β-Methyl-17α,20;20,21-bismethylenedioxy-4,-seco-3-pregnyn-5-one
27. 2α,16α-Dimethyl-17α,20;20,21-bismethylenedioxy-4,5-seco-3-pregnyn-5-one
28. 2α,16β-Dimethyl-17α,20;20,21-bismethylenedioxy-4,5-seco-3-pregnyn-5-one B. Alkylation at C-6 of the 4,5-seco compounds of Example 43A Treat each of products 1 through 28 of Example 43A in ethylene glycol dimethyl ether with n-butyl lithium followed by methyl iodide in a manner similar to that described in Example 15A with the exception that only one mole of methyl iodide is used per mole of 4,5-seco derivative. Isolate and purify the resultant respective products and there is obtained the corresponding 6-methyl derivative of each of the 4,5-seco-3-pregnyne compounds of Example 43A–1 through 28.

Similarly, by treating each of the 4,5-seco-3-pregnyne compounds of Example 43A, i.e., products 1 through 28, in liquid ammonia with sodium amide followed by methylene dibromide in a manner similar to that described in Example 38A, there is obtained the respective 6,6-ethylene derivative of each of the 4,5-seco compounds of Example 43A–1 through 28.

C. Ring Closure of the alkylated derivatives of 4,5-seco compounds of Example 43B By treating each of the 6-methyl derivatives prepared as described in Example 43B, first paragraph, according to procedures such as described in Examples 38B through D, and, in the case of the 11-acetylated intermediates, by also subjecting it to the action of *Flavobacterium dehydrogenans* according to procedure 36G, there are obtained the respective 6α-21-acetate ester derivatives of the starting compounds listed in Example 40A.

By treating the 6,6-ethylene derivatives prepared as described in Example 43B, second paragraph, according to procedures such as described in Examples 32D, E and F and in the case of intermediates possessing an 11-acetoxy group, according to procedures described in Example 36G, there are obtained the respective 6,6-ethylene 21-acetate ester derivatives of the starting compounds listed in Example 43A, i.e.

1. 6,6-Ethylene-2α-methyl-4-pregnene-17α,21-diol-3,11,20-trione 21-acetate
2. 6,6-Ethylene-9α-fluoro-4-pregnene-17α,21-diol-3,11,20-trione 21-acetate
3. 6,6-ethylene-16α-methyl-4-pregnene-17α,21-diol-3,11,20-trione 21-acetate
4. 6,6-Ethylene-16β-methyl-4-pregnene-17α,21-diol-3,11,20-trione 21-acetate
5. 6,6-Ethylene-2α,16α-Dimethyl-4-pregnene-17α,21-diol-3,11,20-trione 21-acetate
6. 6,6-Ethylene-2α,16β-dimethyl-4-pregnene-17α,21-diol-3,11,20-trione 21-acetate
7. 6,6-Ethylene-2α-methyl-9α-fluoro-4-pregnene-11β,21-diol-3,11,20-trione 21-acetate
8. 6,6-Ethylene-9α-fluoro-16α-methyl-4-pregnene-17α,21-diol-3,11,20-trione 21-acetate
9. 6,6-Ethylene-9α-fluoro-16β-methyl-4-pregnene-17α,21-diol-3,11,20-trione 21-acetate 10. 6,6-Ethylene-2α,16α-dimethyl-9α-fluoro-4-pregnene-17α,21-diol-3,11,20-trione 21-acetate
11. 6,6-Ethylene-2α,16β-dimethyl-9α-fluoro-4-pregnene-17α,21-diol-3,11,20-trione 21-acetate
12. 6,6-Ethylene-4-pregnene-11β,17α,21-triol-3,20-dione 21-acetate
13. 6,6-Ethylene-2α-methyl-4-pregnene-11β,17α,21-triol-3,20-dione 21-acetate
14. 6,6-Ethylene-9α-fluoro-4-pregnene-11β,17α,21-triol-3,20-dione 21-acetate
15. 6,6-Ethylene-16α-methoxy-4-pregnene-11β,17α,21-triol-3,20-dione 21-acetate
16. 6,6-Ethylene-16α-methyl-4-pregnene-11β,17α,21-triol-3,20-dione 21-acetate
17. 6,6-Ethylene-16β-methyl-4-pregnene-11β,17α,21-triol-3,20-dione 21-acetate
18. 6,6-Ethylene-2α,16α-dimethyl-4-pregnene-11β,17α,21-triol-3,20-dione 21-acetate
19. 6,6-Ethylene-2α,16β-dimethyl-4-pregnene-11β,17α,21-triol-3,20-dione 21-acetate
20. 6,6-Ethylene-2α-methyl-9α-fluoro-4-pregnene-11β,17α,21-triol-3,20-dione 21-acetate
21. 6,6-Ethylene-9α-fluoro-16α-methyl-4-pregnene-11β,17α,21-triol-3,20-dione 21-acetate
22. 6,6-Ethylene-9α-fluoro-16β-methyl-4-pregnene-11β,17α,21-triol-3,20-dione 21-acetate
23. 6,6-Ethylene-2α,16α-dimethyl-9α-fluoro-4-pregnene-11β,17α,21-triol-3,20-dione 21-acetate
24. 6,6-Ethylene-2α,16β-dimethyl-9α-fluoro-4-pregnene-11β,17α,21-triol-3,20-dione 21-acetate
25. 6,6-Ethylene-16α-methyl-4-pregnene-17α,21-diol-3,20-dione 21-acetate
26. 6,6-Ethylene-16β-methyl-4-pregnene-17α,21-diol-3,20-dione 21-acetate
27. 6,6-Ethylene-2α,16α-dimethyl-4-pregnene-17α,21-diol-3,20-dione 21-acetate
28. 6,6-Ethylene-2α,16β-dimethyl-4-pregnene-17α,21-diol-3,20-dione 21-acetate.

EXAMPLE 44

The protective groups present in each of the 4,5-seco steroids prepared in Examples 41A and B, 42A and B and 43A and B may be removed according to procedures similar to those described respectively in Examples 41C, 42C and 43C and there will be obtained the corresponding 4,5-seco-3-androstyn-5-ones, 21-desoxy-4,5-seco-3-pregnyn-5-ones and 21-oxygenated 4,5-seco-3-pregnyn-5-ones having functions at C-11 and side chains at C-17 similar to those present in the starting compounds listed in each of Examples 41 through 43.

I claim:

1. A process for the preparation of a 5-keto-4,5-seco-3-yne steroid of the group consisting of the pregnane, androstane and estrane series which comprises reacting in a sequence of any order a 3-keto-4-dehydro-steroid of the group consisting of the pregnane, androstane and estrane series with a hydrocarbonsulfonylhydrazine having up to 10 carbon atoms, and with an epoxidizing reagent selected from the group consisting of alkaline hydrogen peroxide, perbenzoic acid, perphthalic acid and m-chloroperbenzoic acid, whereby the thereby formed 3-hydrocarbonsulfonylhydrazono-4,5-oxido-steroid of the group consisting of the pregnane, androstane and estrane series fragments and rearranges in situ to produce said 5-keto-4,5-seco-3-yne steroid of the pregnane, androstane and estrane series.

2. A process according to claim 1 wherein said 3-keto-4-dehydro-steroid of the pregnane, androstane and estrane series is a compound having the following structural formula A:

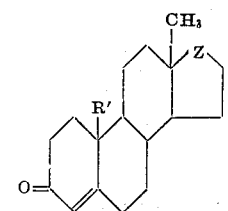

A whereby the said 5-keto-4,5-seco-3-yne-steroid of the pregnane, androstane and estrane series thereby produced is a compound having the following structural formula B:

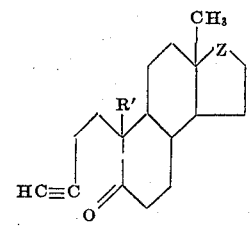

B wherein in compounds of both formulae A and B:
R' is a member selected from the group consisting of hydrogen and methyl; and
Z is a member selected from the group consisting of carbonyl,

(W being a member selected from the group consisting of hydrogen, lower alkyl, tetrahydropyranyl, lower alkanoyl, and A being a member selected from the group consisting of hydrogen and lower alkyl),

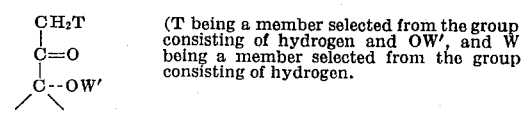

(T being a member selected from the group consisting of hydrogen and OW', and W being a member selected from the group consisting of hydrogen.

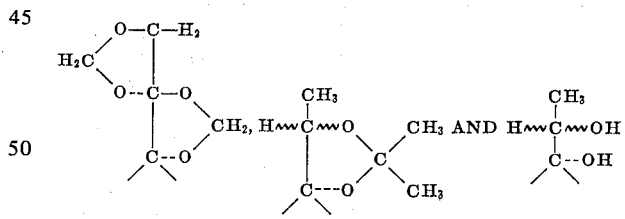

3. The process according to claim 2 wherein said epoxidizing reagent is aqueous alkaline hydrogen peroxide and said hydrocarbonsulfonylhydrazine is a member selected from the group consisting of p-toluenesulfonylhydrazine and methanesulfonyl-hydrazine.

4. The process according to claim 2 wherein said 3-keto-4-dehydro-steroid is 4-androsten-17β-ol-3-one, said epoxidizing agent is m-chloroperbenzoic acid, and said hydrocarbonsulfonylhydrazine is p-toluenesulfonylhydrazine in a lower alkanol having up to 4 carbon atoms, said process comprising reacting 4-androsten-17β-ol-3-one with p-toluene-sulfonylhydrazine in a lower alkanol having up to 4 carbon atoms followed by treatment of the thereby formed 3-p-toluenesulfonylhydrazono-4,5-oxido-4-androsten-17β-ol-3-one with m-chloroperbenzoic acid whereby is produced 4,5-seco-3-androstyn-17β-ol-5-one.

5. The process according to claim 1 wherein said 3-keto-4-dehydro-steroid is 17α,20-isopropylidenedioxy-4-pregnen-3-one, said epoxidizing reagent is alkaline hydrogen peroxide, and said hydrocarbonsulfonylhydrazine is p-toluenesulfonylhydrazine in ethanol; said process comprising reacting 17-α,20-isopropylidene-dioxy-4-pregnen-3-one with alkaline hydrogen peroxide, and reacting the thereby formed 4,5-oxido-17α,20-isopropylidenedioxy-pregnane-3-one with p-toluenesulfonylhydrazine in ethanol, whereby is produced 17α,20-isopropylidene-dioxy-4,5-seco-3-pregnyn-5-one.

6. The process according to claim 2 wherein said 3-keto-4-dehydro-steroid is a member selected from the group consisting of 17α,20;20,21-bismethylene-dioxy-4-pregnen-3-one and the 11-keto analog thereof, said epoxidizing reagent is alkaline hydrogen peroxide and said hydrocarbonsulfonylhydrazine is p-toluenesulfonylhydrazine in n-propanol;

said process comprising reacting a member of the group comprising 17α,20;20,21-bismethylenedioxy-4-pregnen-3-one and the 11-keto analog thereof with alkaline hydrogen peroxide and reacting the thereby formed corresponding 4,5-oxido derivative with p-toluenesulfonylhydrazine in n-propanol whereby is produced a member selected from the group consisting of 17α,20;20,2-1-bismethylenedioxy-4,5-seco-3-pregnyn-5-one and the 11-keto analog thereof.

7. A process for the preparation of a 5-keto-4,5-seco-3-yne steroid of the group consisting of the pregnane, androstane and estrane series which comprises treating a 3-keto-4,5-oxido-steroid of the group consisting of the pregnane, androstane and estrane series with a hydrocarbonsulfonylhydrazine having up to 10 carbon atoms.

8. A process according to claim 7 wherein said hydrocarbonsulfonylhydrazine is a member selected from the group consisting of methanesulfonylhydrazine and p-toluenesulfonylhydrazine.

9. A process according to claim 7 wherein said 3-keto-4,5-oxido-steroid is a member selected from the group consisting of 4,5-oxido-estran-17β-ol-3-one and 4,5-oxido-androsten-17β-ol-3-one and there is formed a member selected from the group consisting of 4,5-seco-3-estryn-17β-ol-5-one and 4,5-seco-3-androstyn-17β-ol-5-one.

10. A process for the preparation of an α-keto-α,β-seco-β(γ)-yne steroid of the group consisting of the pregnane, androstane and estrane series which comprises reacting an α-keto-β-dehydro steroid of the group consisting of the androstane, pregnane and estrane series with para toluenesulfonylhydrazine and with an epoxidizing reagent of alkaline hydrogen peroxide whereby the thereby formed α-para toluenesulfonylhydrazono-β,γ-oxido-steroid fragments and rearranges in situ to produce said α-keto-α,β-seco-β(γ)-yne steroid of the pregnane, androstane and estrane series.

* * * * *

UNITED STATES PATENT AND TRADEMARK OFFICE
CERTIFICATE OF CORRECTION

PATENT NO. : 3,835,160
DATED : September 10, 1974
INVENTOR(S) : Masato Tanabe

It is certified that error appears in the above-identified patent and that said Letters Patent are hereby corrected as shown below:

Column 1, lines 57 and 58, "and a hydroazone derivative," should read --and a hydrazone derivative,--. Column 5, Diagram F, first one, " 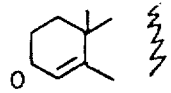 " should read -- 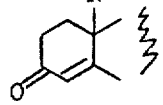 --. Column 13, line 70, "-6-keto-66$^7$-," should read --6-keto-$\Delta^7$-,--. Column 14, line 56, "(compound I, R=CH$_3$)" should read --(compound I', R=CH$_3$)--. Column 14, line 57, "(compound I, R is hydrogen)" should read --(compound I', R is hydrogen)--. Column 14, line 63, "-17$\beta$-ol3-one-" should read --17$\beta$-ol-3-one--. Column 15, line 9, "formula I." should read --formula I'--. Column 16, lines 1 and 2, "-17$\beta$ol-5-one (compund I, R is methyl)" should read --17$\beta$-ol-5-one (compound I, R is methyl)--. Column 19, line 49, "-17$\alpha$-ol-5-one-" should read --17$\beta$-ol-5-one--. Column 19, line 63, "-17$\alpha$-ol-5-one," should read --17$\beta$-ol-5-one--. Column 20, line 1, "-5,17$\alpha$-diol-" should read --5,17$\beta$-diol--. Column 20, line 17, "-5,17$\alpha$-diol-" should read --5,17$\beta$-diol--. Column 20, line 39, "my invention concept" should read --my inventive concept--. Column 20, lines 62 and 63, "Elute first and benzene" should read --Elute first with benzene--. Column 21, line 36, "6.15 $\mu$ (CXC);" should read --6.15 $\mu$ (C=C);--. Column 22, line 10, "-22$\alpha$,25$\alpha$-" should read -22$\alpha$,25a--. Column 22, line 20, "liters of water" should read --liters of ice water--. Column 22, line 40, "aqueous bicarbonate" should read --aqueous sodium bicarbonate--. Column 22, line 57, "of 4.5-seco-" should read --of 4,5-seco--. Column 24, line 19, "-17$\beta$-ol-e,5-dione" should read --17$\beta$-ol-3,5-dione--. Column 25, line 21, "When the organic" should read --Wash the organic--. Column 26, line 2, "C. 6,6-Di-(2-Propenyl)-" should read --C. 6,6-Di-(2'-Propenyl)--. Column 26, line 4, "of 6.6-(2'-propenyl)-" should read --of 6,6-di-(2'-propenyl)--. Column 28, line 42, "(0.227 g.)" should read --(0.277 g.)--. Column 29, line 58, "$\delta_{max}^{film}$" should read --$\lambda_{max}^{film}$--. Column 30, line 26, "$\delta_{max}^{film}$" should read --$\lambda_{max}^{film}$--. Column 30, line 60, "$\delta_{max}^{film}$" should read --$\lambda_{max}^{film}$--. Column 32, line 69, "$\delta_{max}^{Nujol}$" should

UNITED STATES PATENT AND TRADEMARK OFFICE
CERTIFICATE OF CORRECTION

PATENT NO. : 3,835,160
DATED : September 10, 1974
INVENTOR(S) : Masato Tanabe

It is certified that error appears in the above-identified patent and that said Letters Patent are hereby corrected as shown below:

read -- $\lambda_{max}^{Nujol}$; --. Column 33, line 14, "$\delta_{max}^{Nujol}$" should read -- $\lambda_{max}^{Nujol}$ --. Column 34, line 10, "comprising 10B-n-" should read --comprising 10β-n--. Column 34, line 15, "C. 10β-n-Proply-" should read --C. 10β-n-Propyl--. Column 34, line 37, "percent dioxane with mecuric" should read --% aqueous dioxane with mercuric-. Column 36, line 51, "-6,610β-tri-" should read --6,6,10β-tri--. Column 36, lines 64 and 65, "-5.58 → 6.75 (OTHP, $C_{17}$-H); 9.11 5.85 9.13 𝜏--" should read --5.85 → 6.75 (OTHP, $C_{17}$-H); 9.11 and 9.13 𝜏--. Column 44, line 30, "-$C_{19}$-$CH_3$); ($C_6$-$CH_3$);" should read --$C_{19}$-$CH_3$); 8.87 ($C_6$-$CH_3$);--. Column 44, line 63, "on 75 g. Florisile" should read --on 75 g. Florisil--. Column 44, line 69, "5.85 ($Ch_3$-C=O);" should read --5.85 ($CH_3$-C=O);--. Column 45, lines 33 and 34, "-17α,20-isopropylidenedioxy-isopropylidenedioxy-4,5-seco-pregnane-2,5-dione;" should read --17α,20-isopropylidenedioxy-4,5-seco-pregnane-3,5-dione;--. Column 47, line 27, " $\delta_{max}^{nujol}$ " should read -- $\lambda_{max}^{nujol}$ --. Column 47, line 66, "$\delta_{max}^{nujol}$" should read -- $\lambda_{max}^{nujol}$--. Column 48, line 37, "-3-estryn-17β28-ol-" should read --3-estryn-17β-ol--. Column 49, line 53, "to obtaine" should read --to obtain--. Column 52, line 2, "-4-pregnen11β-" should read --4-pregnen-11β--. Column 52, line 47, "-17β,20-" should read --17α,20--. Column 55, line 46, "A. 4,5Oxido-" should read --A. 4,5-Oxido--. Column 58, line 37, "12. gα-Fluoro-11β-" should read --12. 9α-Fluoro-11β--. Column 58, line 41, "15. 9α-Fluoro-11α-" should read --15. 9α-Fluoro-11β--. Column 58, line 55, "3. 11β-Acetoxy-17β,20-" should read --3. 11β-Acetoxy-17α,20--. Column 59, line 2, "12. 9α-Fluro-" should read --12. 9α-Fluoro--. Column 61, line 56, "17. 11β-Acetoxy16β-methyl-" should read --17. 11β-Acetoxy-16β-methyl--. Column 62, lines 9 and 10, "-4-seco-" should read --4,5-seco--. Column 64, line 43, Claim 2, "hydrogen." should read --hydrogen and alkanoyl),--. Column 64, lines 64, 65 and 66, Claim 4, "-p-toluenesulfonylhydrazine in a lower alkanol having up to 4 carbon atoms," should read --p-toluenesulfonylhydrazine, said process

UNITED STATES PATENT AND TRADEMARK OFFICE
CERTIFICATE OF CORRECTION

PATENT NO. : 3,835,160
DATED : September 10, 1974
INVENTOR(S) : Masato Tanabe

It is certified that error appears in the above-identified patent and that said Letters Patent are hereby corrected as shown below:

comprising--. Column 64, line 70, Claim 4, "hydrazono" should read --hydrazone--.

Signed and Sealed this

Thirty-first Day of August 1976

[SEAL]

Attest:

RUTH C. MASON
Attesting Officer

C. MARSHALL DANN
Commissioner of Patents and Trademarks